United States Patent
Park et al.

(10) Patent No.: US 11,871,260 B2
(45) Date of Patent: Jan. 9, 2024

(54) METHOD FOR REPORTING CHANNEL STATE INFORMATION IN WIRELESS COMMUNICATION SYSTEM, AND DEVICE FOR SAME

(71) Applicant: LG ELECTRONICS INC., Seoul (KR)

(72) Inventors: Haewook Park, Seoul (KR); Jiwon Kang, Seoul (KR); Kijun Kim, Seoul (KR); Jaehoon Chung, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 17/290,950

(22) PCT Filed: Nov. 4, 2019

(86) PCT No.: PCT/KR2019/014777
§ 371 (c)(1),
(2) Date: May 3, 2021

(87) PCT Pub. No.: WO2020/091542
PCT Pub. Date: May 7, 2020

(65) Prior Publication Data
US 2021/0409991 A1    Dec. 30, 2021

Related U.S. Application Data

(60) Provisional application No. 62/806,674, filed on Feb. 15, 2019, provisional application No. 62/791,557, filed on Jan. 11, 2019.

(30) Foreign Application Priority Data

Nov. 2, 2018 (KR) .......................... 10-2018-0133977

(51) Int. Cl.
*H04W 24/10* (2009.01)
*H04L 5/00* (2006.01)
*H04W 24/08* (2009.01)

(52) U.S. Cl.
CPC ............ *H04W 24/10* (2013.01); *H04L 5/0044* (2013.01); *H04L 5/0053* (2013.01); *H04L 5/0058* (2013.01); *H04W 24/08* (2013.01)

(58) Field of Classification Search
CPC .... H04W 24/10; H04W 24/08; H04L 5/0044; H04L 5/0053; H04L 5/0058;
(Continued)

(56) References Cited

U.S. PATENT DOCUMENTS

2018/0175993 A1* 6/2018 Onggosanusi ...... H04W 72/542
2018/0205438 A1* 7/2018 Davydov ............. H04B 7/0626
(Continued)

FOREIGN PATENT DOCUMENTS

KR    1020170132221    12/2017
WO    2018199704       11/2018

OTHER PUBLICATIONS

PCT International Application No. PCT/KR2019/014777, International Search Report dated Feb. 26, 2020, 5 pages.
(Continued)

*Primary Examiner* — Tejis Daya
(74) *Attorney, Agent, or Firm* — LEE, HONG, DEGERMAN, KANG & WAIMEY PC

(57) ABSTRACT

The present invention relates to a method whereby user equipment (UE) transmits channel state information (CSI) in a wireless communication system and to a device therefor. According to the present invention, a terminal receives configuration information for CSI reporting from a base station and receives a reference signal from the base station on the basis of the configuration information. The terminal
(Continued)

may receive downlink control information (DCI) via a physical downlink control channel (PDCCH), calculate CSI about a particular channel on the basis of the configuration information and the DCI, and report same to the base station.

17 Claims, 25 Drawing Sheets

(58) Field of Classification Search
CPC ... H04L 5/0007; H04L 5/0062; H04L 5/0048; H04L 5/0094; H04L 5/0057; H04B 7/0695
See application file for complete search history.

(56) References Cited

U.S. PATENT DOCUMENTS

| | | |
|---|---|---|
| 2018/0278315 A1 | 9/2018 | Wu et al. |
| 2020/0295905 A1* | 9/2020 | Takeda ................... H04L 5/0007 |
| 2022/0006496 A1* | 1/2022 | Park ...................... H04W 72/23 |

OTHER PUBLICATIONS

Intel Corporation, "Discussion on CSI Enhancements," 3GPP TSG RAN WG1 #94b, R1-1810789, Oct. 2018, 5 pages.
ZTE, "Type II CSI enhancements for MU-MIMO," 3GPP TSG RAN WG1 Meeting #94bis, R1-1810219, Oct. 2018, 8 pages.

* cited by examiner

[FIG. 1]
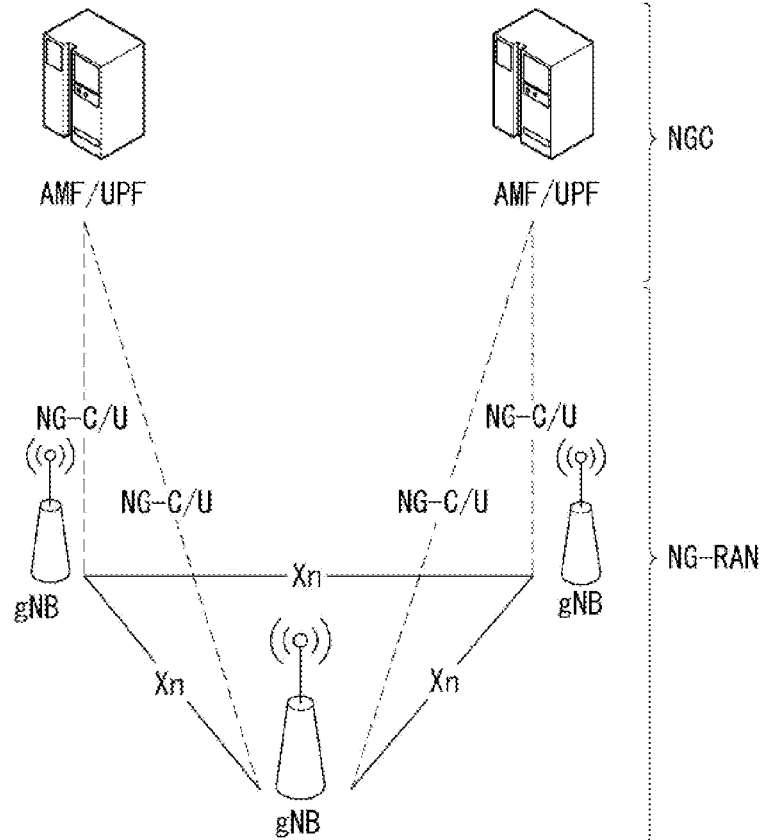
[FIG. 2]
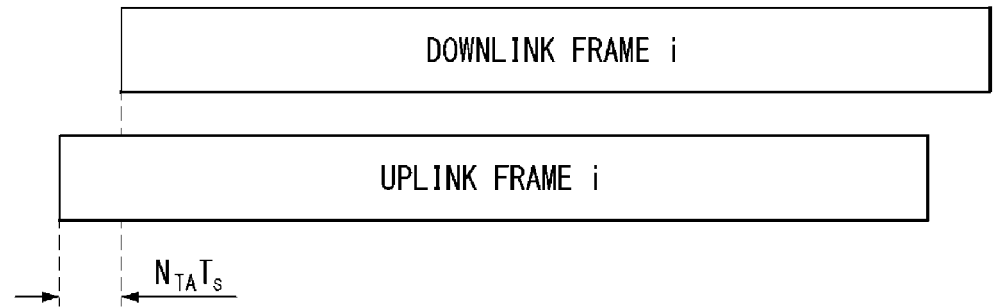

[FIG. 3]
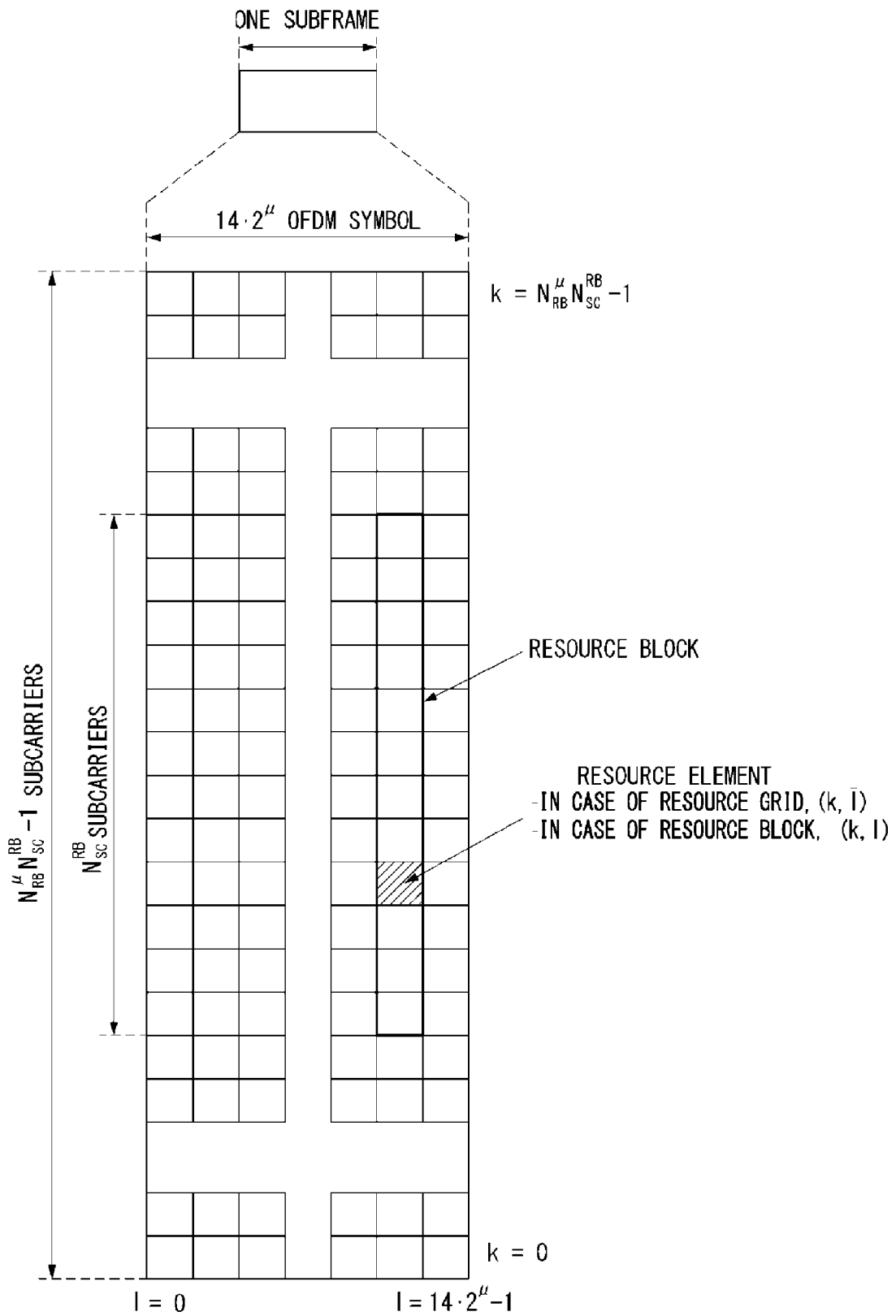

[FIG. 4]
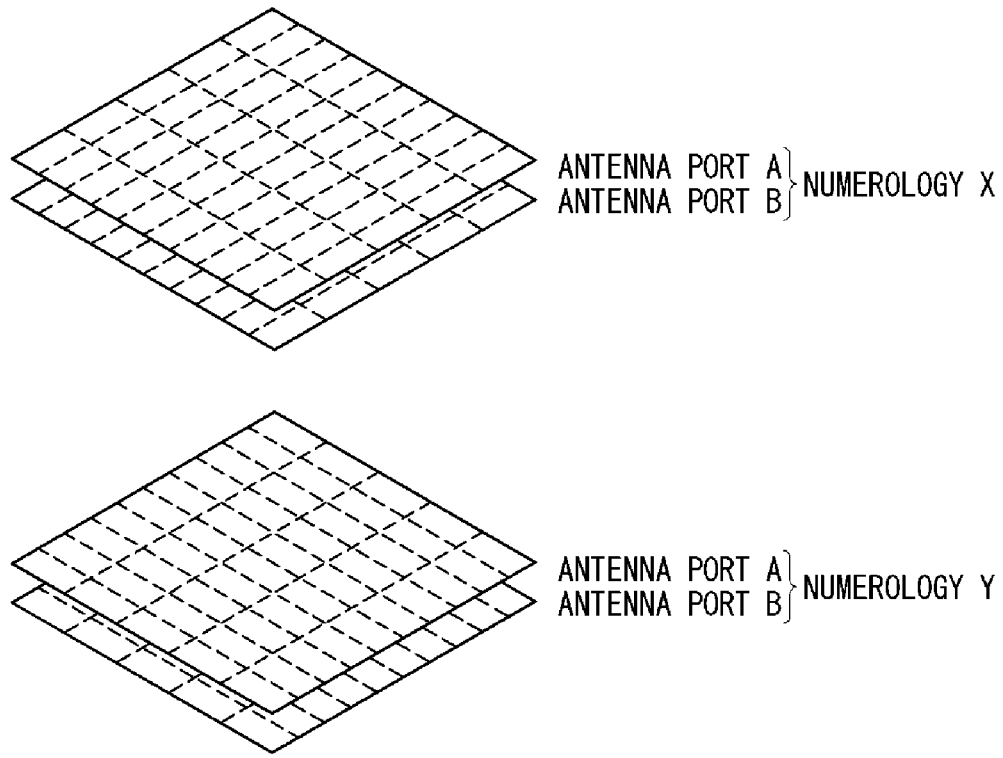
[FIG. 5]
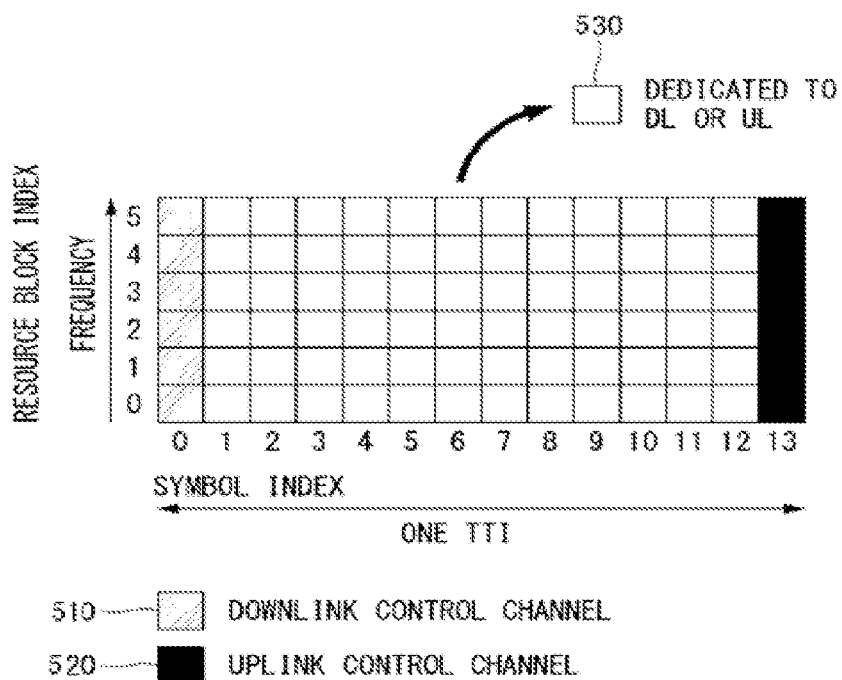

[FIG. 6]
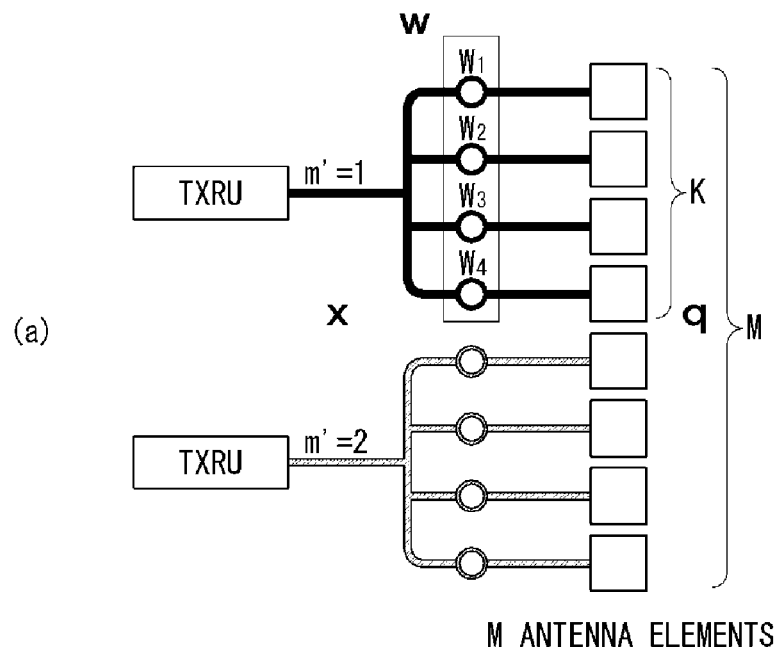
(a)
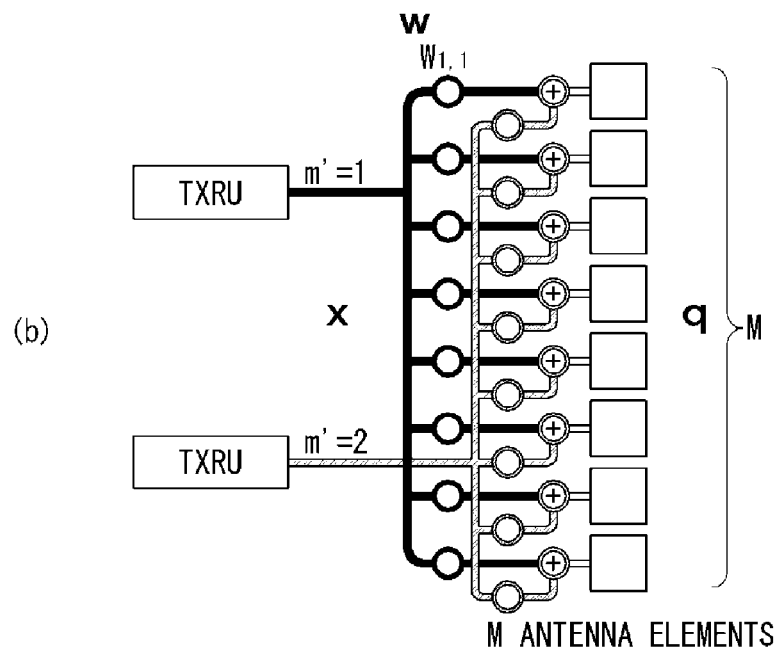
(b)

[FIG. 7]
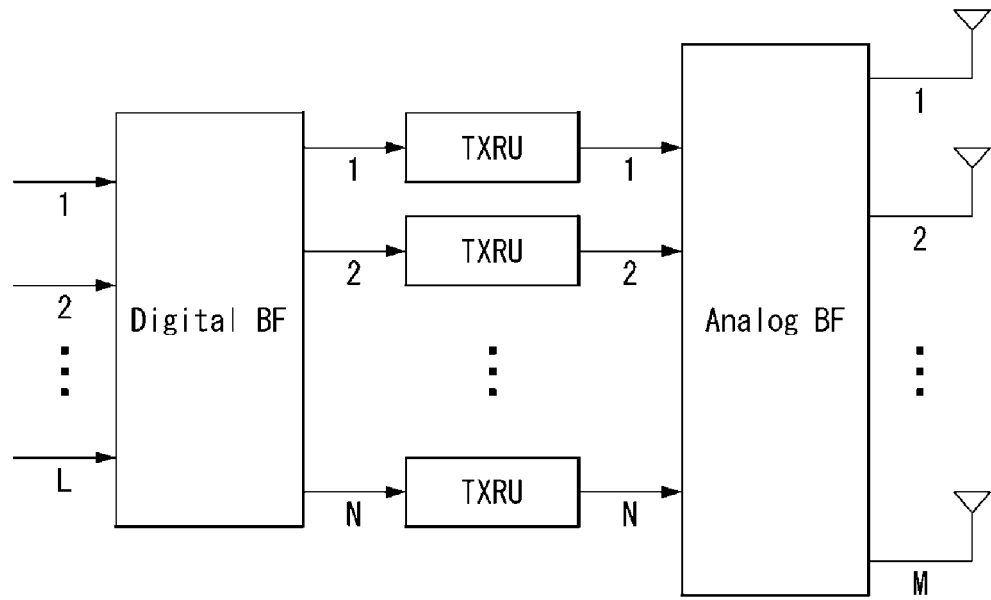
[FIG. 8]
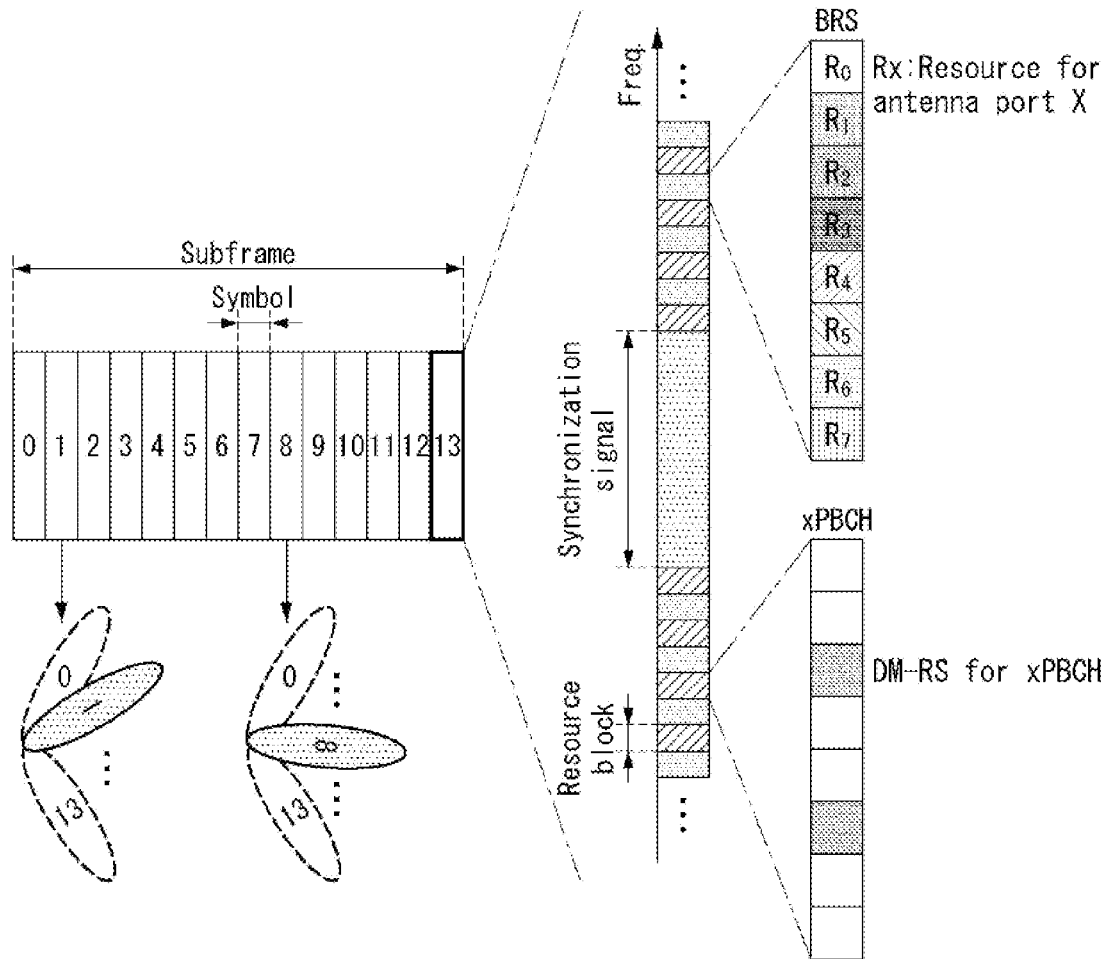

[FIG. 9]
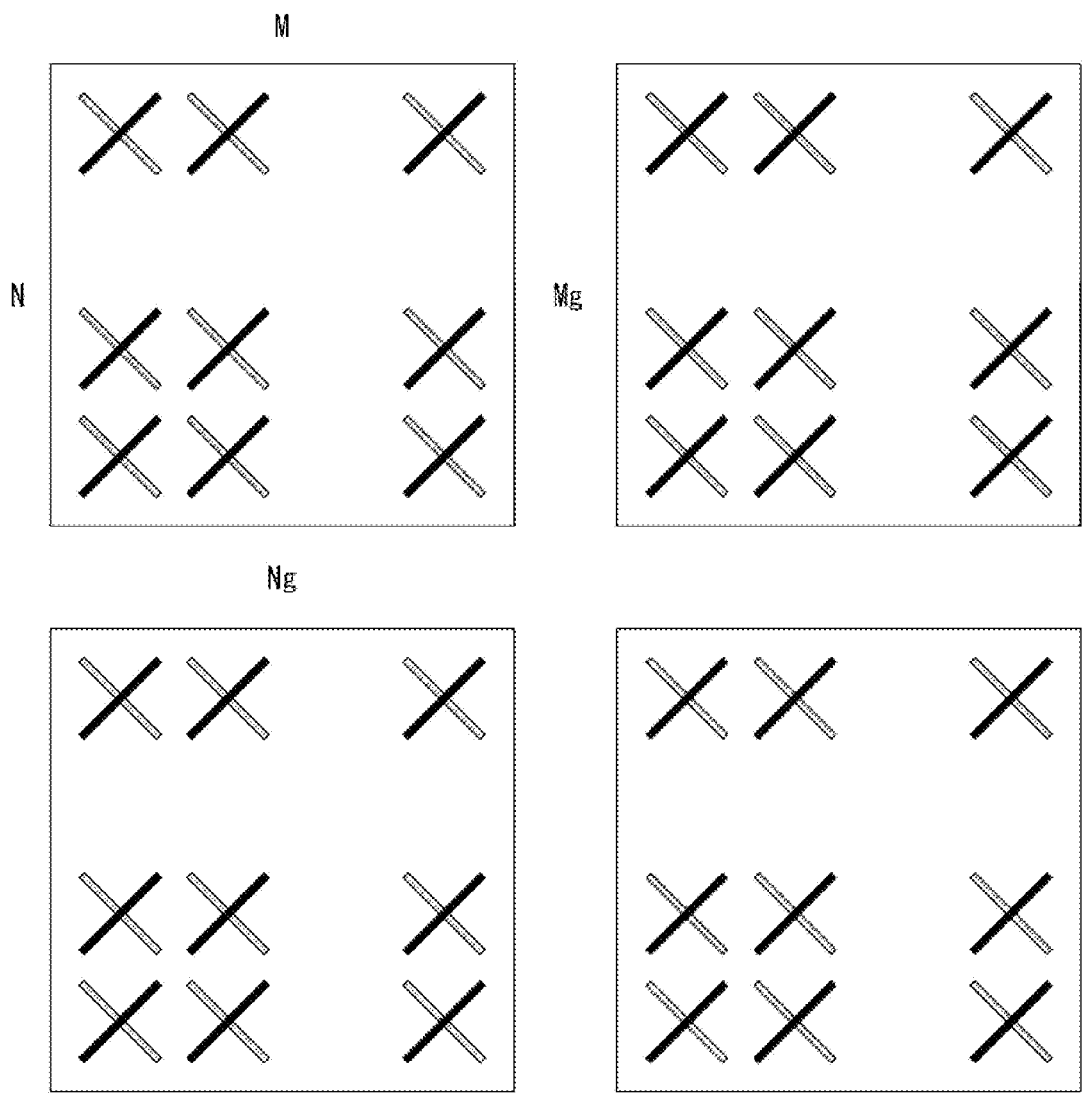

[FIG. 10]
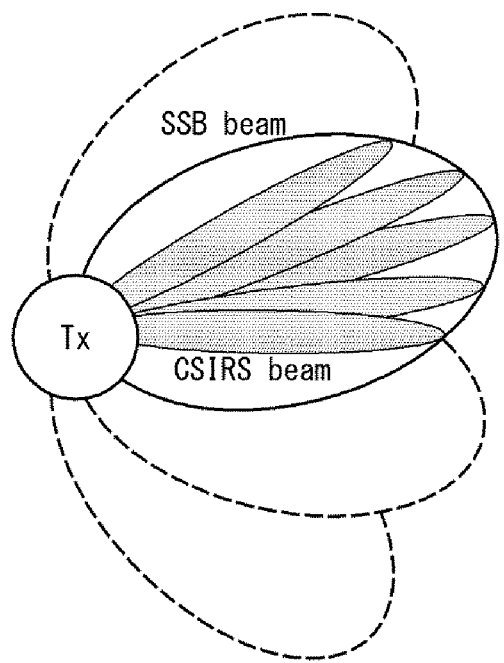
[FIG. 11]
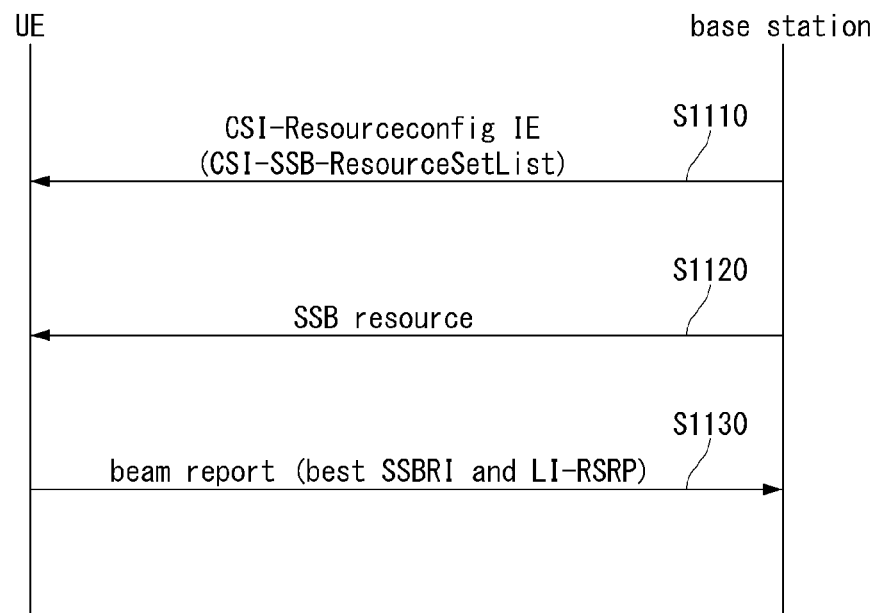

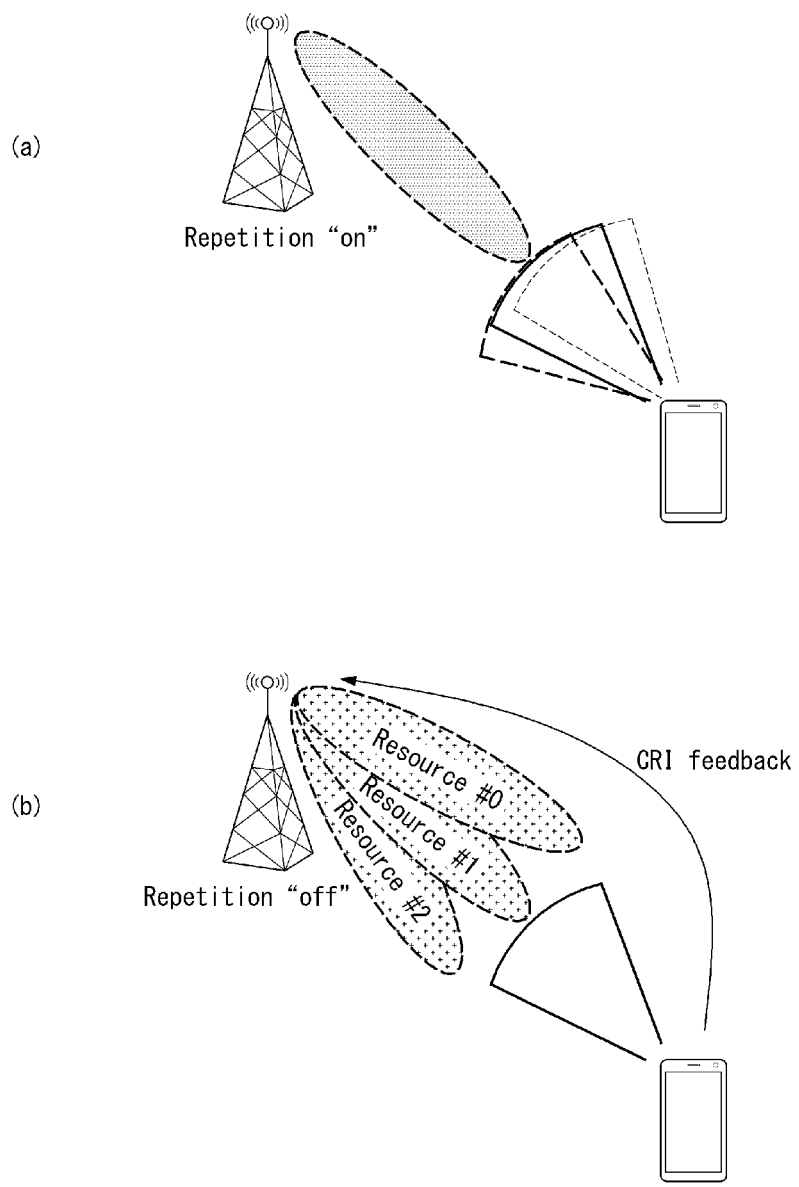
[FIG. 12]

[FIG. 13]
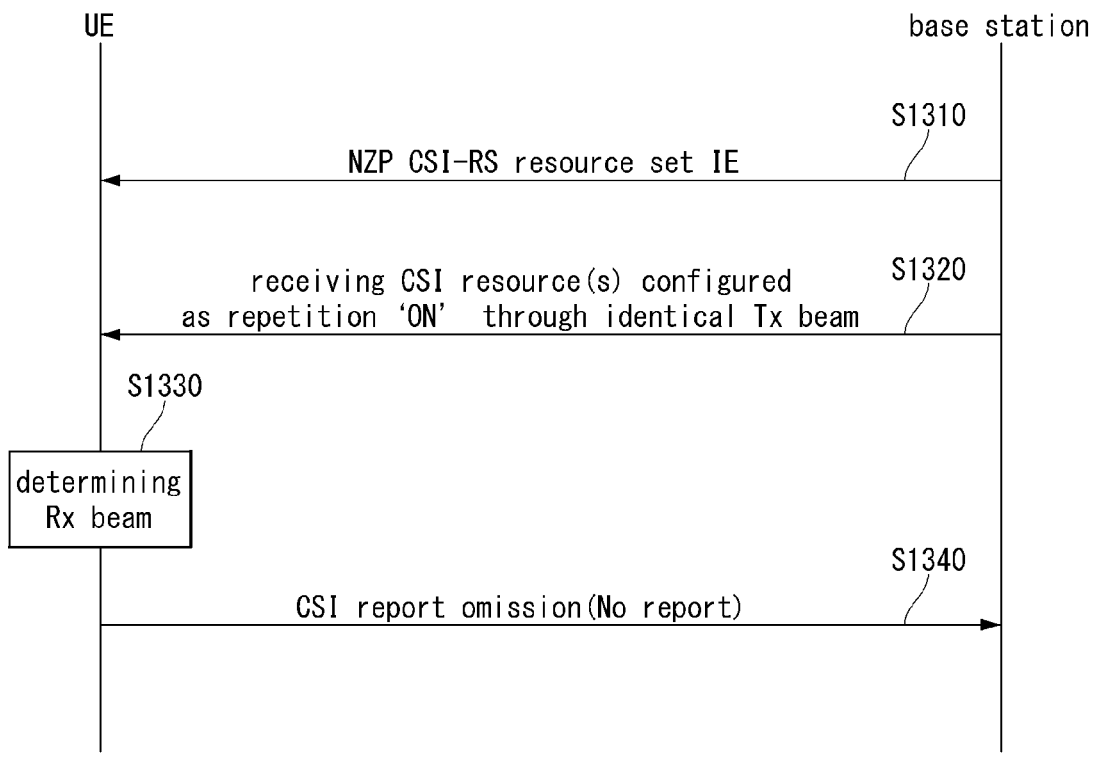
[FIG. 14]
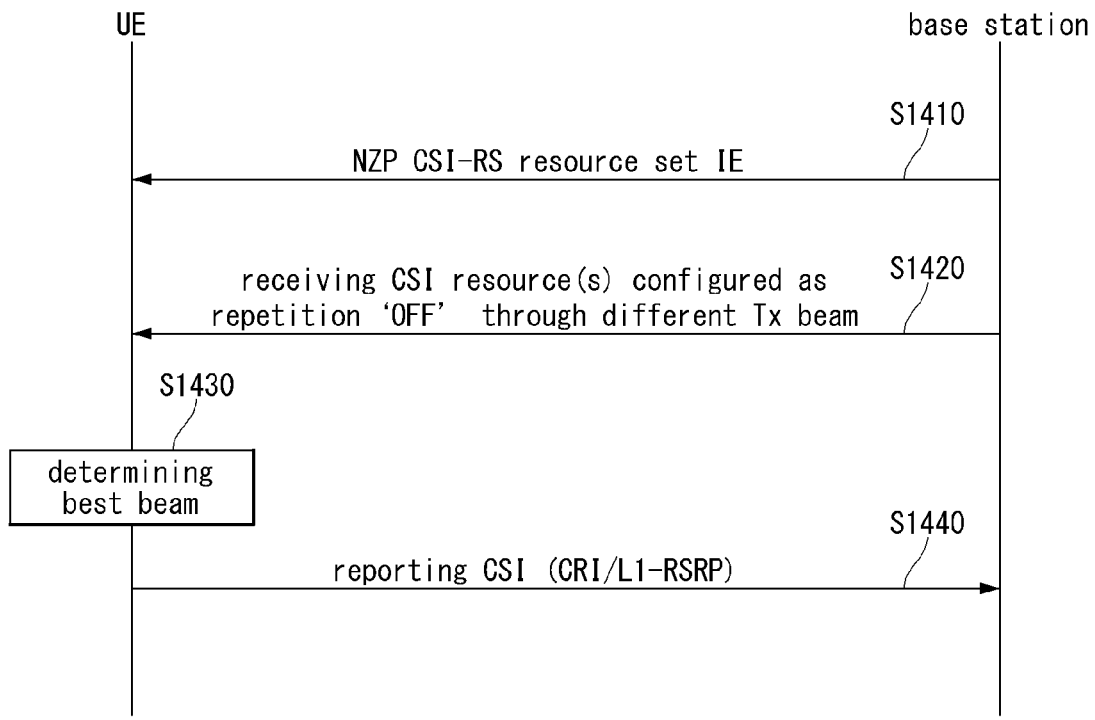

[FIG. 15]
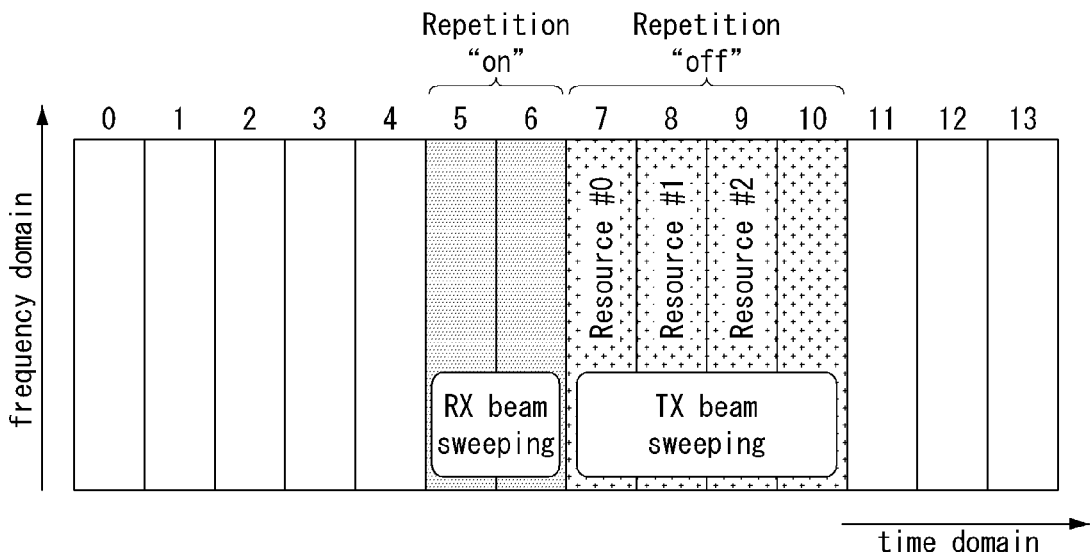
[FIG. 16]
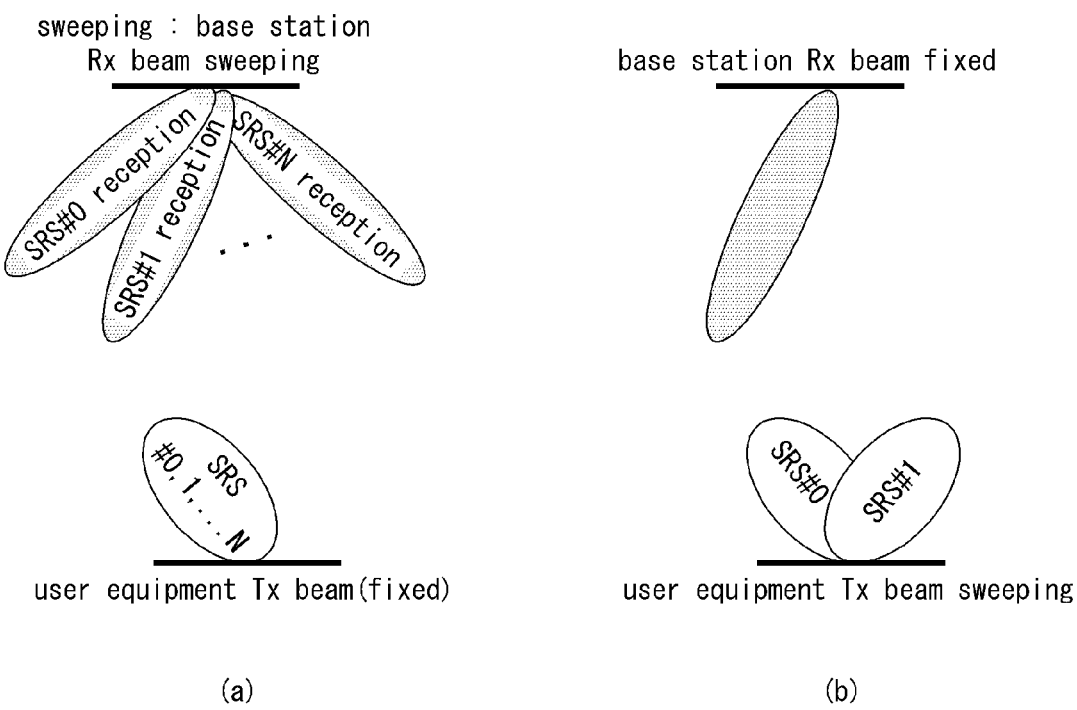
(a)　　　　　　　　　　　　　(b)

[FIG. 17]
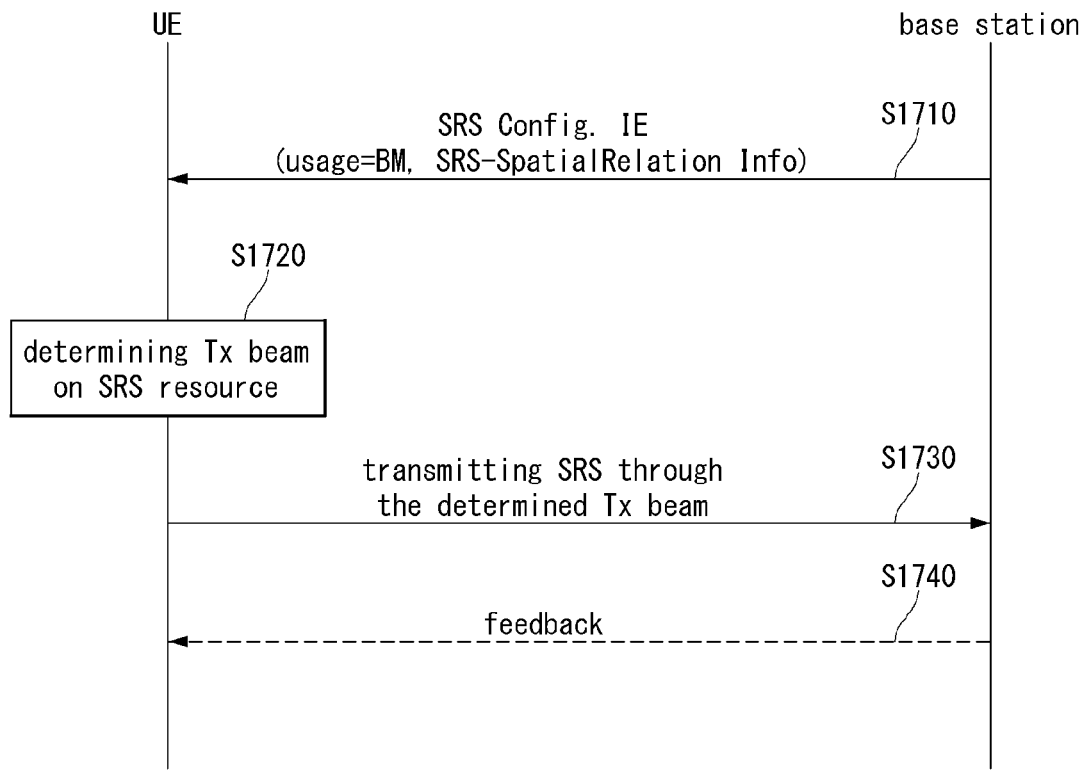
[FIG. 18]
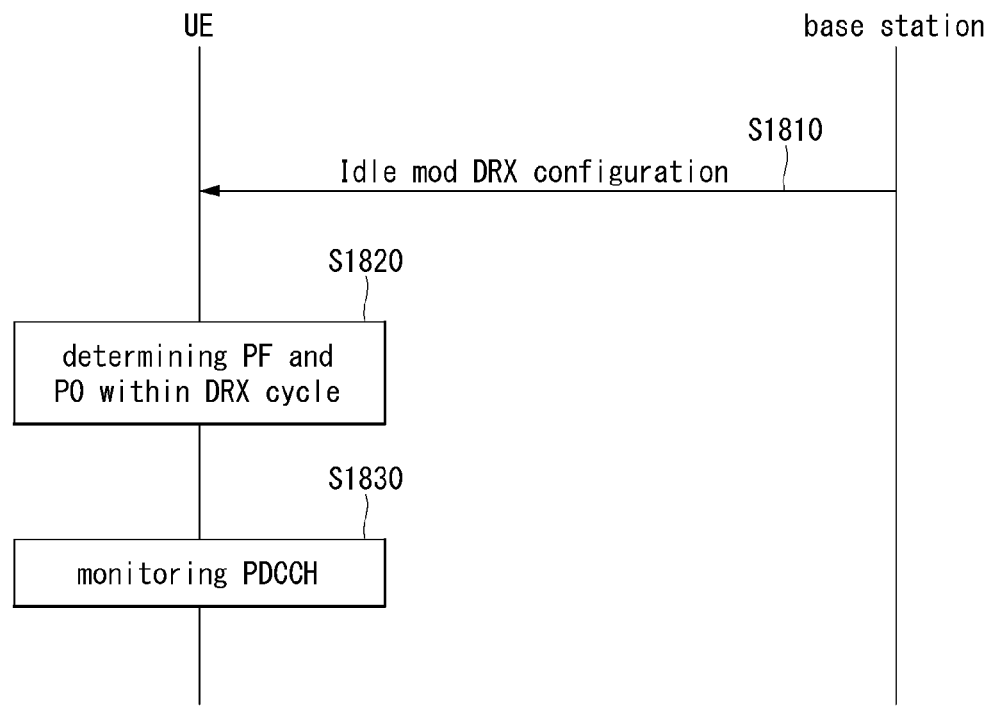

[FIG. 19]
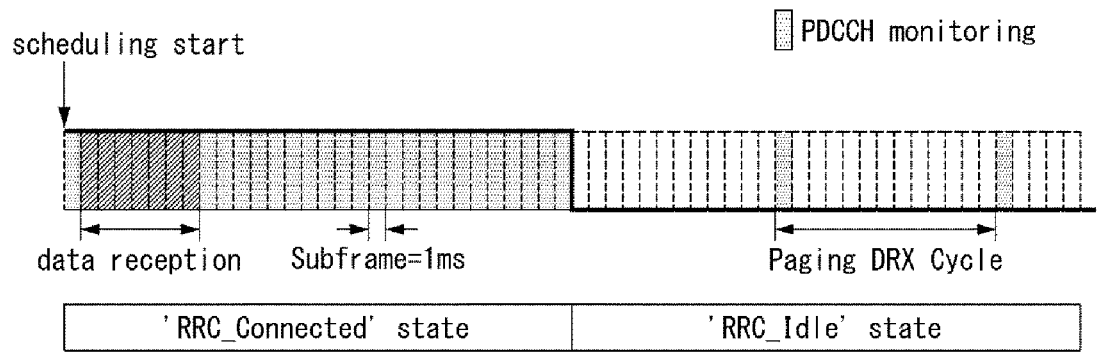
[FIG. 20]
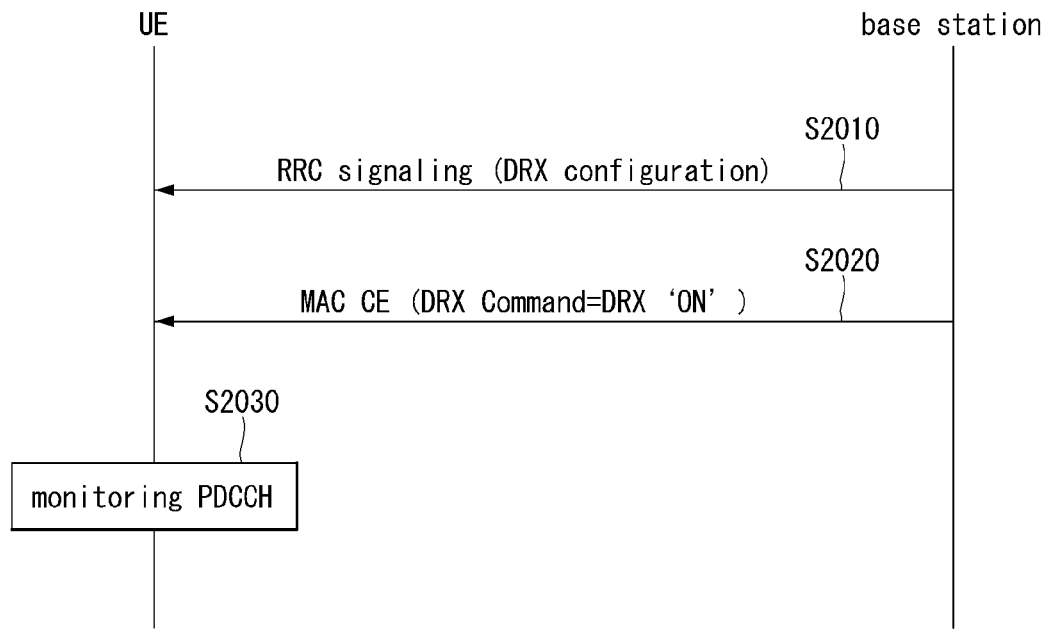

[FIG. 21]
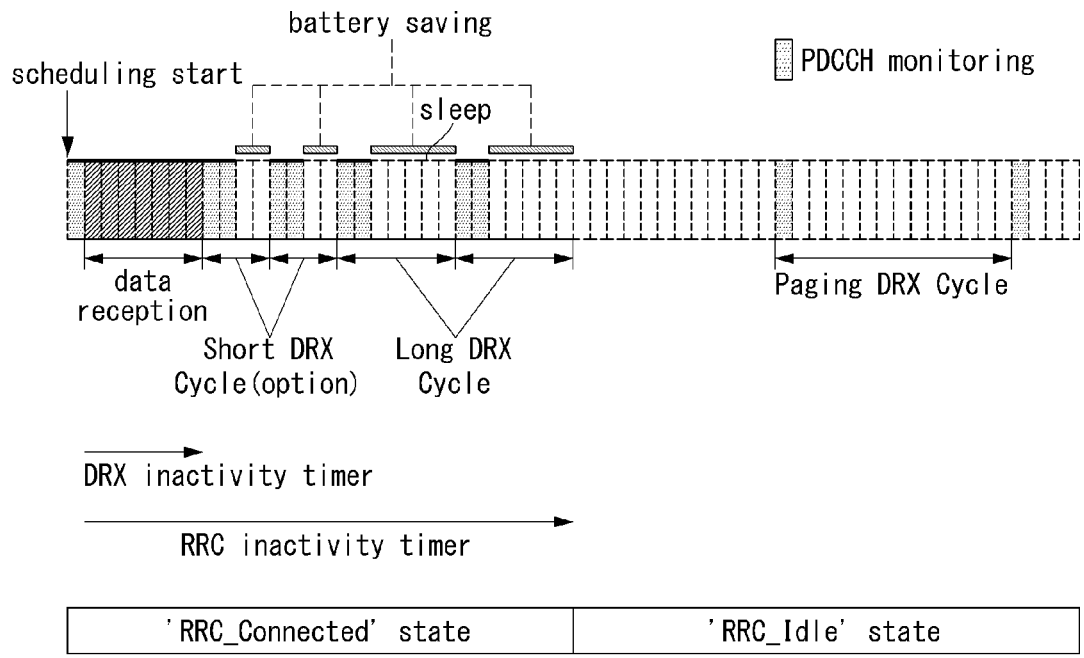
[FIG. 22]
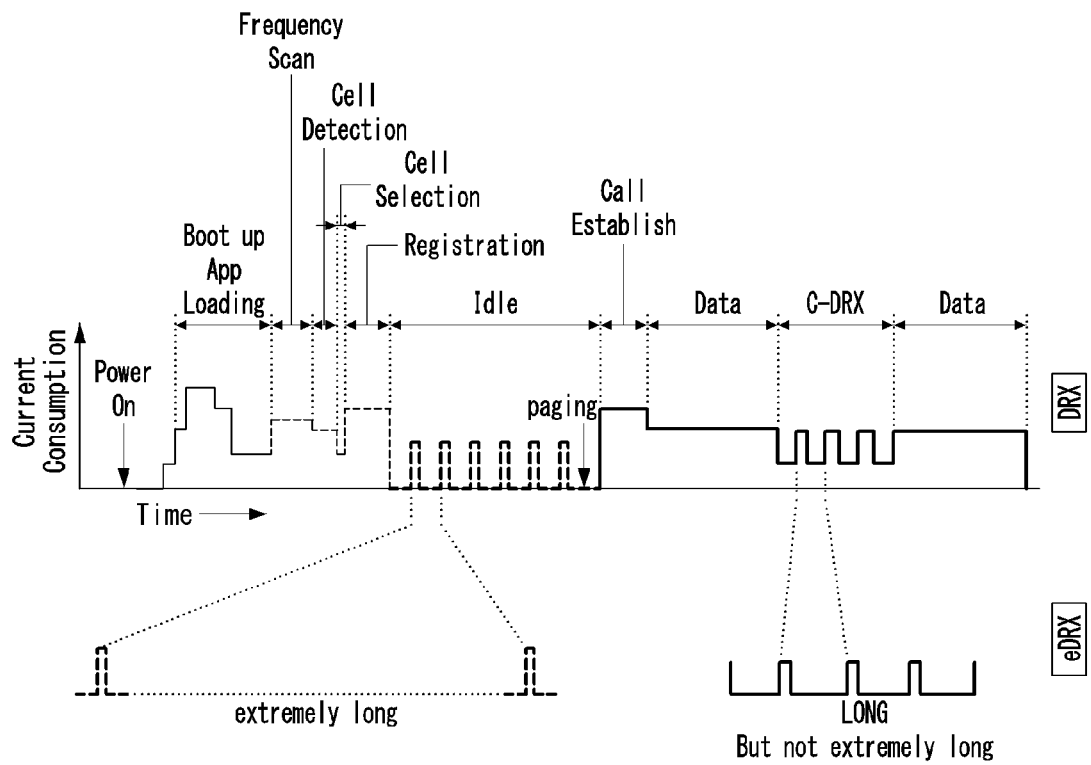

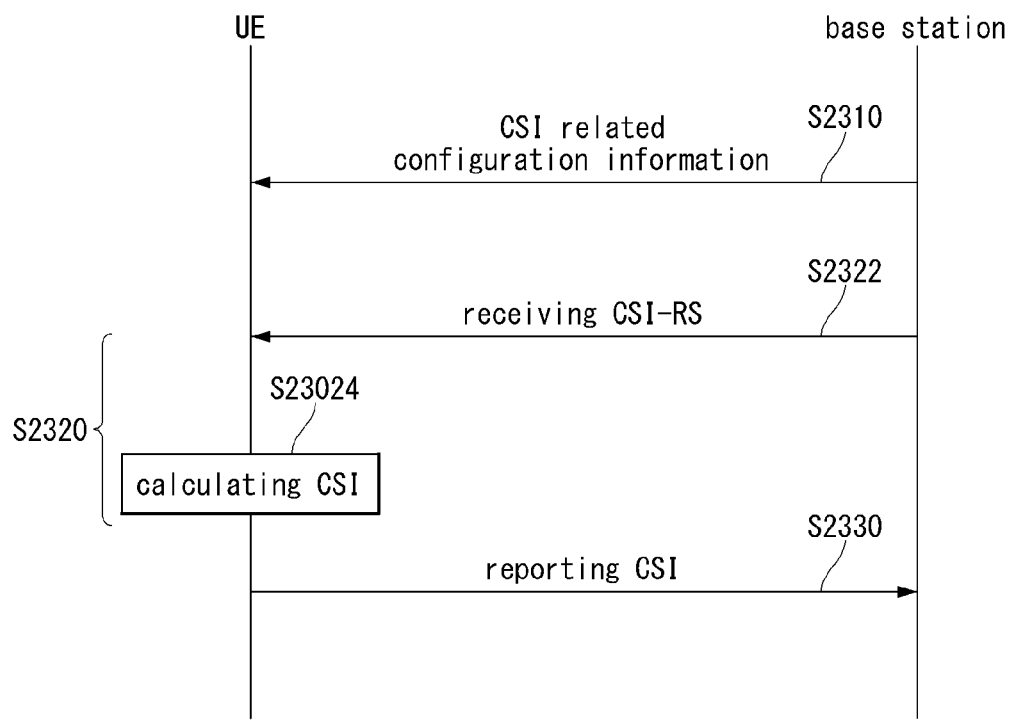
[FIG. 23]

[FIG. 24]
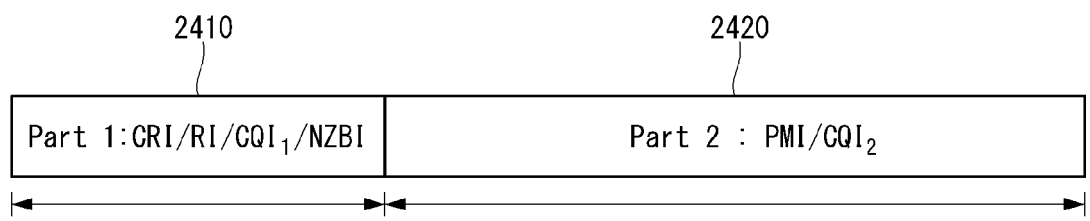
[FIG. 25]
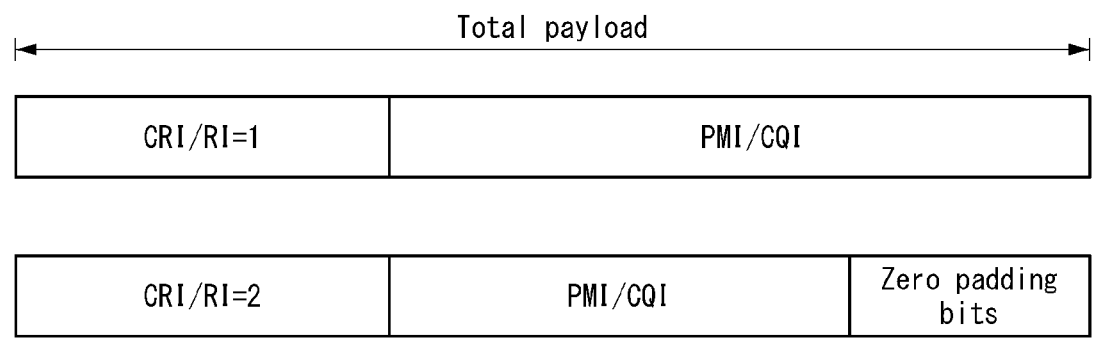
[FIG. 26]
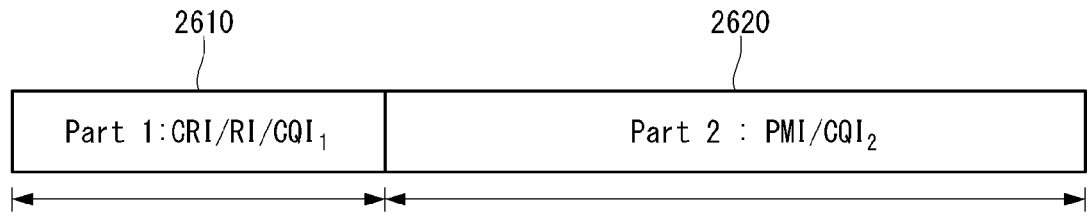

[FIG. 27]
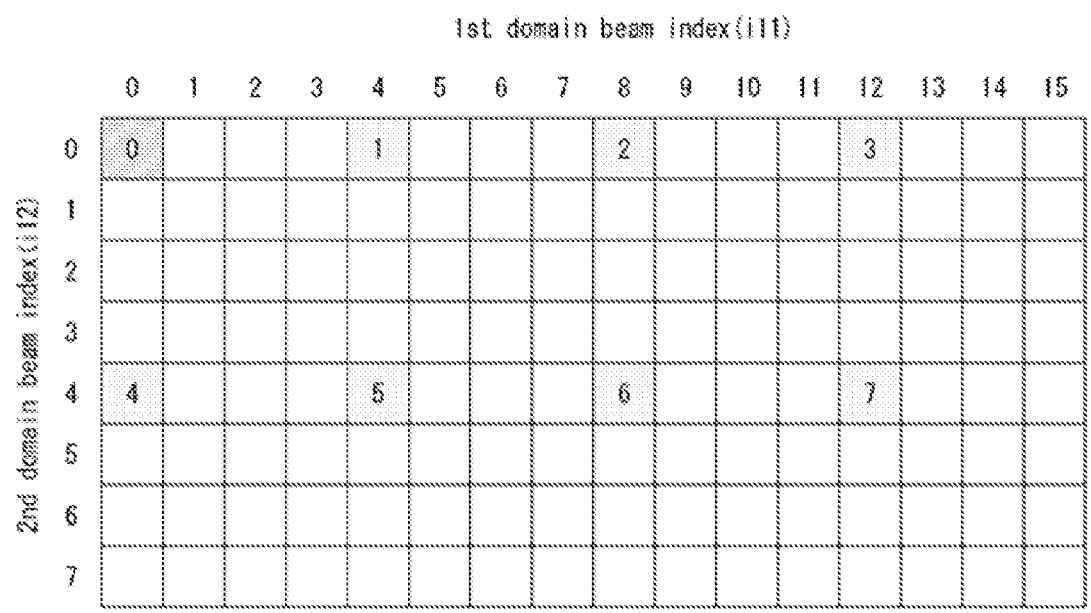

[FIG. 28]
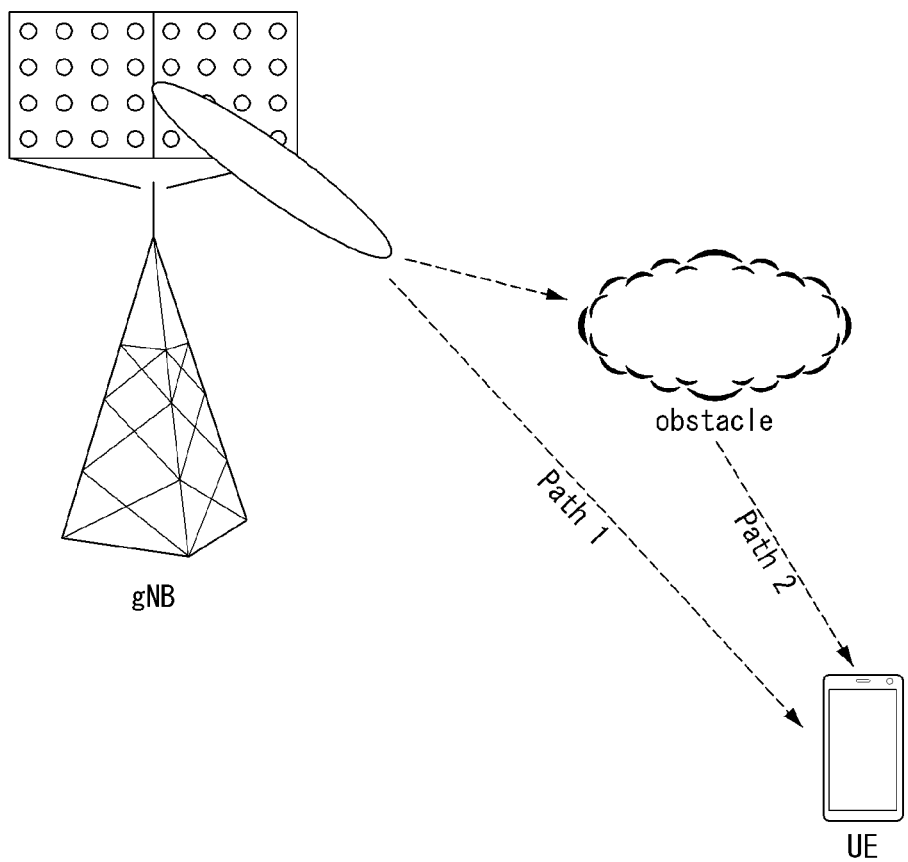
[FIG. 29]
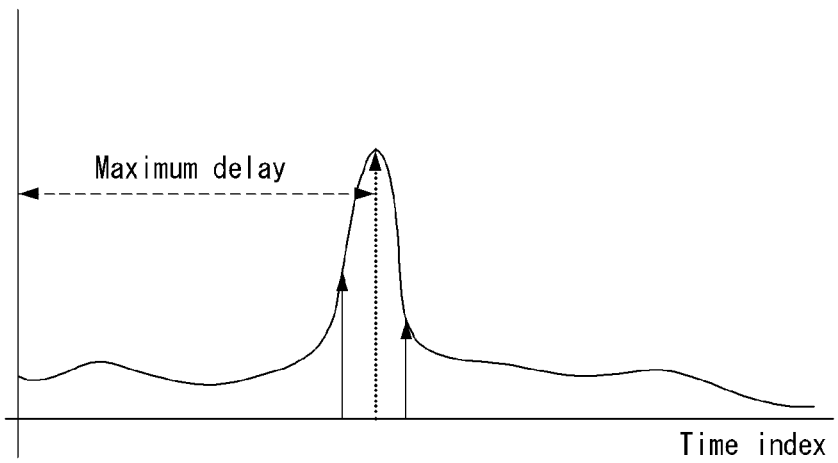

[FIG. 30]
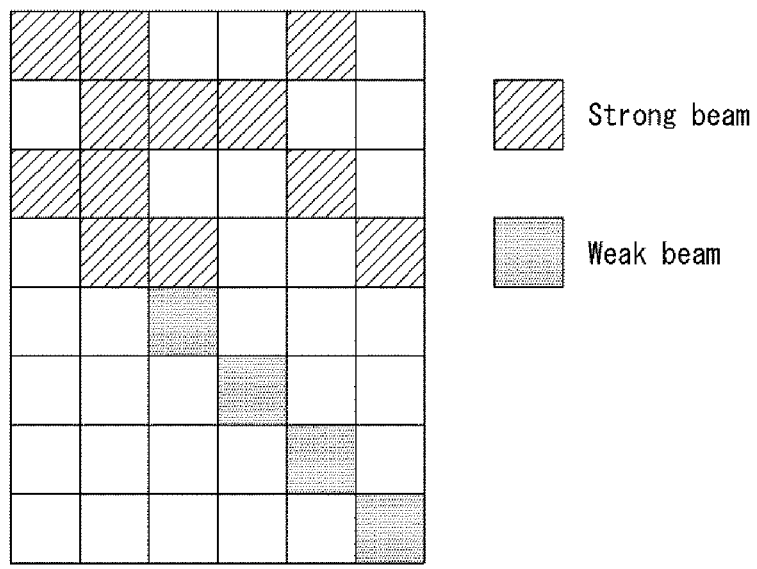
[FIG. 31]
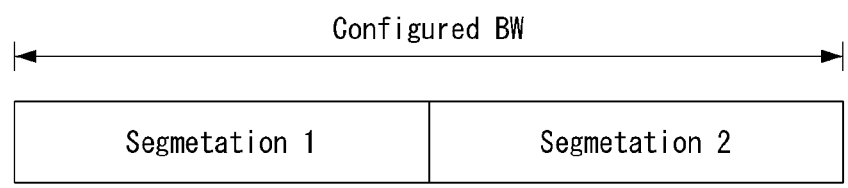

[FIG. 32]
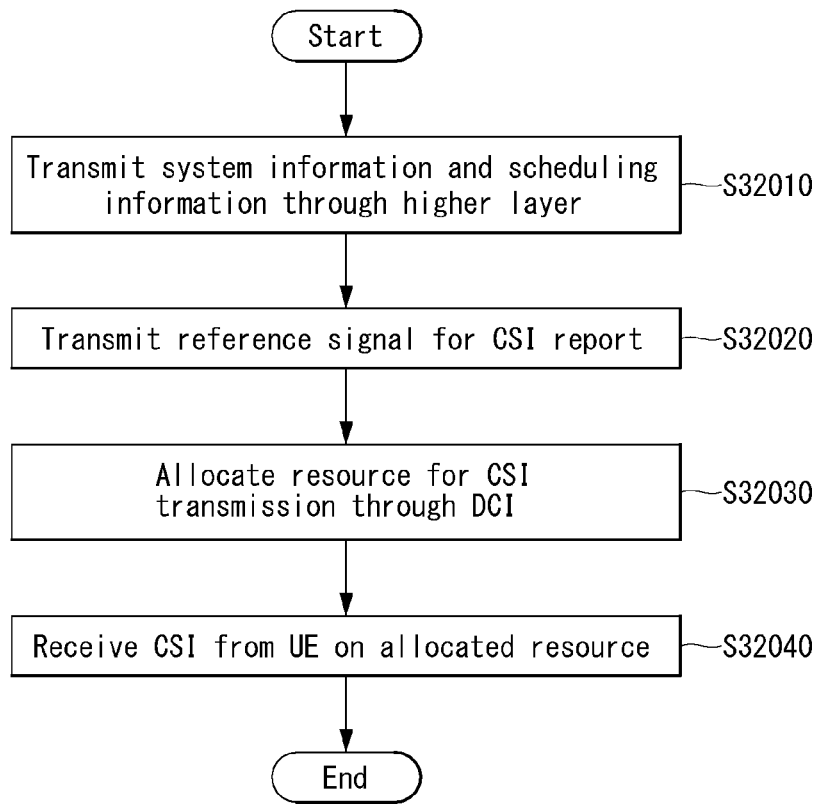

[FIG. 33]
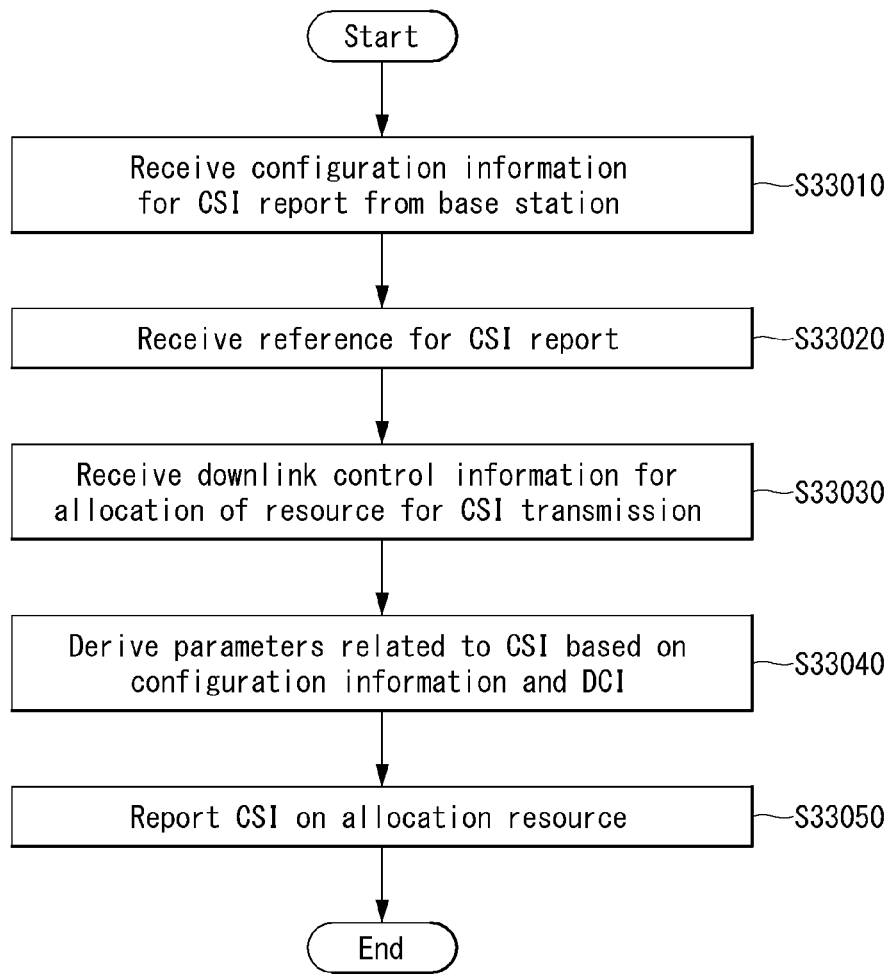

[FIG. 34]
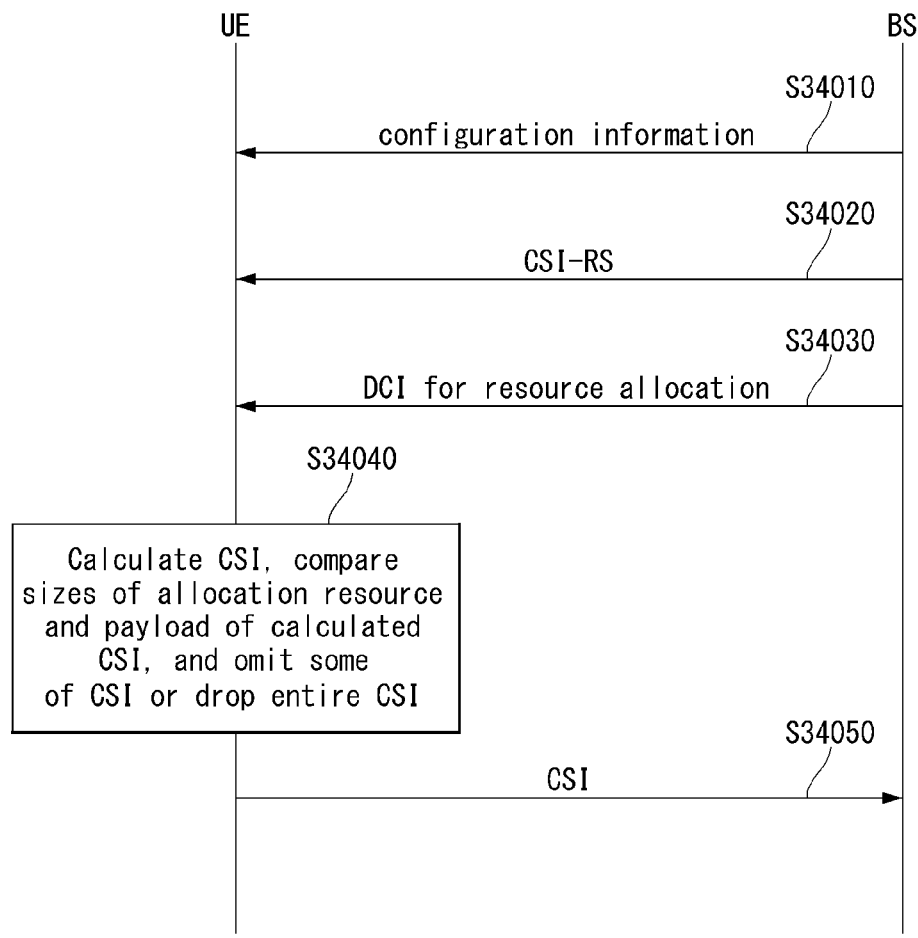

[FIG. 35]
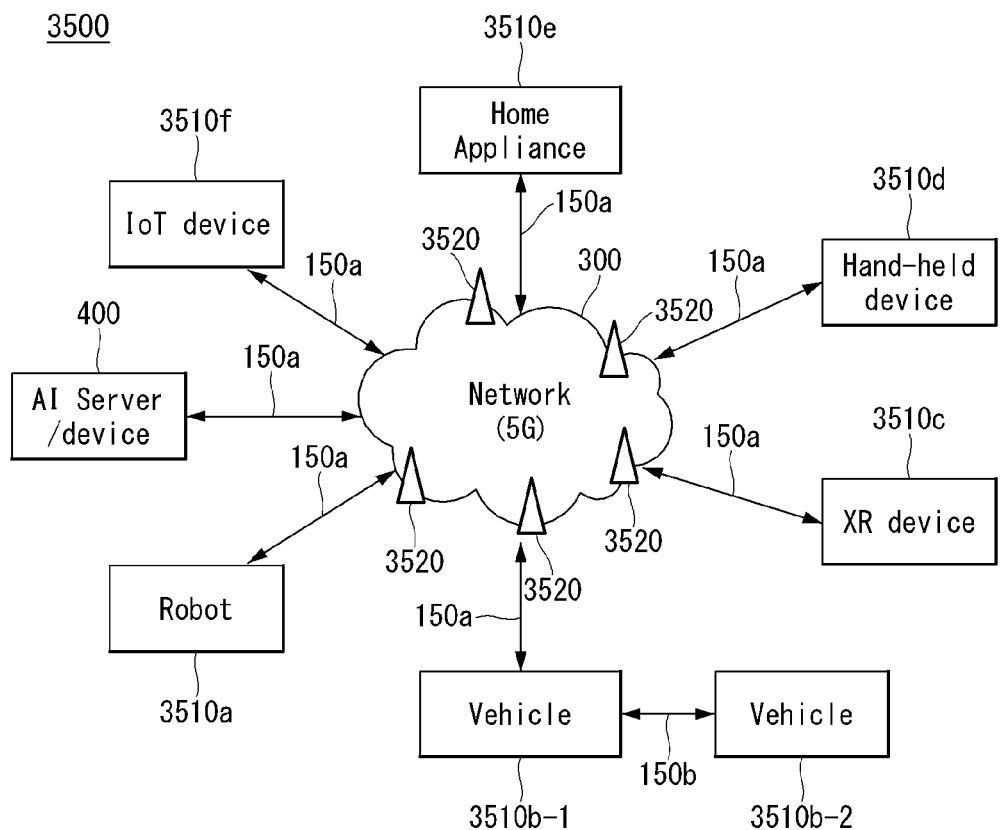
[FIG. 36]
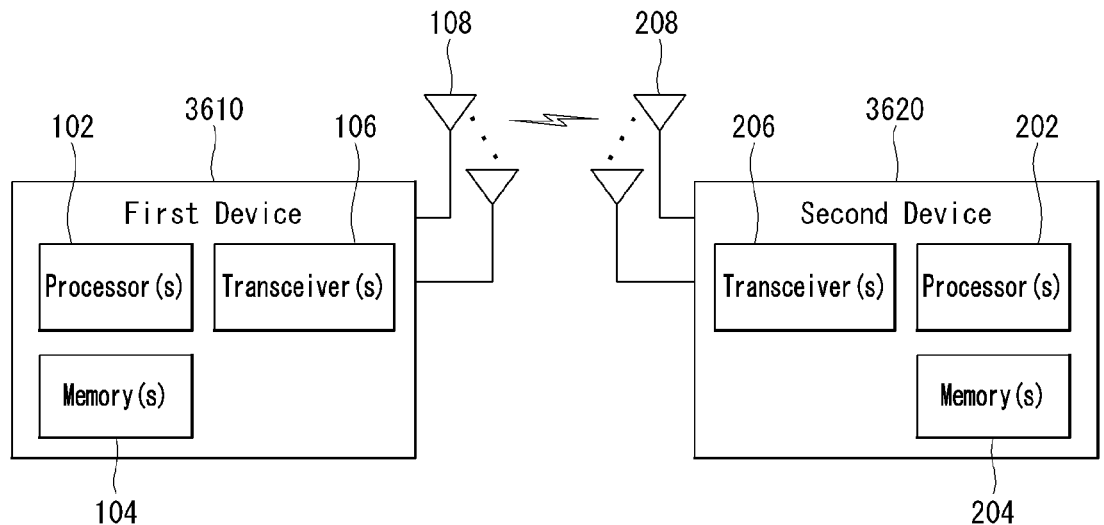

[FIG. 37]
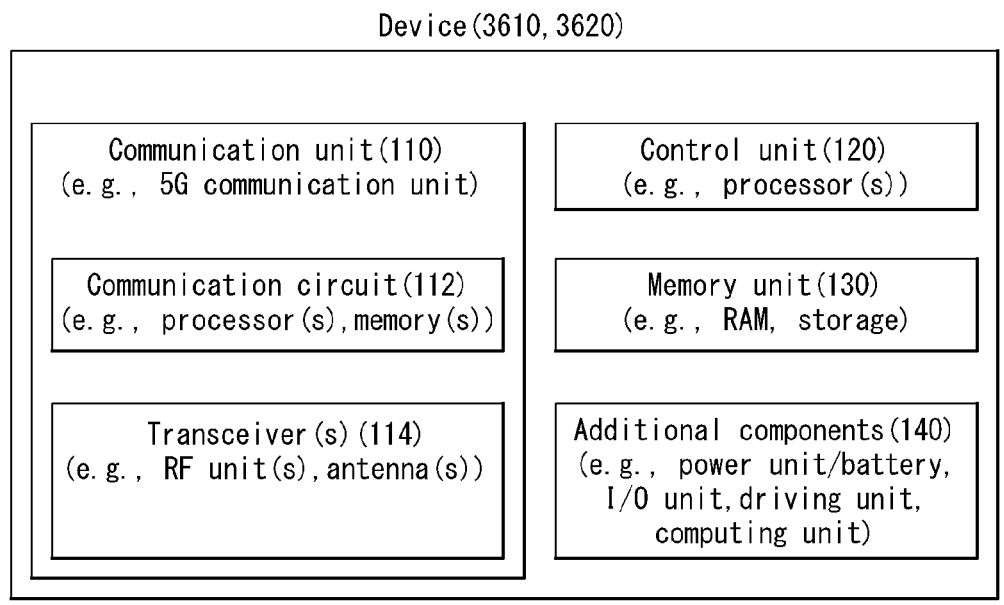
[FIG. 38]
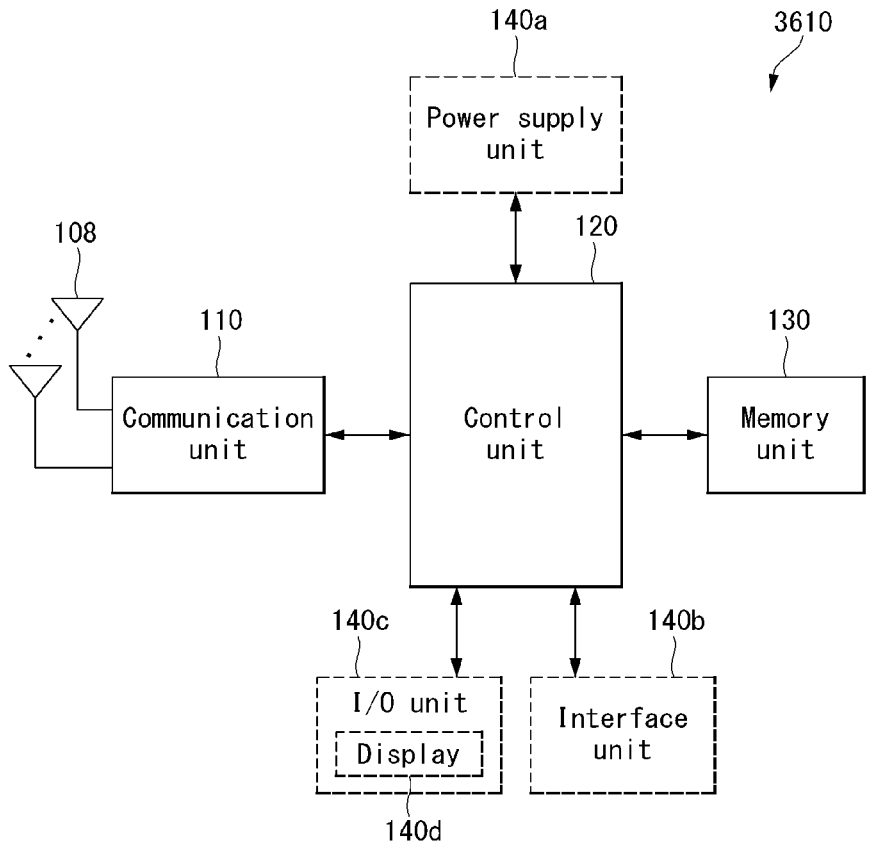

[FIG. 39]
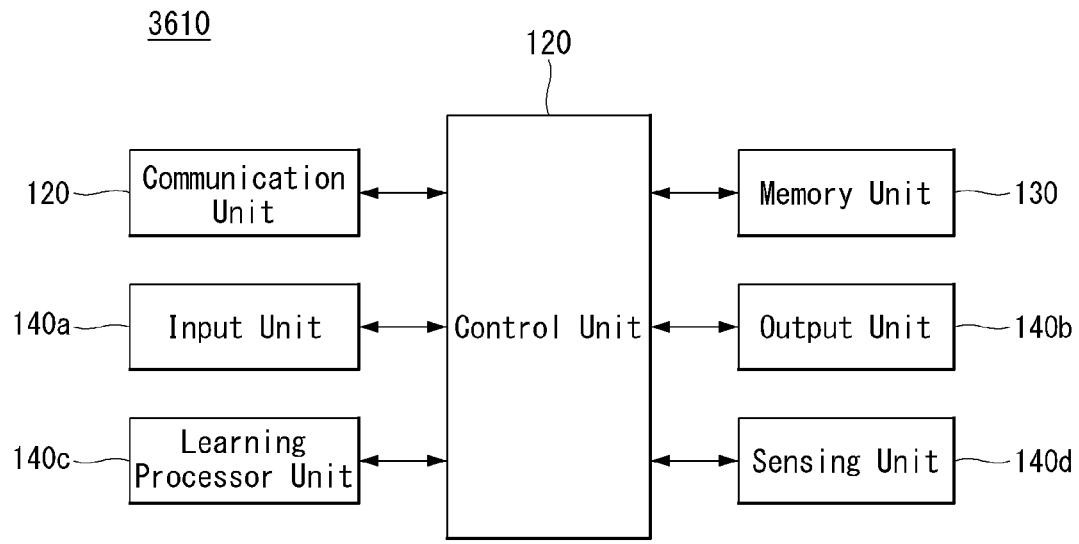
[FIG. 40]
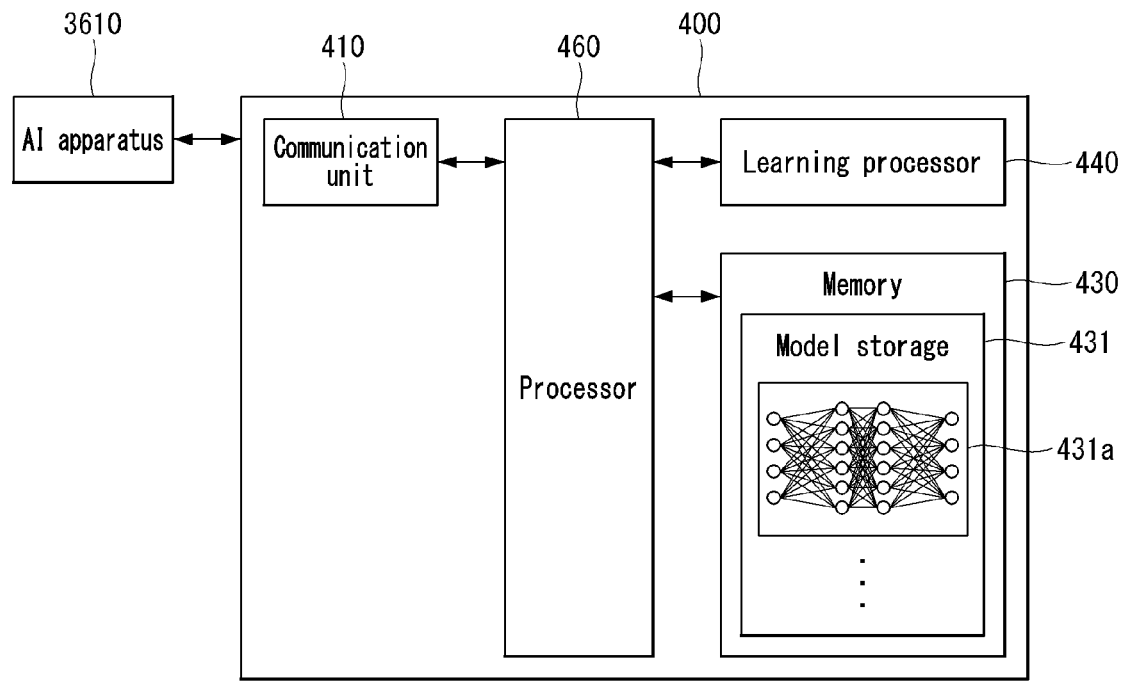

[FIG. 41]
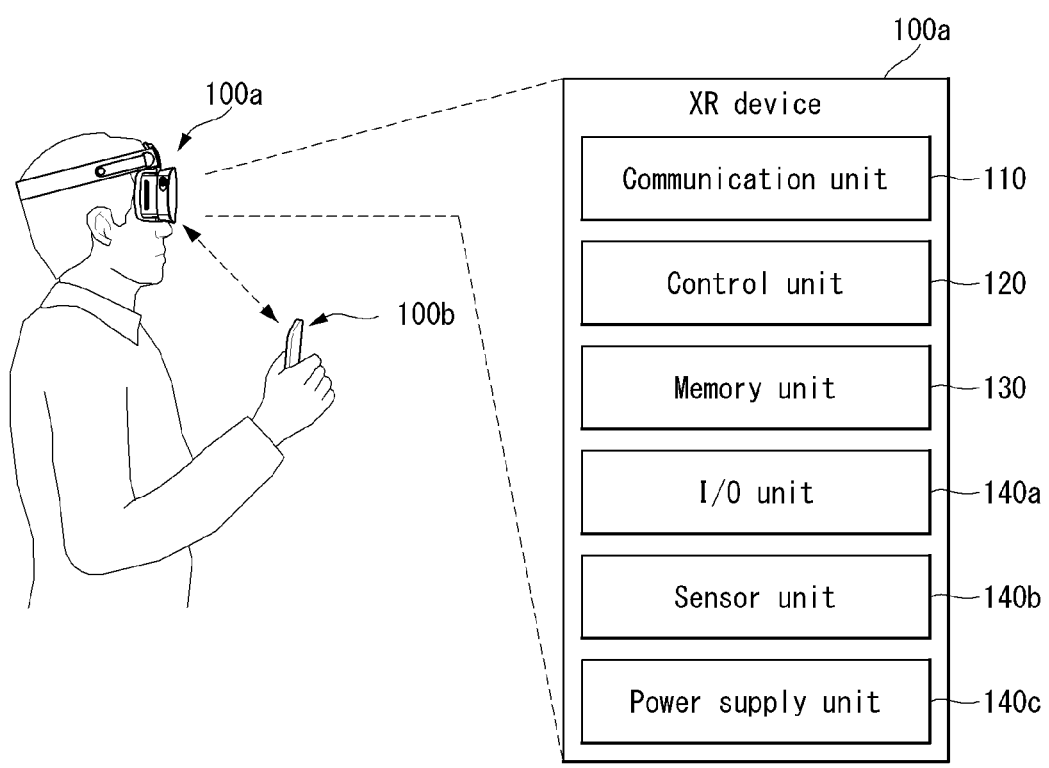

METHOD FOR REPORTING CHANNEL STATE INFORMATION IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2019/014777, filed on Nov. 4, 2019, which claims the benefit of earlier filing date and right of priority to Korean Application No. 10-2018-0133977, filed on Nov. 2, 2018, and also claims the benefit of U.S. Provisional Application No. 62/791,557, filed on Jan. 11, 2019, and 62/806,674, filed on Feb. 15, 2019, the contents of which are all incorporated by reference herein in their entireties.

TECHNICAL FIELD

The present disclosure relates to a wireless communication system, and more particularly, to a method for transmitting and receiving channel state information in a wireless communication system and an apparatus therefor.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements for a next-generation mobile communication system include the accommodation of explosive data traffic, a significant increase in the transfer rate per user, the accommodation of the considerably increased number of connection devices, very low end-to-end latency, and high energy efficiency. To this end, there have been researched various technologies, such as dual connectivity, massive multiple input multiple output (MIMO), in-band full duplex, non-orthogonal multiple access (NOMA), super wideband, device networking, and the like.

DISCLOSURE

Technical Problem

An object of the present disclosure is to provide a method and apparatus for transmitting and receiving channel state information (CSI) in a wireless communication system.

Furthermore, the present disclosure provides a method of omitting or compressing channel state information (CSI) when the size of CSI calculated or obtained based a set parameter is greater than an allocated resource in the transmission of the CSI by a UE.

Furthermore, the present disclosure provides a method of omitting some or all of a plurality of parameters configuring CSI when a resource allocated for CSI transmission is smaller than the size of calculated CSI.

The technical purposes to be achieved in the present disclosure are not limited to the technical purposes as mentioned above. Other technical purposes as not mentioned will be clearly understood by those of ordinary skill in the technical field to which the present disclosure belongs from the following description.

Technical Solution

In order to solve the above technical problem, a method for transmitting channel state information (CSI) by a user equipment (UE) in a wireless communication system, according to an embodiment of the present disclosure, comprising, receiving configuration information for CSI reporting from a base station, wherein the configuration information includes a plurality of codebook parameters for calculating the CSI; receiving, from the base station, a reference signal based on the configuration information; calculating CSI for a specific channel based on the configuration information and the DCI, wherein CSI is calculated based on a compression method in a time domain or a frequency domain by the plurality of codebook parameters; and reporting the calculated CSI to the base station, wherein the CSI consists of a first part and a second part, wherein when a capacity of a resource allocated for transmitting the CSI is smaller than a size of a payload of the CSI calculated based on the plurality of parameters, the size of the payload of the second part is reduced by applying at least one parameter until the size of the payload of the CSI becomes smaller than the capacity of the resource.

Furthermore, in the present disclosure, wherein the size of the payload of the second part is reduced by decreasing a value of the at least one parameter.

Furthermore, in the present disclosure, wherein a specific parameter among the at least one parameter decreases as a specific value used for calculating the specific parameter decreases, wherein the size of the payload of the second part is decreased according to a specific rule as the value of the specific parameter is decreased.

Furthermore, in the present disclosure, herein the at least one parameter is sequentially decreased or decreased according to a specific rule.

Furthermore, in the present disclosure, wherein the configuration information includes a set consisting of decreasing values of the at least one parameter.

Furthermore, in the present disclosure, wherein the first part includes a rank indicator (RI), a channel quality indicator (CQI), and an indicator indicating a number of non-zero amplitude coefficients, and wherein the second part includes a precoding matrix indicator (PMI).

Furthermore, in the present disclosure, wherein the at least one parameter includes at least one of a value for determining a dimension of a compressed coefficient matrix, a number of combining coefficients for calculating the PMI, a size of a fast Fourier transform (FFT), oversampling information, or a number of selected beams among a plurality of beams for calculating the PMI.

Furthermore, in the present disclosure, wherein a value of the at least one parameter for reducing the size of the payload of the second part is determined by the UE.

Furthermore, in the present disclosure, wherein the configuration information includes the at least one parameter.

Furthermore, in the present disclosure, wherein the PMI is generated based on values for determining a dimension of a basis matrix and a compressed coefficient matrix.

Furthermore, in the present disclosure, wherein a specific matrix consisting of a specific number of rows among a plurality of columns constituting the basic matrix is generated based on an over-sampling or under-sampling method.

Furthermore, in the present disclosure, wherein the configuration information includes restriction information for restricting a number of beams combined to calculate the PMI included in the second part.

Furthermore, in the present disclosure, wherein a parameter related to a beam or an RI corresponding to a specific bit of the restriction information is not included in the CSI.

Furthermore, in the present disclosure, wherein the CSI is compressed on the time domain or the frequency domain.

Furthermore, in the present disclosure, A user equipment (UE) for transmitting channel state information (CSI) in a wireless communication system, the UE, comprising, A radio frequency (RF) module for transmitting and receiving radio signals; and a processor for controlling the RF module, wherein the processor configured to: receive configuration information for CSI reporting from a base station, wherein the configuration information includes a plurality of codebook parameters for calculating the CSI; receive, from the base station, a reference signal based on the configuration information; calculate CSI for a specific channel based on the configuration information and the DCI, wherein CSI is calculated based on a compression method in a time domain or a frequency domain by the plurality of codebook parameters; and report the calculated CSI to the base station, wherein the CSI consists of a first part and a second part, wherein when a capacity of a resource allocated for transmitting the CSI is smaller than a size of a payload of the CSI calculated based on the plurality of parameters, the size of the payload of the second part is reduced by applying at least one parameter until the size of the payload of the CSI becomes smaller than the capacity of the resource.

Advantageous Effects

According to an embodiment of the present disclosure, there are effects in that a payload of CSI can be reduced and the degradation of performance can be minimized by omitting or compressing some or all of the CSI according to a specific rule when the size of calculated CSI is greater than an allocated resource in reporting the CSI.

Furthermore, according to an embodiment of the present disclosure, there is an effect in that CSI can be reported although the capacity of an allocated resource is not sufficient for reporting the CSI by omitting some or all of parameters configuring the CSI based on priority.

Furthermore, in an embodiment of the present disclosure, there is an effect in that CSI can be reported when the capacity of an allocated resource is smaller than the size of a payload of the CSI by compressing the CSI in a time domain or a frequency domain.

Effects which may be obtained from the present disclosure are not limited to the effects mentioned above. Other effects not mentioned may be clearly understood by a person having ordinary knowledge in the technical field to which the present disclosure belongs from the following description.

DESCRIPTION OF DRAWINGS

The accompanying drawings, which are included as part of the detailed description to help understand the present disclosure, provide embodiments of the present disclosure, and describe technical features of the present disclosure together with the detailed description FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed in the present disclosure is applicable.

FIG. 3 illustrates an example of a resource grid supported in a wireless communication system to which a method proposed in the present disclosure is applicable.

FIG. 4 illustrates examples of a resource grid for each antenna port and numerology to which a method proposed in the present disclosure is applicable.

FIG. 5 is a diagram illustrating an example of a self-contained slot structure to which a method proposed in the present disclosure is applicable.

FIG. 6 illustrates a transceiver unit model in the wireless communication system to which the method proposed in the present disclosure is applicable.

FIG. 7 is a diagram illustrating a hybrid beamforming structure in terms of TXRU and a physical antenna in the wireless communication system to which the method proposed in the present disclosure is applicable.

FIG. 8 is a diagram illustrating an example of a beam sweeping operation to which the method proposed in the present disclosure is applicable.

FIG. 9 is a diagram illustrating an example of an antenna array to which the method proposed in the present disclosure is applicable.

FIG. 10 is a diagram illustrating an example of a beam used for beam management.

FIG. 11 is a flowchart showing an example of a downlink beam management procedure.

FIG. 12 illustrates an example of a downlink beam management procedure using a channel status information reference signal.

FIG. 13 is a flowchart showing an example of a receive beam determination process of a UE.

FIG. 14 is a flowchart showing an example of a transmit beam determination process of a BS.

FIG. 15 illustrates an example of resource allocation in time and frequency domains related to a DL BM procedure using a CSI-RS.

FIG. 16 illustrates an example of an uplink beam management procedure using a sounding reference signal (SRS).

FIG. 17 is a flowchart showing an example of an uplink beam management procedure using the SRS.

FIG. 18 is a flowchart showing an example of a method of performing an Idle mode DRX operation.

FIG. 19 is a diagram illustrating an example of an Idle mode DRX operation.

FIG. 20 is a flowchart showing an example of a method of performing a C-DRX operation.

FIG. 21 is a diagram illustrating an example of a C-DRX operation.

FIG. 22 is a diagram illustrating an example of power consumption depending on a state of a UE.

FIG. 23 is a flowchart illustrating an example of a CSI related procedure to which the method proposed in the present specification may be applied.

FIG. 24 illustrates an example of an information payload of PUSCH based CSI reporting.

FIG. 25 illustrates an example of an information payload of short PUCCH based CSI reporting.

FIG. 26 illustrates an example of an information payload of long PUCCH based CSI reporting.

FIG. 27 illustrates an example of an orthogonal beam set to which a method proposed in the present disclosure may be applied.

FIG. 28 illustrates an example of a multi-path which may occur when data is transmitted to which a method proposed in the present disclosure may be applied.

FIG. 29 illustrates an example of a signal in a time domain to which a method proposed in the present disclosure may be applied.

FIG. 30 is a diagram illustrating an example of the locations of non-zero coefficients, which is proposed in the present disclosure.

FIG. 31 is a diagram illustrating an example of CSI consisting of two parts, which is proposed in the present disclosure.

FIG. 32 is a flowchart illustrating an example of a method of receiving, by a base station, CSI, which is proposed in the present disclosure.

FIG. 33 is a flowchart illustrating an example of a method of transmitting, by a UE, CSI, which is proposed in the present disclosure.

FIG. 34 is a flowchart illustrating an example of a procedure for reporting CSI, which is proposed in the present disclosure.

FIG. 35 is a diagram illustrating an example of a communication system applied to the present disclosure.

FIG. 36 illustrates one example of a wireless device applicable to the present disclosure.

FIG. 37 illustrates another example of the wireless device applicable to the present disclosure.

FIG. 38 is a diagram illustrating a hand-held device applicable to the present disclosure.

FIG. 39 is a diagram illustrating an AI device to which a method proposed in the present disclosure is applicable.

FIG. 40 is a diagram illustrating an AI server to which a method proposed in the present disclosure is applicable.

FIG. 41 illustrates an XR device applied to the present disclosure.

MODE FOR INVENTION

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciate that the present disclosure may be practiced without these specific details.

In some cases, in order to avoid obscuring the concept of the present disclosure, well-known structures and devices may be omitted, or may be illustrated in a block diagram form centering on core capabilities of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

5G new radio (5G NR) defines enhanced mobile broadband (eMBB), massive machine type communications (mMTC), Ultra-Reliable and Low Latency Communications (URLLC), vehicle-to-everything (V2X) according to a usage scenario.

In addition, the 5G NR standard is classified into standalone (SA) and non-standalone (NSA) according to co-existence between the NR system and the LTE system.

In addition, the 5G NR supports various subcarrier spacings, and supports CP-OFDM in downlink and CP-OFDM and DFT-s-OFDM (SC-OFDM) in uplink.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

In addition, in the present disclosure, "A and/or B" may be interpreted as the same meaning as "including at least one of A or B".

Definition of Terms eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: It corresponds to one subcarrier spacing in the frequency domain. By scaling the reference subcarrier spacing to an integer N, different numerology can be defined.

NR: NR Radio Access or New Radio

System General

FIG. 1 illustrates an example of an overall structure of a new radio (NR) system to which a method proposed by the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | Δf = $2^μ · 15$ [kHz] | Cyclic prefix |
|---|---|---|
| 0 | 15 | Normal |
| 1 | 30 | Normal |
| 2 | 60 | Normal, Extended |
| 3 | 120 | Normal |

TABLE 1-continued

| μ | Δf = $2^μ · 15$ [kHz] | Cyclic prefix |
|---|---|---|
| 4 | 240 | Normal |
| 5 | 480 | Normal |

NR supports multiple numerology (or subcarrier spacing (SCS)) to support various 5G services. For example, when the SCS is 15 kHz, When the SCS is 30 kHz/60 kHz, dense-urban, lower latency and wider carrier bandwidth are supported, it supports is dense-urban, lower latency, and when the SCS is 60 kHz or higher, a bandwidth greater than 24.25 GHz is supported to overcome phase noise.

The NR frequency band is defined as a frequency range of two types (FR1, FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$, where $\Delta f_{max}=480 \cdot 10^3$, and $N_f=4096$. Downlink and uplink transmissions are organized into radio frames with a duration of $T_f=(\Delta f_{max} N_f/100) \cdot T_s=10$ ms. The radio frame consists of ten subframes each having a section of $T_{sf}=(\Delta f_{max} N_f/1000) \cdot T_s=1$ ms. In this case, there may be a set of frames in the uplink and a set of frames in the downlink.

FIG. 2 illustrates a relation between a UL frame and a DL frame in a wireless communication system to which a method proposed by the disclosure is applicable.

As illustrated in FIG. 2, a UL frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe, and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 3 represents the number of OFDM symbols $N_{symb}^{slot}$ per slot in a normal CP, the number of slot $N_{slot}^{frame,\mu}$ per radio frame and the number of slot $N_{slot}^{subframe,\mu}$ per subframe, and Table 4 represents the number of OFDM symbols in an extended CP, the number of slot per radio frame and the number of slot per subframe.

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 4

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the disclosure may be applied.

Referring to FIG. 3, a resource grid is composed of $N_{RB}^{\mu}N_{sc}^{RB}$ subcarriers in a frequency domain, each subframe composed of 14·2μ OFDM symbols, but the disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols. Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, shown as FIG. 4, one resource grid may be configured for the numerology μ and an antenna port p.

FIG. 4 shows examples of an antenna port and a resource grid for each neurology to which the method proposed in the present disclosure may be applied.

Each element of the resource grid for the numerology μ and the antenna port p is indicated as a resource element, and may be uniquely identified by an index pair (k, Ī). Herein, k=0, . . . , $N_{RB}^{\mu}N_{sc}^{RB}$−1 is an index in the frequency domain, and Ī=0, . . . , $2^{\mu}N_{symb}^{(\mu)}$−1 indicates a location of a symbol in a subframe. To indicate a resource element in a slot, the index pair (k, Ī) is used. Herein, l=0, . . . , $N_{symb}^{\mu}$−1.

The resource element (k, Ī) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}$=12 continuous subcarriers in the frequency domain. In the frequency domain, physical resource blocks may be numbered from 0 to $N_{RB}^{\mu}$−1. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}$−1 in the frequency region.

Self-Contained Slot Structure

In order to minimize the latency of data transmission in the TDD system, the 5th generation New RAT (NR) considers the self-contained slot structure as shown in FIG. 8.

That is, FIG. 5 is a diagram showing an example of a self-contained slot structure to which the method proposed according to the present disclosure may be applied.

In FIG. 5, a shaded region 510 represents a downlink control region, and a black region 520 represents an uplink control region.

A blank region 530 may be used for downlink data transmission, or may be used for uplink data transmission.

The feature of this structure is that DL transmission and UL transmission are sequentially performed within one slot, and DL data is transmitted and UL Ack/Nack is transmitted and received within one slot.

Such a slot may be defined as a 'self-contained slot'.

That is, using this slot structure, the base station may reduce a time consumed to retransmit data to the user equipment when a data transmission error occurs, and thus may minimize the latency of the final data transfer.

This self-contained slot structure requires a time gap for which the base station and the user equipment switch from a transmission mode to a reception mode or switch from a reception mode to a transmission mode.

To this end, in the corresponding slot structure, some OFDM symbols at the time of switching from DL to UL are set as a guard period (GP).

Analog Beamforming

Since a wavelength is short in a Millimeter Wave (mmW) range, a plurality of antennas may be installed in the same size of area. That is, a wavelength in the frequency band 30 GHz is 1 cm, and thus, 64 antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

FIG. 6 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 6(a), or as a TXRU virtualization model option-2: full-connection model as shown in FIG. 6(b).

Referring to FIG. 6(a), in the sub-array partition model, the antenna elements are divided into multiple antenna element groups, and each TXRU may be connected to one of the multiple antenna element groups. In this case, the antenna elements are connected to only one TXRU.

Referring to FIG. 6(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 6, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M TXRU number of TXRUs.

Herein, mapping of the antenna ports and TXRUs may be performed on the basis of 1-to-1 or 1-to-many.

TXRU-to-element mapping In FIG. 6 is merely an example, and the present disclosure is not limited thereto and may be equivalently applied even to mapping of TXRUs and antenna elements which can be implemented in a variety of hardware forms.

In the next system (e.g., 5G), depending on the application field and/or the type of traffic, the UE does not receive the UL grant before performing the uplink transmission and performs uplink transmission in a semi-persistent resource and it is possible to perform a configured grant transmission. In addition, in the existing system, that is, LTE, a similar operation is possible in DL and UL through semi-persistent scheduling (SPS). In the configured grant transmission, a radio resource which different UEs share based on a contention or a radio resource dedicatedly allocated to the UE may be used. For the configured grant transmission, since a UL grant receiving operation is not required prior to the transmission, the radio resources may be utilized in a service or traffic of a field requiring a lower latency time. It is considered that the radio resource used for the configured grant transmission uses a different modulation and coding scheme or a different transmission block size or a different transmission time interval (TT) from a radio resource allocated through the UL grant. The UE may be allocated with one or multiple radio resources for the configured grant transmission. Multiple radio resources used for the configured grant transmission may be have the same or different size or modulation encoding scheme, time and/or frequency scheduling units and overlapping may be allowed. A method in which the UE attempts to transmit the same data several times in order to increase a success rate of the configured grant transmission is also considered. In the next system, a separated RRC configuration may be performed for configured grant transmission.

Further, in a New RAT system, when multiple antennas are used, a hybrid beam forming technique combining digital beam forming and analog beam forming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRU) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

FIG. 7 is a diagram illustrating a hybrid beamforming structure in terms of TXRU and a physical antenna in the wireless communication system to which the method proposed in the present disclosure may be applied.

In FIG. 7, a case where the number of digital beams is L and the number of analog beams is N is illustrated.

In the New RAT system, considered is a direction in which it is designed so that the BS may change the analog beamforming by the unit of the symbol to support more efficient beamforming to a UE positioned in a specific region. Furthermore, in FIG. 7, when N specific TXRUs and M specific RF antennas are defined as one antenna panel, a scheme that introduces a plurality of antenna panels capable of independent hybrid beamforming is also considered in the New RAT system.

Feedback of Channel State Information (CSI)

In a 3GPP LTE/LTE-A system, user equipment (UE) is defined to report channel state information (CSI) to a base station (BS or eNB).

The CSI collectively refers to information that can indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that can be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Virtualization of Reference Signal (RS)

In the mmW, it is possible to transmit a PDSCH only in one analog beam direction at a time by analog beamforming. In this case, data transmission from the BS is possible only to a small number of UEs in the corresponding direction. Therefore, if necessary, the analog beam direction is differently configured for each antenna port so that data transmission can be simultaneously performed to a plurality of UEs in several analog beam directions.

FIG. 8 is a diagram illustrating an example of a beam sweeping operation to which the method proposed in the present disclosure may be applied.

As described in FIG. 7, when the BS uses a plurality of analog beams, a beam sweeping operation is considered, which allows all UEs to have a reception opportunity by changing a plurality of analog beams to which the BS intends to apply in a specific subframe according to the symbol at least with respect to a synchronization signal, system information, and a paging signal because an analog beam which is advantageous for signal reception for each UE.

FIG. 8 illustrates an example of a beam sweeping operation for a synchronization signal and system information in a downlink transmission process. In FIG. 8, a physical resource (or physical channel) through which the system information is transmitted in a broadcasting scheme in the New RAT is referred to as physical broadcast channel (xPBCH).

In this case, analog beams belonging to different antenna panels within one symbol may be simultaneously transmitted and discussed is a scheme that introduces a beam reference signal (BRS) which is a reference signal transmitted, to which a single analog beam (corresponding to a specific antenna panel) is applied as illustrated in FIG. 7 to measure channels depending on the analog beam.

The BRS may be defined for a plurality of antenna ports and each antenna port of the BRS may correspond to the single analog beam.

In this case, unlike the BRS, the synchronization signal or xPBCH may be transmitted, to which all of the analog beams in the analog beam group are applied so that the signal may be well received by random UEs.

RRM Measurement

The LTE system supports RRM operations including power control, scheduling, cell search, cell reselection, handover, radio link or connection monitoring, connection establishment/re-establishment, and the like.

In this case, the serving cell may request RRM measurement information, which is a measurement value for performing the RRM operations, to the UE.

For example, the UE may measure information including cell search information for each cell, reference signal received power (RSRP), reference signal received quality (RSRQ), and the like and report the measured information to the BS.

Specifically, in the LTE system, the UE receives 'measConfig' as a higher layer signal for RRM measurement from the serving cell. The UE measures the RSRP or RSRQ according to 'measConfig'.

The RSRP, the RSRQ, and the RSSI are defined as below.
RSRP: The RSRP may be defined as a linear average of a power contribution [W] of a resource element carrying a cell specific reference signal within a considered measurement frequency bandwidth. A cell specific reference signal R0 may be used for deciding the RSRP. When the UE may reliably detect that R1 is available, the UE may decide the RSRP by using R1 in addition to R0.

A reference point of the RSRP may be an antenna connector of the UE.

When receiver diversity is used by the UE, a reported value need not be smaller than the RSRP corresponding to a random individual diversity branch.

RSRQ: The reference signal received quality (RSRQ) is defined as a ratio N×RSRP/(E-UTRA carrier RSSI) and N represents the number of RBs of an E-UTRA carrier RSSI measurement bandwidth. Measurements of numerator and denominator should be performed through the same set of resource blocks.

The E-UTRA carrier received signal strength indicator (RSSI) is received through a block by the UE from all sources including N resource adjacent channel interference, thermal noise, etc., in a linear average of the total received power [W] measured only in an OFDM symbol containing a reference symbol for antenna port 0 and a measurement bandwidth.

When the higher layer signaling represents a specific subframe for performing the RSRQ measurement, the RS SI is measured for all OFDM symbols in the indicated subframe.

The reference point for THE RSRQ should be the antenna connector of the UE.

When the receiver diversity is used by the UE, the reported value should not be smaller than the corresponding RSRQ of the random individual diversity branch.

RSSI: The RSSI means received broadband power including thermal noise and noise generated at the receiver within a bandwidth defined by a receiver pulse shaping filter.

The reference point for measuring the RSSI should be the antenna connector of the UE. When the receiver diversity is used by the UE, the reported value should not be smaller than the corresponding UTRA carrier RSSI of the random individual receive antenna branch.

According to such a definition, the UE which operates in the LTE system may be allowed to measure the RSRP in a bandwidth corresponding to one of 6, 15, 25, 50, 75, and 100 resource blocks (RBs) through an information element (IE) related with an allowed measurement bandwidth transmitted system information block type 3 (SIB3) in the case of intra-frequency measurement and through an allowed measurement bandwidth transmitted in SIBS in the case of inter-frequency measurement.

Alternatively, in the absence of such an IE, the measurement may be performed in a frequency band of the entire downlink (DL) system by default. In this case, when the UE receives the allowed measurement bandwidth, the UE may consider the corresponding value as a maximum measurement bandwidth and arbitrarily measure the value of the RSRP within the corresponding value.

However, when the serving cell transmits an IE defined as WB-RSRQ and the allowed measurement bandwidth is set to 50 RB or more, the UE needs to calculate the RSRP value for the entire allowed measurement bandwidth. Meanwhile, the RSSI may be measured in the frequency band of the receiver of the UE according to the definition of the RSSI bandwidth.

FIG. 9 is a diagram illustrating an example of an antenna array to which the method proposed in the present disclosure may be applied.

Referring to FIG. 9, the normalized panel antenna array may be constituted by Mg panels and Ng panels in a horizontal domain and a vertical domain, respectively.

In this case, one panel is constituted by M columns and N rows, respectively, and an X-pol antenna is assumed in FIG. 9. Therefore, the total number of antenna elements may be 2*M*N*Mg*Ng.

Beam Management (BM)

A BM procedure as layer 1 (L1)/layer 2 (L2) procedures for acquiring and maintaining a set of base station (e.g., gNB, TRP) and/or terminal (e.g., UE) beams which may be used for downlink (DL) and uplink (UL) transmission/reception may include the following procedures and terms.

Beam measurement: Operation of measuring characteristics of a received beamforming signal by the BS or UE.

Beam determination: Operation of selecting a transmit (Tx) beam/receive (Rx) beam of the BS or UE by the BS or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS).

Further, each BM procedure may include Tx beam sweeping for determining the Tx beam and Rx beam sweeping for determining the Rx beam.

Downlink Beam Management (DL BM)

FIG. 10 is a diagram illustrating an example of a beam used for beam management.

The DL BM procedure may include (1) the transmission of beamformed DL reference signals (RSs) (e.g., CIS-RS or SS Block (SSB)) of the eNB and (2) the beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

As illustrated in FIG. 10, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping.

The Rx beam sweeping using the SSB may be performed while the UE changes the Rx beam for the same SSBRI across multiple SSB bursts. Here, one SS burst includes one or more SSBs and one SS burst set includes one or more SSB bursts.

DL BM Using SSB

FIG. 11 is a flowchart showing an example of a downlink beam management procedure.

A configuration for beam report using the SSB is performed during a CSI/beam configuration in an RRC connected state (or RRC connected mode).

The UE receives from the BS CSI-ResourceConfig IE including CSI-SSB-ResourceSetList including SSB resources used for the BM (S1110).

Table 5 shows an example of CSI-ResourceConfig IE and as shown in Table A, a BM configuration using the SSB is not separately defined and the SSB is configured like the CSI-RS resource.

TABLE 5

| | |
|---|---|
| -- ASN1START | |
| -- TAG-CSI-RESOURCECONFIG-START | |
| CSI-ResourceConfig ::= | SEQUENCE { |
|    csi-ResourceConfigId | CSI-ResourceConfigId, |
|    csi-RS-ResourceSetList | CHOICE { |
|       nzp-CSI-RS-SSB | SEQUENCE { |
|          nzp-CSI-RS-ResourceSetList | SEQUENCE (SIZE |

TABLE 5-continued

```
(1..maxNrofNZP-CSI-RS-ResourceSetsPerConfig)) OF NZP-CSI-RS-ResourceSetId
OPTIONAL,
        csi-SSB-ResourceSetList           SEQUENCE (SIZE (1..maxNrofCSI-
SSB-ResourceSetsPerConfig)) OF CSI-SSB-ResourceSetId OPTIONAL
    },
    csi-IM-ResourceSetList                SEQUENCE (SIZE (1..maxNrofCSI-IM-
ResourceSetsPerConfig)) OF CSI-IM-ResourceSetId
    },
    bwp-Id                                BWP-Id,
    resourceType                          ENUMERATED { aperiodic, semiPersistent,
periodic },
    ...
}
-- TAG-CSI-RESOURCECONFIGTOADDMOD-STOP
-- ASN1STOP
```

In Table 5, csi-SSB-ResourceSetList parameter represents a list of SSB resources used for beam management and reporting in one resource set. Here, SSB resource set may be configured as {SSBx1, SSBx2, SSBx3, SSBx4, . . . }. The SSB index may be defined as 0 to 63.

The UE receives, from the BS, the SSB resource based on the CSI-SSB-ResourceSetList (S1120).

When CSI-RS reportConfig associated with reporting of SSBRI and L1-RSRP is configured, the UE (beam) reports to the BS best SSBRI and L1-RSRP corresponding thereto (S1130).

In other words, when reportQuantity of the CSI-RS reportConfig IE is configured as 'ssb-Index-RSRP', the UE reports to the BS best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

DL BM Using CSI-RS

In respect to a CSI-RS usage, i) when a repetition parameter is configured in a specific CSI-RS resource set and TRS_info is not configured, the CSI-RS is used for the beam management. ii) When the repetition parameter is not configured and TRS_info is configured, the CSI-RS is used for a tracking reference signal (TRS). iii) When the repetition parameter is not configured and TRS_info is not configured, the CSI-RS is used for CSI acquisition.

The repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none' and CSI-ResourceConfig (higher layer parameter resourcesForChannelMeasurement) for channel measurement includes not higher layer parameter 'trs-Info' but NZP-CSI-RS-ResourceSet in which higher layer parameter 'repetition' is configured, the UE may be configured only with the same number of port (1-port or 2-port) having higher layer parameter 'nrofPorts' for all CSI-RS resources in NZP-CSI-RS-ResourceSet.

When (higher layer parameter) repetition is configured to 'ON', (higher layer parameter) repetition is associated with the Rx beam sweeping procedure of the UE. In this case, when the UE is configured with NZP-CSI-RS-ResourceSet, the UE may assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted to different OFDM symbols. Further, the UE does not expect that different periodicities are received at periodicityAndOffset in all CSI-RS resources in NZP-CSI-RS-Resourceset.

On the contrary, when Repetition is configured to 'OFF', the Repetition is associated with the Tx beam sweeping procedure of the BS. In this case, when repetition is configured to 'OFF', the UE does not assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through different Tx beams.

FIG. 12 illustrates an example of a downlink beam management procedure using a Channel State Information-Reference Signal (CSI-RS).

FIG. 12(a) illustrates an Rx beam determination (or refinement) procedure of the UE and FIG. 12(b) illustrates a Tx beam sweeping procedure of the BS. Further, FIG. 12(a) illustrates a case where the repetition parameter is configured to 'ON' and FIG. 12(b) illustrates a case where the repetition parameter is configured to 'OFF'.

Referring to FIGS. 12(a) and 13, an Rx beam determination process of the UE will be described.

FIG. 13 is a flowchart showing an example of a receive beam determination process of a UE.

The UE receives, from the BS, NZP CSI-RS resource set IE including higher layer parameter repetition through RRC signaling (S1310). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the BS (S1320).

The UE determines the Rx beam thereof (S1330).

The UE skips CSI report (S1340). In this case, reportQuantity of CSI report config may be configured as 'No report (or None)'.

In other words, the UE may skip the CSI report when repetition 'ON' is configured.

Referring to FIGS. 12(b) and 14, a Tx beam determination process of the BS will be described.

FIG. 14 is a flowchart showing an example of a transmit beam determination process of a BS.

The UE receives, from the BS, NZP CSI-RS resource set IE including higher layer parameter repetition through RRC signaling (S1410). Here, the repetition parameter is configured to 'OFF' and associated with the Tx beam sweeping procedure of the BS.

The UE receives a resource(s) in CSI-RS resource set configured as repetition 'OFF' through different Tx beams (DL spatial domain transmission filters) of the eNB (S1420).

The UE selects (or determines) a best beam (S1430).

The UE reports to the BS an ID for the selected beam and related quality information (e.g., L1-RSRP) (S1440). In this case, reportQuantity of CSI report config may be configured as 'CRT+L1-RSRP'.

In other words, when the CSI-RS is transmitted for the BM, the UE reports to the BS the CRI and L1-RSRP therefor.

FIG. 15 illustrates an example of resource allocation in time and frequency domains related to a DL BM procedure using a CSI-RS.

Specifically, it can be seen that when repetition 'ON' is configured in the CSI-RS resource set, a plurality of CSI-RS resources is repeatedly used by applying the same Tx beam and when repetition 'OFF' is configured in the CSI-RS resource set, different CSI-RS resources are transmitted by different Tx beams.

DL BM Related Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 6 shows an example of TCI-State IE.

The TCI-State IE is associated with a quasi co-location (QCL) type corresponding to one or two DL reference signals (RSs).

TABLE 6

```
-- ASN1START
-- TAG-TCI-STATE-START
TCI-State ::=            SEQUENCE {
    tci-StateId          TCI-StateId,
    qcl-Type1            QCL-Info,
    qcl-Type2            QCL-Info
    ...
}
QCL-Info ::=             SEQUENCE {
    cell                 ServCellIndex
    bwp-Id               BWP-Id
    referenceSignal      CHOICE {
        csi-rs               NZP-CSI-RS-ResourceId,
        ssb                  SSB-Index
    },
    qcl-Type             ENUMERATED {typeA, typeB, typeC,
                         typeD},
    ...
}
-- TAG-TCI-STATE-STOP
-- ASN1STOP
```

In Table 6, bwp-Id parameter represents DL BWP in which the RS is located, cell parameter represents a carrier in which the RS is located, and reference signal parameter represents a reference antenna port(s) which becomes a source of quasi co-location for the corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

Quasi-Co Location (QCL)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The UE may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to code point of DCI field 'Transmission Configuration Indication'.

UL BM

In the case of UL BM, beam reciprocity (or beam correspondence) between the Tx beam and the Rx beam may be established or not established according to UE implementation. If the reciprocity between the Tx beam and the Tx beam is established in both the BS and the UE, a UL beam pair may be matched through a DL beam pair. However, when the reciprocity between the Tx beam and the Rx beam is not established even in any one of the BS and the UE, a UL beam pair determination process is required apart from DL beam pair determination.

Further, even when the BS and the UE maintain beam correspondence, the BS may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K (≥1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the BS.

FIG. 16 illustrates an example of an uplink beam management procedure using a sounding reference signal (SRS). FIG. 16(a) illustrates an Rx beam determination procedure of the BS and FIG. 16(b) illustrates a Tx beam sweeping procedure of the UE.

FIG. 17 is a flowchart showing an example of an uplink beam management procedure using the SRS.

The UE receives, from the BS, RRC signaling (e.g., SRS-Config IE) including a (higher layer parameter) usage parameter configured as 'beam management' (S1710).

Table 7 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 7

```
-- ASN1START
--TAG-MAC-CELL-GROUP-CONFIG-START
SRS-Config ::=                                          SEQUENCE {
    srs-ResourceSetToReleaseList                        SEQUENCE (SIZE(1..maxNrofSRS-
ResourceSets)) OF SRS-ResourceSetId                         OPTIONAL,    -- Need N
    srs-ResourceSetToAddModList                         SEQUENCE (SIZE(1..maxNrofSRS-
ResourceSets)) OF SRS-ResourceSet                           OPTIONAL,    -- Need N
    srs-ResourceToReleaseList                           SEQUENCE (SIZE(1..maxNrofSRS-
Resources)) OF SRS-ResourceId                               OPTIONAL,    -- Need N
    srs-ResourceToAddModList                            SEQUENCE (SIZE(1..maxNrofSRS-
Resources)) OF SRS-Resource                                 OPTIONAL,    -- Need N
    tpc-Accumulation                                    ENUMERATED {disabled}
    ...
}
SRS-ResourceSet ::=                                     SEQUENCE {
    srs-ResourceSetId                                   SRS-ResourceSetId,
    srs-ResourceIdList                                  SEQUENCE (SIZE(1..maxNrofSRS-
ResourcesPerSet)) OF SRS-ResourceId                         OPTIONAL,    -- Cond Setup
    resourceType                                        CHOICE {
        aperiodic                                       SEQUENCE {
            aperiodicSRS-ResourceTrigger                    INTEGER (1..maxNrofSRS-
TriggerStates-1),
            csi-RS                                          NZP-CSI-RS-ResourceId
            slotOffset                                      INTEGER (1..32)
            ...
        },
        semi-persistent                                 SEQUENCE {
            associatedCSI-RS                                NZP-CSI-RS-ResourceId
            ...
        },
        periodic                                        SEQUENCE {
            associatedCSI-RS                                NZP-CSI-RS-ResourceId
            ...
        }
    },
    usage                                               ENUMERATED {beamManagement,
codebook, nonCodebook, antennaSwitching},
    alpha                                               Alpha
    p0                                                  INTEGER (-202..24)
    pathlossReferenceRS                                 CHOICE {
        ssb-Index                                           SSB-Index,
        csi-RS-Index                                        NZP-CSI-RS-ResourceId
SRS-SpatialRelationInfo ::=                             SEQUENCE {
    servingCellId                                           ServCellIndex
        OPTIONAL,           -- Need S
    referenceSignal                                         CHOICE {
```

TABLE 7-continued

```
    ssb-Index                        SSB-Index,
    csi-RS-Index                     NZP-CSI-RS-ResourceId,
    srs                              SEQUENCE {
        resourceId                       SRS-ResourceId,
        uplinkBWP                        BWP-Id
    }
  }
}
SRS-ResourceId ::=                   INTEGER (0..maxNrofSRS-Resources-1)
```

In Table 7, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1720). Here, SRS-SpatialRelation Info is configured for each SRS resource and represents a beam which is the same as the beam used in the SSB, the CSI-RS, or the SRS is to be applied for each SRS resource.

Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1730).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the BS like three following cases (S1740).

i) When Spatial_Relation_Info is configured for all SRS resources in the SRS resource set, the UE transmits the SRS with the beam indicated by the BS. For example, when all Spatial_Relation_Info indicates the same SSB, CRI, or SRI, the UE repeatedly transmits the SRS with the same beam. This case as a usage of selecting the Rx beam by the BS corresponds to FIG. 16(a).

ii) Spatial_Relation_Info may not be configured for all SRS resources in the SRS resource set. In this case, the UE may transmit the SRS while arbitrarily changing the SRS beam. In other words, this case as a usage of sweeping the Tx beam by the UE corresponds to FIG. 16(b).

iii) Spatial_Relation_Info may be configured only for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

FIG. 18 is a flowchart showing an example of a method of performing an Idle mode DRX operation.

The UE receives Idle mode DRX configuration information from the base station through higher layer signaling (e.g., system information) (S1810).

In addition, the UE determines a Paging Frame (PF) for monitoring a physical downlink control channel (e.g., PDCCH) in a DRX cycle and a Paging Occasion (PO) in the PF based on the Idle mode DRX configuration information (S1820). Here, the DRX cycle includes On duration and a sleep interval (alternatively, Opportunity for DRX).

In addition, the UE monitors the PDCCH in the PO of the determined PF (S1830). The UE monitors only one subframe (PO) per paging DRX cycle.

Additionally, when the UE receives a PDCCH scrambled by P-RNTI for On duration (i.e., when detecting paging), the UE transitions to a connected mode to transmit and receive data to and from the base station.

FIG. 19 is a diagram illustrating an example of an Idle mode DRX operation.

Referring to FIG. 19, when traffic destined for a UE in an RRC_Idle state (hereinafter, referred to as an 'Idle state') occurs, paging occurs to the corresponding UE. The UE wakes up periodically, i.e., every (paging) DRX cycle and monitors the PDCCH. When there is the paging, the UE transitions to a Connected state and receives data and when there is no paging, the UE enters a sleep mode again.

Connected Mode DRX (C-DRX)

C-DRX may be DRX applied in an RRC Connected state and a DRX cycle of the C-DRX may be constituted by a Short DRX cycle and/or a Long DRX cycle. The Short DRX cycle is optional. When the C-DRX is configured, the UE monitors the PDCCH for On Duration. When there is a PDCCH which is successfully detected while monitoring the PDCCH, the UE operates an inactivity timer and maintains an awake state. On the contrary, when there is no PDCCH which is successfully detected while monitoring PDCCH, the UE enters a sleep state after the On Duration ends. When the C-DRX is configured, a PDCCH reception occasion (e.g., a slot having a PDCCH search space) may be discontinuously configured according to the C-DRX configuration. On the contrary, when the C-DRX is not configured, the PDCCH reception occasion (e.g., the slot having the PDCCH search space) may be continuously configured. Meanwhile, regardless of whether the C-DRX is configured, PDCCH monitoring may be limited in a time interval configured as a measurement gap.

FIG. 20 is a flowchart showing an example of a method of performing a C-DRX operation.

The UE receives from the eNB RRC signaling (e.g., MAC-MainConfig IE) including DRX configuration information (S2010). The DRX configuration information may include the following information.

onDurationTimer: The number of PDCCH subframes to be continuously monitored a start part of the DRX cycle drx-InactivityTimer: The number of PDCCH subframes to be continuously monitored when the UE decodes PDCCH having scheduling information drx-RetransmissionTimer: The number of PDCCH subframes to be continuously monitored when HARQ retransmission is predicted longDRX-Cycle: On Duration occurrence cycle drxStartOffset: subframe number in which the DRX cycle starts drxShortCycleTimer: The number of times of short DRX cycle shortDRX-Cycle: DRX cycle which operates at the number of times of drxShortCycleTimer when Drx-InactivityTimer is terminated In addition, when DRX 'ON' is configured through a DRX command of MAC command element (CE) (S2020), the UE monitors the PDCCH for ON duration of the DRX cycle based on the DRX configuration (S2030).

FIG. 21 is a diagram illustrating an example of a C-DRX operation.

Referring to FIG. 21, when the UE receives scheduling information (e.g., DL Grant) in an RRC_Connected state (hereinafter, referred to as Connected state), the UE drives a DRX inactivity timer and an RRC inactivity timer.

When the DRX inactivity timer expires, a DRX mode starts and the UE wakes up at the DRX cycle and monitors the PDCCH for a predetermined time (on duration timer). Here, when Short DRX is configured, the UE starts with a short DRX cycle when starting the DRX mode and when the short DRX cycle ends, the UE enters a long DRX cycle. The long DRX cycle is a multiple of the short DRX cycle and the UE wakes up more frequently in the short DRX cycle. When the RRC inactivity timer expires, the UE transitions to the Idle state and performs the Idle mode DRX operation.

IA/RA+DRX Operation

FIG. 22 is a diagram illustrating an example of power consumption depending on a state of a UE.

Referring to FIG. 22, after power on, the UE performs Boot Up for application loading, an initial access/random access procedure for synchronizing downlink and uplink with the base station, a registration procedure with the network, etc., and current (or power consumption) consumed while performing each procedure is illustrated in FIG. 15. When the transmission power of the UE is high, current consumption of the UE increases. In addition, when there is no traffic transmitted to the UE or to be transmitted to the base station, the UE transitions to the Idle mode and performs the Idle mode DRX operation. In addition, when paging (e.g., call occurrence) occurs during the Idle mode DRX operation, the UE transitions to the Connected mode to the Idle mode through a cell establishment procedure and transmits and receives data to and from the base station. In addition, when there is no data which the UE transmits and receives to and from the base station in the connected mode for a specific time or at a configured time, the UE performs the connected DRX (C-DRX) operation.

In addition, when the extended DRX (eDRX) is configured through the higher layer signaling (e.g., system information), the UE may perform the eDRX operation in the Idle mode or Connected mode.

In consideration of the active time when configuring the DRX, when performing the instructed PDSCH/PUSCH transmission after receiving the repetitive transmission operation from the base station through the L1 signaling or higher layer parameter at the time when the PDCCH can be received, the terminal may perform the method, embodiment, or operation proposed in the present disclosure described above. In addition, when the base station instructs or sets the repetitive transmission operation through L1 signaling or higher layer parameter in consideration of the active time of the terminal and receives PDSCH/PUSCH transmission from the terminal, The base station may perform the method, embodiment, or operation proposed in the present disclosure described above.

Each embodiment or each method described above may be performed separately, and is performed by a combination of one or more embodiments or methods to implement the method proposed in the present disclosure.

The base station/UE described in the present disclosure is just an example and may be replaced with various devices described in FIGS. 36 to 41, and applied.

Channel State Information (CSI) Related Procedure

FIG. 23 is a flowchart illustrating an example of a CSI related procedure to which the method proposed in the present specification may be applied.

In the new radio (NR) system, a channel state information-reference signal (CSI-RS) is used for time/frequency tracking, CSI computation, layer 1(L1)-reference signal received power (RSRP) computation, or mobility Throughout the present disclosure, "A and/or B" may be interpreted as the same as "including at least one of A or B".

The CSI computation is related to CSI acquisition, and L1-RSRP computation is related to beam management (BM).

The CSI indicates all types of information indicative of a quality of a radio channel (or link) formed between a UE and an antenna port.

To perform one of the above purposes of a CSI-RS, a terminal (e.g., a UE) receives CSI related configuration information from a base station (e.g., a general node B (gNB)) through a radio resource control (RRC) signaling (S2310).

The CSI-related configuration information may include at least one of CSI interference management (IM) resource-related information, CSI measurement configuration-related information, CSI resource configuration-related information, CSI-RS resource-related information, or CSI report configuration-related information.

The CSIIM resource-related information may include CSI-IM resource information, CSI-IM resource set information, etc.

The CSI-IM resource set is identified by a CSI-IM resource set ID (identifier), and one resource set includes at least one CSI-IM resource.

Each CSI-IM resource is identified by a CSI-IM resource ID.

The CSI resource configuration-related information defines a group including at least one of a non-zero power (NZP) CSI-RS resource set, a CSI-IM resource set, or a CSI-SSB resource set.

That is, the CSI resource configuration-related information includes a CSI-RS resource set list, and the CSI-RS resource set list may include at least one of a NZP CSI-RS resource set list, a CSI-IM resource set list, or a CSI-SSB resource set list.

The CSI resource configuration-related information may be expressed as CSI-REsourceConfig IE.

The CSI-RS resource set is identified by a CSI-RS resource set ID, and one resource set includes at least one CSI-RS resource.

Each CSI-RS resource is identified by a CSI-RS resource ID.

As shown in Table 8, parameters (e.g.: the BM-related parameter repetition, and the tracking-related parameter trs-Info indicative of (or indicating) a purpose of a CSI-RS may be set for each NZP CSI-RS resource set.

Table 8 shows an example of NZP CSI-RS resource set IE.

TABLE 8

```
-- ASN1START
-- TAG-NZP-CSI-RS-RESOURCESET-START
NZP-CSI-RS-ResourceSet ::=        SEQUENCE {
    nzp-CSI-ResourceSetId         NZP-CSI-RS-ResourceSetId,
    nzp-CSI-RS-Resources          SEQUENCE (SIZE
(1..maxNrofNZP-CSI-RS-ResourcesPerSet)) OF NZP-CSI-RS-ResourceId,
    repetition                    ENUMERATED { on, off }
    aperiodicTriggeringOffset     INTEGER(0..4)
    trs-Info                      ENUMERATED {true}
    ...
```

TABLE 8-continued

```
}
-- TAG-NZP-CSI-RS-RESOURCESET-STOP
-- ASN1STOP
```

In Table 8, the parameter repetition is a parameter indicative of whether to repeatedly transmit the same beam, and indicates whether repetition is set to "ON" or "OFF" for each NZP CSI-RS resource set.

The term "transmission (Tx) beam" used in the present disclosure may be interpreted as the same as a spatial domain transmission filter, and the term "reception (Rx) beam" used in the present disclosure may be interpreted as the same as a spatial domain reception filter.

For example, when the parameter repetition in Table 8 is set to "OFF", a UE does not assume that a NZP CSI-RS resource(s) in a resource set is transmitted to the same DL spatial domain transmission filter and the same Nrofports in all symbols.

In addition, the parameter repetition corresponding to a higher layer parameter corresponds to "CSI-RS-ResourceRep" of L1 parameter.

The CSI report configuration related information includes the parameter reportConfigType indicative of a time domain behavior and the parameter reportQuantity indicative of a CSI-related quantity to be reported.

The time domain behavior may be periodic, aperiodic, or semi-persistent.

In addition, the CSI report configuration-related information may be represented as CSI-ReportConfig IE, and Table 9 shows an example of the CSI-ReportConfig IE.

TABLE 9

```
-- ASN1START
-- TAG-CSI-RESOURCECONFIG-START
CSI-ReportConfig ::=                      SEQUENCE {
    reportConfigId                        CSI-ReportConfigId,
    carrier                               ServCellIndex              OPTIONAL,    --
Need S
    resourcesForChannelMeasurement        CSI-ResourceConfigId,
    csi-IM-ResourcesForInterference       CSI-ResourceConfigId       OPTIONAL,    --
Need R
    nzp-CSI-RS-ResourcesForInterference   CSI-ResourceConfigId       OPTIONAL,    --
Need R
    reportConfigType                      CHOICE {
        periodic                          SEQUENCE {
            reportSlotConfig                  CSI-ReportPeriodicityAndOffset,
            pucch-CSI-ResourceList            SEQUENCE (SIZE
(1..maxNrofBWPs)) OF PUCCH-CSI-Resource
        },
        semiPersistentOnPUCCH             SEQUENCE {
            reportSlotConfig                  CSI-ReportPeriodicityAndOffset,
            pucch-CSI-ResourceList            SEQUENCE (SIZE
(1..maxNrofBWPs)) OF PUCCH-CSI-Resource
        },
        semiPersistentOnPUSCH             SEQUENCE {
            reportSlotConfig                  ENUMERATED {sl5, sl10, sl20, sl40,
sl80, sl160, sl320},
            reportSlotOffsetList              SEQUENCE (SIZE (1..maxNrofUL-
Allocations)) OF INTEGER(0..32),
            p0alpha                           P0-PUSCH-AlphaSetId
        },
        aperiodic                         SEQUENCE {
            reportSlotOffsetList              SEQUENCE (SIZE (1.. maxNrofUL-
Allocations)) OF INTEGER(0..32)
        }
```

TABLE 9-continued

```
},
reportQuantity                          CHOICE {
    none                                    NULL,
    cri-RI-PMI-CQI                          NULL,
    cri-RI-i1                               NULL,
    cri-RI-i1-CQI                           SEQUENCE {
        pdsch-BundleSizeForCSI                  ENUMERATED {n2, n4}
        OPTIONAL
    },
    cri-RI-CQI                              NULL,
    cri-RSRP                                NULL,
    ssb-Index-RSRP                          NULL,
    cri-RI-LI-PMI-CQI                       NULL
},
```

In addition, the UE measures CSI based on configuration information related to the CSI (S2320).

Measuring the CSI may include (1) receiving a CSI-RS by the UE (S2322) and (2) computing CSI based on the received CSI-RS (S2324).

A sequence for the CSI-RS is generated by Equation 2, and an initialization value of a pseudo-random sequence C(i) is defined by Equation 3.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

$$c_{init} = (2^{10}(N_{symb}^{slot} n_{s,f}^{\mu} + l + 1)(2n_{ID} + 1) + n_{ID}) \bmod 2^{31} \quad \text{[Equation 3]}$$

In Equations 2 and 3, $n_{s,f}^{\mu}$ is a slot number within a radio frame, and a pseudo-random sequence generator is initialized with Cint at the start of each OFDM symbol where $n_{s,f}^{\mu}$ is the slot number within a radio frame.

In addition, 1 indicates an OFDM symbol number in a slot, and $n_{ID}$ indicates higher-layer parameter scramblingID.

In addition, regarding the CSI-RS, resource element (RE) mapping of CSI-RS resources of the CSI-RS is performed in time and frequency domains by higher layer parameter CSI-RS-ResourceMapping.

Table 10 shows an example of CSI-RS-ResourceMapping IE.

TABLE 10

```
-- ASN1START
-- TAG-CSI-RS-RESOURCEMAPPING-START
CSI-RS-ResourceMapping ::=          SEQUENCE {
    frequencyDomainAllocation           CHOICE {
        row1                                BIT STRING (SIZE (4)),
        row2                                BIT STRING (SIZE (12)),
        row4                                BIT STRING (SIZE (3)),
        other                               BIT STRING (SIZE (6))
    },
    nrofPorts                           ENUMERATED
                                            {p1,p2,p4,p8,p12,p16,p24,p32},
    firstOFDMSymbolInTimeDomain         INTEGER (0..13),
    firstOFDMSymbolInTimeDomain2        INTEGER (2..12)
    cdm-Type                            ENUMERATED {noCDM,
fd-CDM2, cdm4-FD2- TD2, cdm8-FD2-TD4},
    density                             CHOICE {
        dot5                                ENUMERATED
                                                {evenPRBs, oddPRBs},
        one                                 NULL,
        three                               NULL,
        spare                               NULL
```

TABLE 10-continued

```
    },
    freqBand                            CSI-FrequencyOccupation,
    ...
}
```

In Table 10, a density (D) indicates a density of CSI-RS resources measured in a RE/port/physical resource block (PRB), and nrofPorts indicates the number of antenna ports.

In addition, the UE reports the measured CSI to the base station (S630).

Herein, when a quantity of CSI-ReportConfig in Table 6 is set to "none (or No report)", the UE may skip the reporting.

However, even when the quantity is set to "none (or No report)", the UE may report the measured CSI to the base station.

The case where the quantity is set to "none" is t when an aperiodic TRS is triggered or when repetition is set.

Herein, it may be defined such that reporting by the UE is omitted only when repetition is set to "ON".

To put it briefly, when repetition is set to "ON" and "OFF", CSI reporting may indicate any one of "No report", "SSB Resource Indicator (SSBRI) and L1-RSRP", and "CSI-RS Resource Indicator (CRI) and L1-RSRP".

Alternatively, it may be defined to transmit CSI reporting indicative of "SSBRI and L1-RSRP" or "CRI and L1-RSRP" when repetition is set to "OFF", it may be defined such that, and to transmit CSI reporting indicative of "No report", "SSBRI and L1-RSRP", or "CRI and L1-RSRP" when repetition is "ON".

CSI Measurement and Reporting Procedure

The NR system supports more flexible and dynamic CSI measurement and reporting.

The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported.

A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching.

In addition, in ZP CSI-RS based IMR, each port emulates an interference layer having (a preferable channel and) precoded NZP CSI-RS.

This is for intra-cell interference measurement with respect to a multi-user case and primarily targets MU interference.

The base station transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList).

Here, the CSI resource setting corresponds to the CSI-RS-resourcesetlist.

Here, S represents the number of configured CSI-RS resource sets.

Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id.

In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent.

The number S of configured CSI-RS resource sets is limited to '1' with respect to periodic and semi-persistent CSI resource settings.

Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is for channel measurement for L1-RSRP computation.

When two resource settings are configured, a first resource setting (given by higher layer parameter resourcesForChannelMeasurement) is for channel measurement and a second resource setting (given by csi-IM-ResourcesForInterference or nzp-CSI-RS ResourcesForInterference) is for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each is linked to periodic or semi-persistent resource setting with respect to semi-persistent or periodic CSI.

When one resource setting (given by resourcesForChannelMeasurement) is configured, the resource setting is for channel measurement for L1-RSRP computation.

When two resource settings are configured, a first resource setting (given by resourcesForChannelMeasurement) is for channel measurement and a second resource setting (given by higher layer parameter csi-IM-ResourcesForinterference) is for interference measurement performed on CSI-IM.

CSI measurement related CSI computation will be described.

When interference measurement is performed on CSI-IM, each CSI-RS resource for channel measurement is associated with the CSI-IM resource for each resource by an order of CSI-RS resources and CSI-IM resources within a corresponding resource set.

The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForinterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

All interference transport layers of the NZP CSI-RS port for interference measurement consider an energy per resource element (EPRE) ratio.

Different interference signals on RE(s) of the NZP CSI-RS resource for channel measurement, the NZP CSI-RS resource for interference measurement, or CSI-IM resource for interference measurement.

A CSI reporting procedure will be described in more detail.

For CSI reporting, time and frequency resources which may be used by the UE are controlled by the base station.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states.

In the aperiodicTriggerStateList, each trigger state includes the channel and an associated CSI-ReportConfigs list optionally indicating resource set IDs for interference.

In the semiPersistentOnPUSCH-TriggerStateList, each trigger state includes one associated CSI-ReportConfig.

In addition, the time domain behavior of CSI reporting supports periodic, semi-persistent, and aperiodic.

Hereinafter, each of periodic, semi-persistent (SP), and aperiodic CSI reporting will be described.

The periodic CSI reporting is performed on short PUCCH and long PUCCH.

The periodicity and slot offset of the periodic CSI reporting may be configured as RRC and refer to the CSI-ReportConfig IE.

Next, SP CSI reporting is performed on short PUCCH, long PUCCH, or PUSCH.

In the case of SP CSI on the short/long PUCCH, the periodicity and the slot offset are configured as the RRC and the CSI reporting to separate MAC CE is activated/deactivated.

In the case of the SP CSI on the PUSCH, the periodicity of the SP CSI reporting is configured as the RRC, but the slot offset is not configured as the RRC and the SP CSI reporting is activated/deactivated by DCI (format 0_1).

An initial CSI reporting timing follows a PUSCH time domain allocation value indicated in the DCI and a subsequent CSI reporting timing follows a periodicity configured as the RRC.

Separated RNTI (SP-CSI C-RNTI) is used with respect to the SP CSI reporting on the PUSCH.

DCI format 0_1 may include a CSI request field and may activate/deactivate a specific configured SP-CSI trigger state.

In addition, the SP CSI reporting has the same or similar activation/deactivation as a mechanism having data transmission on SPS PUSCH.

Next, the aperiodic CSI reporting is performed on the PUSCH and is triggered by the DCI.

In the case of AP CSI having AP CSI-RS, an AP CSI-RS timing is configured by the RRC.

Here, timing for the AP CSI reporting is dynamically controlled by the DCI.

The NR does not adopt a scheme (for example, transmitting RI, WB PMI/CQI, and SB PMI/CQI in order) of dividing and reporting the CSI in multiple reporting instances applied to PUCCH based CSI reporting in the LTE.

Instead, the NR restricts specific CSI reporting not to be configured in the short/long PUCCH and a CSI omission rule is defined.

In addition, in relation with the AP CSI reporting timing, a PUSCH symbol/slot location is dynamically indicated by the DCI. In addition, candidate slot offsets are configured by the RRC.

For the CSI reporting, slot offset(Y) is configured for each reporting setting.

For UL-SCH, slot offset K2 is configured separately.

Two CSI latency classes (low latency class and high latency class) are defined in terms of CSI computation complexity.

The low latency CSI is a WB CSI that includes up to 4 ports Type-I codebook or up to 4-ports non-PMI feedback CSI.

The high latency CSI refers to CSI other than the low latency CSI.

For a normal UE, (Z, Z') is defined in a unit of OFDM symbols.

Z represents a minimum CSI processing time from the reception of the aperiodic CSI triggering DCI to the execution of the CSI reporting.

Z' represents a minimum CSI processing time from the reception of the CSI-RS for channel/interference to the execution of the CSI reporting.

Additionally, the UE reports the number of CSIs which may be simultaneously calculated.

Type II Codebook

A UE is configured with 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3032}, 32 antenna ports {3000, 3001, . . . , 3031} and configured with a higher layer parameter codebookType set as 'typeII'.

N1 and values of N1 are individually set as higher layer parameters n1-n2-codebookSubsetRestriction and CodebookConfig-N2. Supported configurations of $(N_1, N_2)$ and values corresponding to $(O_1, O_2)$ for a given number of CSI-RS ports are illustrated in Table 11.

TABLE 11

| Number of CSI-RS antenna ports, $P_{CSI-RS}$ | $(N_g, N_1, N_2)$ | $(O_1, O_2)$ |
|---|---|---|
| 8 | (2, 2, 1) | (4, 1) |
| 16 | (2, 4, 1) | (4, 1) |
|  | (4, 2, 1) | (4, 1) |
|  | (2, 2, 2) | (4, 4) |
| 32 | (2, 8, 1) | (4, 1) |
|  | (4, 4, 1) | (4, 1) |
|  | (2, 4, 2) | (4, 4) |
|  | (4, 2, 2) | (4, 4) |

A value of L is set for a higher layer parameter numberOfbeams. In this case, when a value of a $P_{CSI-RS}$ is 4, the value of L is 2. When a value of a $P_{CSI-RS}$ is greater than 4, the value of L belongs to {2, 3, 4}.

A value of NPSK is set for a higher layer parameter phaseAlphabetSize, and the NPSK belongs to {4, 8}.

A UE sets subbandAmplitude, that is, a higher layer parameter, as 'true' or 'false'.

A UE should not report RI>2.

When a value v associated with an RI value is smaller than 2, codebook indices i1 and i2 corresponding to respective PMI values are the same as Equation 4.

$$i_1 = \begin{cases} [i_{1,1} \ i_{1,2} \ i_{1,3,1} \ i_{1,4,1}] & v = 1 \\ [i_{1,1} \ i_{2,3} \ i_{1,3,1} \ i_{1,4,1} \ i_{1,3,2} \ i_{1,4,2}] & v = 2 \end{cases} \quad \text{[Equation 4]}$$

-continued $$i_2 = \begin{cases} [i_{2,1,1}] & subbandAmplitude = \text{'false'}, \upsilon = 1 \\ [i_{2,1,1} \; i_{2,1,2}] & subbandAmplitude = \text{'false'}, \upsilon = 2 \\ [i_{2,1,1} \; i_{2,2,1}] & subbandAmplitude = \text{'true'}, \upsilon = 1 \\ [i_{2,1,1} \; i_{2,2,1} \; i_{2,1,2} \; i_{2,2,2}] & subbandAmplitude = \text{'true'}, \upsilon = 2 \end{cases}$$

L vectors combined by a codebook are identified by $i_{1,1}$ and $i_{1,2}$ indices, and values thereof are the same as Equation 5.

$$i_{1,1} = [q_1 \; q_2]$$ [Equation 5]

$$q_1 \in \{0, 1, \ldots, O_1 - 1\}$$

$$q_2 \in \{0, 1, \ldots, O_2 - 1\}$$

$$i_{1,2} \in \left\{0, 1, \ldots, \binom{N_1 N_2}{L} - 1\right\}$$

$$n_1 = [n_1^{(0)}, \ldots, n_1^{(L-1)}]$$

$$n_2 = [n_2^{(0)}, \ldots, n_2^{(L-1)}]$$

$$n_1^{(i)} \in \{0, 1, \ldots, N_1 - 1\}$$

$$n_2^{(i)} \in \{0, 1, \ldots, N_2 - 1\}$$

$$C(x, y) = \begin{cases} \binom{x}{y} & x \geq y \\ 0 & x < y \end{cases}$$

In Equation 5, a value of $C(x,y)$ is given by Table 12.

TABLE 12

| x | y=1 | y=2 | y=3 | y=4 |
|---|---|---|---|---|
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 |

The elements of $n_1$ and $n_2$ may be derived from $i_{1,2}$ based on Equation 6.

$$s_{-1} = 0$$ [Equation 6]

for $i = 0, K, L - 1$

Find the largest $x^* \in$ $\{L - 1 - i, K, N_1 N_2 - 1 - i\}$ in Table 5.2.2.2.3-1 such that $$i_{1,2} - s_{i-1} \geq C(x^*, L - i)$$

$$e_i = C(x^*, L - i)$$

$$s_i = s_{i-1} + e_i$$

-continued $$n^{(i)} = N_1 N_2 - 1 - x^*$$

$$n_1^{(i)} = n^{(i)} \bmod N_1$$

$$n_2^{(i)} = \frac{(n^{(i)} - n_1^{(i)})}{N_1}$$

When values of n1 and n2 are known values, i1,2 may be derived by Equation 7.

$$n^{(i)} = N_1 n_2^{(i)} + n_1^{(i)}.$$ [Equation 7]

In this case, index i=0, 1, ..., L−1 is allocated so that $n^{(i)}$ is increased as i is increased.

$$i_{1,2} = \sum_{i=0}^{L-1} C(N_1 N_2 - 1 - n^{(i)}, L - i)$$

When an $N_2$ value is 1, a $q_2$ value is 0, and a value of $n_2^{(i)}$ for i=0, 1, ..., L−1 is 0, $q_2$ is not reported.

When $(N_1, N_2)=(2,1)$, $n_1=[0,1]$ and $n_2=[0,0]$, $i_{1,2}$ is not reported.

When $(N_1, N_2)=(4,1)$, L=4, $n_1=[0,1, 2, 3]$ and $n_2=[0, 0, 0, 0]$, $i_{1,2}$ is not reported.

When $(N_1, N_2)=(2,2)$, L=4, $n_1=[0,1, 0, 1]$ and n2=[0, 0, 1, 1], $i_{1,2}$ is not reported.

On a Layer l(l=1, ... v), the greatest coefficient is identified by $i_{1,3,l} \in \{0, 1, \ldots, 2L-1\}$.

an amplification coefficient indicator $i_{1,4,l}$ and $i_{2,2,l}$ are the same as Equation 8.

$$i_{1,4,l} = [k_{l,0}^{(1)}, k_{l,1}^{(1)}, \ldots, k_{l,2L-1}^{(1)}]$$

$$i_{2,2,l} = [k_{l,0}^{(2)}, \ldots, k_{l,2L-1}^{(2)}]$$

$$k_{l,i}^{(1)} \in \{0,1, \ldots, 7\}$$

$$k_{l,i}^{(2)} \in \{0,1\}$$ [Equation 8]

With respect to l=1, ..., v, the mapping from $k_{l,i}^{(1)}$ to an amplification coefficient $p_{l,i}^{(1)}$ is the same as Table 13. Mapping from $k_{l,i}^{(2)}$ to an amplification coefficient $p_{l,i}^{(2)}$ is the same as Table 14.

In this case, the amplification coefficient is the same as Equation 9.

$$p_l^{(1)} = [p_{l,0}^{(1)}, p_{l,1}^{(1)}, \ldots, p_{l,2L-1}^{(1)}]$$

$$p_l^{(2)} = [p_{l,0}^{(2)}, p_{l,1}^{(2)}, \ldots, p_{l,2L-1}^{(2)}]$$ [Equation 9]

TABLE 13

| $k_{l,i}^{(1)}$ | $p_{l,i}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

TABLE 14

| $k_{l,i}^{(2)}$ | $p_{l,i}^{(2)}$ |
|---|---|
| 0 | $\sqrt{1/2}$ |
| 1 | 1 |

A phase coefficient indicator is the same as Equation 10.

$$i_{2,1,l}=[c_{l,0},c_{l,1},\ldots,c_{l,2L-1}] \text{ for } l=1,\ldots,\nu \qquad \text{[Equation 10]}$$

Amplitude and phase coefficient indicators are reported as follows.

An indicator $k_{l,i_{1,3,l}}^{(1)}=7$, $k_{l,i_{1,3,l}}^{(2)}=1$ and $c_{l,i_{1,3,l}}=0(l=1,\ldots,\nu)$. $k_{l,i_{1,3,l}}^{(1)}$, $k_{l,i_{1,3,l}}^{(2)}$ and $c_{l,i_{1,3,l}}$ is not reported with respect to $l=1,\ldots,\nu$.

The remaining $2L-1$ elements of $i_{1,4,l}(l=1,\ldots,\nu)$ are not reported. In this case, $k_{l,i}^{(1)} \in \{0, 1, \ldots, 7\}$. $M_l(l=1,\ldots,\nu)$ may be the number of elements of $i_{1,4,l}$ satisfying $k_{l,i}^{(1)}>0$.

The remaining $2L-1$ elements of $i_{2,1,l}$ and $i_{2,2,l}$ are reported as follows.

When subbandAmplitude is set as "false", $k_{l,i}^{(2)}$ for $l=0, 1, \ldots, \nu$ and $i=0, 1, \ldots, 2L-1$. $i_{2,2,l}$ is not reported with respect to $l=1,\ldots,\nu$.

With respect to $l=1, \ldots, \nu$, an element of $i_{2,1,l}$ corresponding to a coefficient satisfying $k_{l,i}^{(1)}>0$, $i \neq i_{1,3,l}$ is not reported. In this case, $c_{l,i} \in \{0, 1, \ldots, N_{PSK}-1\}$ and the remaining elements of $2L-M_1$ of $i_{2,1,l}$ are not reported, and are set as $c_{l,i}=0$.

When subbandAmplitude is set as "true",

With respect to $l=0, 1, \ldots, \nu$, as determined by a corresponding report element of $i_{1,4,l}$, elements of $i_{2,2,l}$ and $i_{2,1,l}$ corresponding to the strongest coefficient of $\min(M_l, K^{(2)})-1$ (other than the strongest coefficient indicated by $i_{1,3,l}$) are reported. In this case, $k_{l,i}^{(2)} \in \{0, 1\}$, and $c_{l,i} \in \{0, 1, \ldots, N_{PSK}-1\}$. A value of $K^{(2)}$ is given by Table 15. The remaining $2L-\min(M_l, K^{(2)})$ elements of $i_{2,2,l}$ are not reported, and are set as $k_{l,i}^{(2)}=1$. The elements of $i_{2,2,l}$ corresponding to a coefficient $M_l-\min(M_l, K^{(2)})$ not the weakest 0dl are reported. In this case, $c_{l,i} \in \{0, 1, 2, 3\}$. The remaining $2L-M_1$ elements of $i_{2,2,l}$ are not reported, and are set as $c_{l,i}=0$.

In the case of two elements, $k_{l,x}^{(1)}$ and $k_{l,y}^{(1)}$ for the reported element of $i_{1,4,l}$ are the same as ($k_{l,x}^{(1)}=k_{l,y}^{(1)}$), an element $\min(x, y)$ is assigned priority so that it is included in a set of the strongest coefficient of $\min(M_l, K^{(2)})-1$ for $i_{2,1,l}$ and $i_{2,2,l}(l=1,\ldots,\nu)$ report.

TABLE 15

| L | $K^{(2)}$ |
|---|---|
| 2 | 4 |
| 3 | 4 |
| 4 | 6 |

Codebooks in the 1 and 2 layers are given in Table 16. In this case, indices $m_1^{(i)}$ and $m_2^{(i)}$ are given by Equation 11.

$$m_1^{(i)}=O_1 n_1^{(i)}+q_1$$

$$m_2^{(i)}=O_2 n_2^{(i)}+q_2 \qquad \text{[Equation 11]}$$

In Equation 11, $\varphi_{l,i}$, $\mu_m$ and $v_{l,m}$ for $i=0, 1, \ldots, L-1$ are given by Equation 12.

$$\varphi_{l,i} = \begin{cases} e^{j2\pi c_{l,i}/N_{PSK}} & \text{subbandAmplitude = 'false'} \\ e^{j2\pi c_{l,i}/N_{PSK}} & \text{subbandAmplitude = 'true'}, \min(M_l, K^{(2)}) \text{ strongest coefficients (including } i_{1,3,1}) \text{ with } k_{l,i}^{(1)} > 0 \\ e^{j2\pi c_{l,i}/4} & \text{subbandAmplitude = 'true'}, M_l - \min(M_l, K^{(2)}) \text{ weakest coefficients with } k_{l,i}^{(1)} > 0 \\ 1 & \text{subbandAmplitude = 'true'}, 2L - M_l \text{ coefficients with } k_{l,i}^{(1)} = 0 \end{cases} \qquad \text{[Equation 12]}$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

TABLE 16

| Layers | |
|---|---|
| $\upsilon = 1$ | $W_{q_1,q_2,n_1,n_2,p_1^{(1)},p_1^{(2)},i_{2,1,1}}^{(1)} = W_{q_1,q_2,n_1,n_2,p_1^{(1)},p_1^{(2)},i_{2,1,1}}^{1}$ |
| $\upsilon = 2$ | $W_{q_1,q_2,n_1,n_2,p_1^{(1)},p_1^{(2)},i_{2,1,1},p_2^{(1)},p_2^{(2)},i_{2,1,2}}^{(q)} = \frac{1}{\sqrt{2}}\begin{bmatrix} W_{q_1,q_2,n_1,n_2,p_1^{(1)},p_1^{(2)},i_{2,1,1}}^{1} & W_{q_1,q_2,n_1,n_2,p_2^{(1)},p_2^{(2)},i_{2,1,2}}^{2} \end{bmatrix}$ |
| where $W_{q_1,q_2,n_1,n_2,p_l^{(1)},p_l^{(2)},c_l}^{l} = \frac{1}{\sqrt{N_1 N_2 \sum_{i=0}^{2L-1}(p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}, l = 1, 2,$ | | and the mappings from $i_1$ to $q_1, q_2, n_1, n_2, p_1^{(1)}$, and $p_2^{(1)}$, and from $i_2$ to $i_{2,1,1}, i_{2,1,2}$, $p_1^{(2)}$ and $p_2^{(2)}$ are as described above, including the ranges of the constituent indices of $i_1$ and $i_2$.

If a UE is configured with a higher layer parameter codebookType set as "type II", a bitmap parameter typeII-RI-Restriction forms bit sequences $r_1$, $r_0$. In this case, $r_0$ is the LSB, and $r_1$ is the MSB. If $r_i$ is zero, i∈ {0, 1}, PMI and RI report does not correspond to any precoder associated with υ=i+1 layers.

A bitmap parameter nI-n2-codebookSubsetRestriction form a bit sequence $B=B_1B_2$. In this case, the bit sequences $B_1$ and $B_2$ are connected to form B. In order to define $B_1$ and $B_2$, first, $O_1O_2$ vector groups $G(r_1,r_2)$ may be defined as in Equation 13.

$$G(r_1, r_2) = \qquad \text{[Equation 13]}$$

$$\{v_{N_1r_1-x_1, N_1r_1-x_1} : x_1 = 0, 1, K, N_1 - 1; x_2 = 0, 1, K, N_2 - 1\}$$

for $$r_1 \in \{0, 1, K, O_1 - 1\}$$

$$r_2 \in \{0, 1, K, O_2 - 1\}.$$

A UE may be configured with restriction for 4 vector groups indicated by $(r_1^{(k)}, r_2^{(k)})$ for k=0, 1, 2, 3 and identified by group indices of Equation 14.

$$g^{(k)} = O_1 r_2^{(k)} + r_1^{(k)} \qquad \text{[Equation 14]}$$

With respect to k=0, 1, . . . , 3, indices are allocated so that $g^{(k)}$ is increased as k is increased, and the remaining vector groups are not restricted.

When N2=1, $g^{(k)}$=k and $B_1$ is empted with respect to k=0, 1, . . . , 3.

When N2>1, $B_1 = b_1^{(10)} \ldots b_1^{(0)}$ is a binary representation of an integer $\beta_1$. In this case, $b_1^{(10)}$ is the MSB, and $b_1^{(0)}$ is the LSB. In this case, $\beta_1$ may be calculated based on Equation 15.

$$\beta_1 = \sum_{k=0}^{3} C(O_1O_2 - 1 - g^{(k)}, 4 - k) \qquad \text{[Equation 15]}$$

In Equation 15, C(x, y) may be defined in Table 17. A group index $g^{(k)}$ and indicators for k=0, 1, 2, 3 may be calculated from $\beta_1$ by using the following algorithm of Equation 16.

$$s_{-1} = \qquad \text{[Equation 16]}$$

$$0$$

for $k = 0, K,$ $$3$$

Find the largest $x^* \in$ $\{3 - k, K, O_1O_2 - 1 - k\}$ such that $\beta_1 - s_{k-1} \geq C(x^*, 4 - k)$ $$e_k = C(x^*, 4 - k)$$

$$s_k = s_{k-1} + e_k$$

$$g^{(k)} = O_1O_2 - 1 - x^*$$

$$r_1^{(k)} = g^{(k)} \bmod O_1$$

$$r_2^{(k)} = \frac{(g^{(k)} - r_1^{(k)})}{O_1}$$

A bit sequence $B_2 = B_2^{(0)} B_2^{(1)} B_2^{(2)} B_2^{(3)}$ is a combination of bit sequences $B_2^{(k)}$ for k=0,1, . . . 3 corresponding to group indices $g^{(k)}$. The bit sequence $B_2^{(k)}$ may be defined as in Equation 17.

$$B_2^{(k)} = b_2^{(k, 2N_1N_2-1)} \ldots b_1^{(k,0)} \qquad \text{[Equation 17]}$$

Bits $b_2^{(k, 2(N_1x_2+x_1)+1)} b_2^{(k, 2(N_1x_2+x_1))}$ indicate a maximum allowed amplification coefficient $p_{l,i}^{(1)}$ for a vector in a group $g^{(k)}$ indexed by $x_1$, $x_2$, and the maximum amplification coefficient may be given by Table 17.

TABLE 17

| Bits $b_2^{(k, 2(N_1x_2+x_1)+1)} b_2^{(k, 2(N_1x_2+x_1))}$ | Maximum Amplitude Coefficient $p_{l,i}^{(1)}$ |
|---|---|
| 00 | 0 |
| 01 | $\sqrt{1/4}$ |
| 10 | $\sqrt{1/2}$ |
| 11 | 1 |

Type II Port Selection Codebook

A UE is configured with 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3032}, 32 antenna ports {3000, 3001, . . . , 3031} and configured with a higher layer parameter codebookType set as 'typeII-PortSelection'.

The number of CSI-RS ports is given by a $P_{CSI-RS} \in \{4, 8, 12, 16, 24, 32\}$ as set by a higher layer parameter nrofPorts.

A value of L is set as a higher layer parameter numberOf-Beams. When the $P_{CSI-RS}$ is 4, a value of L is 2. When the $P_{CSI-RS}$ is greater than 4, $L \in \{2, 3, 4\}$.

A value of d is set as a higher layer parameter portSelectionSamplingSize. In this case, d satisfies $d \in \{1,2,3,4\}$ and $$d \leq \min\left(\frac{P_{CSI-RS}}{2}, L\right).$$

a value of NPSK is configured with respect to a higher layer parameter phaseAlphabetSize, $N_{PSK}$ belongs to {4, 8}.

A UE is configured by setting subbandAmplitude, that is, a higher layer parameter, as 'true' or 'false'.

A UE should not report RI>2.

Furthermore, a UE is set as a higher layer parameter typeII-PortSelectionRI-Restriction. The bitmap parameter typeII-PortSelectionRI-Restriction forms bit sequences $r_1$, $r_0$. In this case, $r_0$ is the LSB, and $r_1$ is the MSB. When $r_1$ is zero, i∈ {0, 1}, PMI and RI reports do not correspond to any precoder associated with υ=i+1 layers.

When a v value associated with an RI value is smaller than 2, codebook indices i1 and i2 corresponding to respective PMI values are the same as Equation 4.

[Equation 18]

$$i_1 = \begin{cases} [i_{1,1}\ i_{1,3,1}\ i_{1,4,1}] & \upsilon = 1 \\ [i_{1,1}\ i_{1,3,1}\ i_{1,4,1}\ i_{1,3,2}\ i_{1,4,2}] & \upsilon = 2 \end{cases}$$

$$i_2 = \begin{cases} [i_{2,1,1}] & subbandAmplitude = \text{'false'},\ \upsilon = 1 \\ [i_{2,1,1}\ i_{2,1,2}] & subbandAmplitude = \text{'false'},\ \upsilon = 2 \\ [i_{2,1,1}\ i_{2,2,1}] & subbandAmplitude = \text{'true'},\ \upsilon = 1 \\ [i_{2,1,1}\ i_{2,2,1}\ i_{2,1,2}\ i_{2,2,2}] & subbandAmplitude = \text{'true'},\ \upsilon = 2 \end{cases}$$

$$i_1 = \begin{cases} [i_{1,1}\ i_{1,2}\ i_{1,3,1}\ i_{1,4,1}] & \upsilon = 1 \\ [i_{1,1}\ i_{1,2}\ i_{1,3,1}\ i_{1,4,1}\ i_{1,3,2}\ i_{1,4,2}] & \upsilon = 2 \end{cases}$$

$$i_2 = \begin{cases} [i_{2,1,1}] & subbandAmplitude = \text{'false'},\ \upsilon = 1 \\ [i_{2,1,1}\ i_{2,1,2}] & subbandAmplitude = \text{'false'},\ \upsilon = 2 \\ [i_{2,1,1}\ i_{2,2,1}] & subbandAmplitude = \text{'true'},\ \upsilon = 1 \\ [i_{2,1,1}\ i_{2,2,1}\ i_{2,1,2}\ i_{2,2,2}] & subbandAmplitude = \text{'true'},\ \upsilon = 2 \end{cases}$$

In Equation 18, L vectors combined by a codebook are identified by $i_{1,1}$ and $i_{1,2}$ indices, and values thereof are the same as Equations 19 and 20.

$$i_{1,1} \in \left\{0, 1, \ldots, \left\lceil \frac{P_{CSI-RS}}{2d} \right\rceil - 1 \right\} \quad \text{[Equation 19]}$$

In the layer l, l=1, . . . , v, the strongest coefficient is identified by $i_{1,3,l} \in \{0, 1, \ldots, 2L-1\}$.

Amplification coefficient indicators $i_{1,4,l}$ and $i_{2,2,l}$ are the same as Equation 20.

$$i_{1,4,l} = [k_{l,0}^{(1)}, k_{l,1}^{(1)}, \ldots, k_{l,2L-1}^{(1)}]$$

$$i_{2,24,l} = [k_{l,0}^{(2)}, k_{l,1}^{(2)}, \ldots, k_{l,2L-1}^{(2)}]$$

$$k_{l,i}^{(1)} \in \{0,1,\ldots,7\}$$

$$k_{l,i}^{(2)} \in \{0,1\} \quad \text{[Equation 20]}$$

With respect to l=1, . . . , v, the mapping of an amplification coefficient $p_{l,i}^{(1)}$ from $k_{l,i}^{(1)}$ is the same as Table 13, and mapping from $k_{l,i}^{(2)}$ to an amplification coefficient $p_{l,i}^{(2)}$ is the same as Table 14.

In this case, the amplification coefficient is the same as Equation 21.

$$p_l^{(1)} = [p_{l,0}^{(1)}, p_{l,1}^{(1)}, \ldots, p_{l,2L-1}^{(1)}]$$

$$p_l^{(2)} = [p_{l,0}^{(2)}, p_{l,1}^{(2)}, \ldots, p_{l,2L-1}^{(2)}] \quad \text{[Equation 21]}$$

A phase coefficient indicator is the same as Equation 22.

$$i_{2,1,l} = [c_{l,0}, c_{l,1}, \ldots, c_{l,2L-1}] \quad \text{[Equation 22]}$$

Amplitude and phase coefficient indicators are reported as follows.

An indicator $k_{l,i_{1,3,l}}^{(1)} = 7$, $k_{l,i_{1,3,l}}^{(2)} = 1$ and $c_{l,i_{1,3,l}} = 0$ (l=1, . . . v). $k_{l,i_{1,3,l}}^{(1)}$, $k_{l,i_{1,3,l}}^{(2)}$ and $c_{l,i_{1,3,l}}$ are not reported with respect to l=1, . . . , v.

The remaining 2L−1 elements of $i_{1,4,l}$(l=1, . . . v) are not reported. In this case, $k_{l,i}^{(1)} \in \{0, 1, \ldots, 7\}$. $M_l$(l=1, . . . , v) may be the number of elements $i_{1,4,l}$ satisfying $k_{l,i}^{(1)} > 0$.

The remaining 2L−1 elements $i_{2,1,l}$ and $i_{2,2,l}$ are reported as follows.

When subbandAmplitude is set as "false", $k_{l,i}^{(2)}$ for l=0, 1, . . . , v and i=0, 1, . . . , 2L−1. $i_{2,11,l}$ is not reported with respect to l=1, . . . , v.

With respect to l=1, . . . , v, elements of $i_{2,1,l}$ corresponding to a coefficient satisfying $k_{l,i}^{(1)} > 0$, $i \neq i_{1,3,l}$ is not reported. In this case, $c_{l,i} \in \{0, 1, \ldots, N_{PSK}-1\}$ and the remaining elements of 2L−$M_1$ of $i_{2,1,l}$ are not reported, and is set as $C_{l,i} = 0$.

When subbandAmplitude is set as "true",

With respect to l=0, 1, . . . , v, as determined by a corresponding report element of $i_{1,4,l}$, elements of $i_{2,2,l}$ and $i_{2,1,l}$ corresponding to the strongest coefficient of min($M_l$, $K^{(2)}$)−1 (other than the strongest coefficient indicated by $i_{1,3,l}$) are reported. In this case, $k_{l,i}^{(2)} \in \{0, 1\}$, and $c_{l,i} \in \{0, 1, \ldots, N_{PSK}-1\}$. A value of $K^{(2)}$ is given by Table 15. The remaining 2L−min($M_l$, $K^{(2)}$) elements of $i_{2,2,l}$ are not reported, and are set as $k_{l,i}^{(2)} = 1$. Elements of $i_{2,2,l}$ corresponding to a coefficient $M_l$−min($M_l$, $K^{(2)}$) not the weakest 0dl are reported. In this case, $c_{l,i} \in \{0, 1, 2, 3\}$. The remaining 2L−$M_l$ elements of $i_{2,2,l}$ are not reported, and set as $c_{l,i} = 0$.

In the case of two elements, $k_{l,x}^{(1)}$ and $k_{l,y}^{(1)}$ for the reported element of $i_{1,4,l}$ are the same as ($k_{l,x}^{(1)} k_{l,y}^{(1)}$), and an element min(x, y) is assigned priority so that it is included in a set of the strongest coefficient of min($M_l$, $K^{(2)}$)−1 for $i_{2,1,l}$ and $i_{2,2,l}$(l=1, . . . v) report.

Codebooks for the 1-2 layers are given in Table 18. In this case, $\varphi_{l,i}$ is given by Equation 23.

$$\varphi_{l,i} = \begin{cases} e^{j2\pi c_{l,i}/N_{PSK}} & subbandAmplitude = \text{'false'} \\ e^{j2\pi c_{l,i}/N_{PSK}} & subbandAmplitude = \text{'true'},\ \min(M_l, K^{(2)})\ \text{strongest coefficients (including}\ i_{1,3,1})\ \text{with}\ k_{l,i}^{(1)} > 0 \\ e^{j2\pi c_{l,i}/4} & subbandAmplitude = \text{'true'},\ M_l - \min(M_l, K^{(2)})\ \text{weakest coefficients with}\ k_{l,i}^{(1)} > 0 \\ 1 & subbandAmplitude = \text{'true'},\ 2L - M_l\ \text{coefficients with}\ k_{l,i}^{(1)} = 0 \end{cases} \quad \text{[Equation 23]}$$

$v_m$ is a $P_{CSI-RS}/2$-element column vector including a value of 1 in an element (m mod $P_{CSI-RS}/2$) and 0 at a different place.

TABLE 18

| Layers | |
|---|---|
| $\upsilon = 1$ | $W_{i_{1,1},p_1^{(1)},p_1^{(2)},i_{2,1,1}}^{(1)} = W_{i_{1,1},p_1^{(1)},p_1^{(2)},i_{2,1,1}}^{1}$ |
| $\upsilon = 2$ | $W_{i_{1,1},p_1^{(1)},p_1^{(2)},i_{2,1,1},p_2^{(1)},p_2^{(2)},i_{2,1,2}}^{(2)} = \frac{1}{\sqrt{2}} [\, W_{i_{1,1},p_1^{(1)},p_1^{(2)},i_{2,1,1}}^{1} \quad W_{i_{1,1},p_2^{(1)},p_2^{(2)},i_{2,1,2}}^{2} \,]$ |
| where | $W_{i_{1,1},p_l^{(1)},p_l^{(2)},i_{2,1,l}}^{l} = \dfrac{1}{\sqrt{\sum\limits_{i=0}^{2L-1}(p_{l,i}^{(1)}p_{l,i}^{(2)})^2}} \begin{bmatrix} \sum\limits_{i=0}^{L-1} v_{i_{1,1}d+i}\, p_{l,i}^{(1)} p_{l,i}^{(2)} \varphi_{l,i} \\ \sum\limits_{i=0}^{L-1} v_{i_{1,1}d+i}\, p_{l,i+L}^{(1)} p_{l,i+L}^{(2)} \varphi_{l,i+L} \end{bmatrix},\ l=1,2,$ | and the mappings from $i_1$ to $i_{1,1}$, $p_1^{(1)}$, and $p_2^{(1)}$ and from $i_2$ to $i_{2,1,1}$, $i_{2,1,2}$, $p_1^{(2)}$, and $p_2^{(2)}$ are as described above, including the ranges of the constituent indices of $i_1$ and $i_2$.

CSI Reporting Using PUSCH

FIG. 24 illustrates an example of an information payload of PUSCH based CSI reporting.

NZBI is a parameter representing an indication of the number of non-zero wideband amplitude coefficients per layer for the Type II PMI codebook.

That is, NZBI is a parameter representing an indication of the number of non-zero wideband amplitude coefficients per layer for the Type II PMI codebook.

That is, NZBI is an indicator indicating 0 or a relative amplitude coefficient other than 0.

Alternatively, NZBI may represent the number of zero amplitude beams or non-zero amplitude beams and may be referred to as N_RPI0.

When decoding for the DCI is successful, the UE performs aperiodic CSI reporting using the PUSCH of a serving cell c.

The aperiodic CSI reporting performed on the PUSCH supports wideband and sub-band frequency granularity.

The aperiodic CSI reporting performed on the PUSCH supports Type I and Type II CSIs.

When decoding DCI format 0_1 activating a semi-persistent (SP) CSI trigger state is successful, the UE performs SP CSI reporting for the PUSCH.

DCI format 0_1 includes a CSI request field indicating the SP CSI trigger state to be activated or deactivated.

The SP CSI report for the PUSCH supports Type I and Type II CSIs with the wideband and sub-band frequency granularity.

The PUSCH resource and the modulation and coding scheme (MCS) for the SP CSI reporting are semi-permanently allocated by the UL DCI.

The CSI reporting for the PUSCH may be multiplexed with UL data on the PUSCH.

Further, the CSI reporting for the PUSCH may be performed without multiplexing with the UL data.

For Type I and Type II CSIs on the PUSCH, the CSI reporting includes two parts (Part 1 and Part 2) as illustrated in FIG. 24.

Part 1 2410 is used for identifying the number of information bits of Part 2 2420. The entirety of Part 1 is transmitted before Part 2.

For Type I CSI feedback, Part 1 contains an RI (if reported), a CRI (if reported), and a CQI of a first codeword.

Part 2 includes a PMI and includes a CQI for a second codeword when RI>4.

For Type II CSI feedback, Part 1 has a fixed payload size and includes the RI, the CQI and an indication (NZBI) for the number of non-zero wideband amplitude coefficients per layer for Type II CSI. In Part 1, the RI, the CQI, and the NZBI are separately encoded. Part 2 includes the PMI of Type II CSI. Parts 1 and 2 are encoded separately.

Type II CSI report carried on PUSCH are calculated independently of all Type II CSI reporting carried in PUCCH format 1, 3, or 4.

When a higher layer parameter reportQuantity is set to one of values 'cri-RSRP' and 'ssb-Index-RSRP', the CSI feedback is constituted by a single part.

For Type I and Type II CSI reporting configured for the PUCCH but transmitted on the PUSCH, an encoding scheme follows an encoding scheme of the PUCCH.

When the CSI reporting includes two parts in the PUSCH and a CSI payload to be reported has a smaller payload size provided in a PUSCH resource allocated for CSI reporting, the UE may omit some of Part 2 CSI. Omission of Part 2 CSI is determined according to priority, and Priority 0 is the highest priority, and the priority has the lowest priority.

When a UE is scheduled to transmit a transport block on a PUSCH multiplexed with CSI reporting(s), part 2 CSI is omitted only when $$\left[ (O_{CSI-2} + L_{CSI-2}) \cdot \beta_{offset}^{PUSCH} \cdot \sum_{l=0}^{N_{symb,all}^{PUSCH}-1} M_{sc}^{UCI}(l) \Big/ \sum_{r=0}^{C_{UL-SCH}-1} K_r \right]$$

is greater than $$\left[ \alpha \cdot \sum_{l=0}^{N_{symb,all}^{PUSCH}-1} M_{SC}^{UCI}(l) \right] - Q'_{ACK} - Q'_{CSI-1}.$$

In this case, each parameter may be defined as follows.

$O_{CSI-2}$: the number of bits of CSI part 2

$O_{CSI-1}$: the number of bits of CSI part 1

$L_{CSI-2}$: 11 when $O_{CSI-2} \geq 360$ and the number of CRC bits of CSI part 2 if not $\beta_{offset}^{PUSCH} = \beta_{offset}^{HARQ-ACK}$, $\beta_{offset}^{PUSCH} = \beta_{offset}^{CSI-part1}$, $\beta_{offset}^{PUSCH} = \beta_{offset}^{CSI-part2}$ $N_{symb,all}^{PUSCH}$: Total coefficients of OFDM symbols for PUSCH.

$M_{sc}^{UCI}(l)$: the number of resource elements (l=0, 1, 2, ..., $N_{symb,all}^{PUSCH}-1$) which may be used for the transmission of UCI in an OFDM symbol l $C_{UL-SCH}$: the number of code blocks for an UL-SCH for PUSCH transmission.

$K_r$: the size of an r-th code block of an UL-SCH for PUSCH transmission.

$Q'_{CSI-1}$ may be calculated by Equation 24, and $Q'_{ACK}$ may be calculated by Equation 25.

[Equation 24]

$$Q'_{CSI-1} = \min\left\{\left\lceil\frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil, \left\lceil\alpha \cdot \sum_{l=0}^{N_{symb,all}^{PUSCH}-1} M_{sc}^{UCI}(l)\right\rceil - Q'_{ACK}\right\}$$

[Equation 25]

$$Q'_{ACK} = \min\left\{\left\lceil\frac{(O_{ACK} + L_{ACK}) \cdot \beta_{offset}^{PUSCH}}{R \cdot Q_m}\right\rceil, \left\lceil\alpha \cdot \sum_{l=l_0}^{N_{symb,all}^{PUSCH}-1} M_{sc}^{UCI}(l)\right\rceil\right\}$$

The part 2 CSI may be omitted for each level, and is omitted until $$\left\lceil(O_{CSI-2} + L_{CSI-2}) \cdot \beta_{offset}^{PUSCH} \cdot \sum_{l=0}^{N_{symb,all}^{PUSCH}-1} M_{sc}^{UCI}(l) / \sum_{r=0}^{C_{UL-SCH}-1} K_r\right\rceil$$

is equal to or smaller than $$\left\lceil\alpha \cdot \sum_{l=0}^{N_{symb,all}^{PUSCH}-1} M_{SC}^{UCI}(l)\right\rceil - Q'_{ACK} - Q'_{CSI-1}$$

starting from the lowest priority.

When Part 2 CSI is transmitted on the PUSCH without a transport block, bits having low priority may be omitted until the code rate of Part 2 CSI becomes smaller than a critical code rate $c_T$ smaller than 1. $c_T$ may be calculated by Equation 26.

[Equation 26]

$$c_T = \frac{R}{\beta_{offset}^{CSI-part2}}$$

$\beta_{offset}^{CSI-part2}$ means a CSI offconfigured value of Table 19.

R means a code rate signaled through DCI.

TABLE 19

| $I_{offset,\,0}^{CSI-1}$ or $I_{offset,\,1}^{CSI-1}$ $I_{offset,\,0}^{CSI-2}$ or $I_{offset,\,1}^{CSI-2}$ | $\beta_{offset}^{CSI-1}$ $\beta_{offset}^{CSI-2}$ |
|---|---|
| 0 | 1.125 |
| 1 | 1.250 |
| 2 | 1.375 |
| 3 | 1.625 |
| 4 | 1.750 |
| 5 | 2.000 |
| 6 | 2.250 |
| 7 | 2.500 |
| 8 | 2.875 |
| 9 | 3.125 |
| 10 | 3.500 |
| 11 | 4.000 |
| 12 | 5.000 |
| 13 | 6.250 |
| 14 | 8.000 |
| 15 | 10.000 |
| 16 | 12.625 |
| 17 | 15.875 |
| 18 | 20.000 |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |

If a UE is configured an active semi-persistent CSI report configuration on a PUSCH, CSI reporting is deactivated whenever a downlink BWP or an uplink BWP is changed. Another activation command is necessary to activate the semi-persistent CSI report.

Type II CSI based on the aforementioned linear combination (LC) for more accurate CSI feedback was introduced in order to improve MU-MIMO performance in the New RAT. The Type II CSI increases the accuracy of CSI, but has a problem in that a payload of the CSI is greatly increased. Accordingly, in order to solve such a problem, there are proposed codebook designs for reducing the size of a payload and almost preventing the degradation of performance.

Time-Domain Compression
Frequency-Domain Compression

The two methods use a characteristic in that PMIs for each SB (or for each PRB) have a correlation in a frequency domain. The time domain compression, that is, the first method, is method of reducing a maximum overhead by representing a correlation in a frequency axis as maximum delay in the time domain and representing an SB PMI configuration as a function of maximum delay of specific basis beams.

The frequency domain compression, that is, the second method, is a method of reducing a maximum payload by projection or linear transform of specific bases with respect to PMIs for each SB (or for each PRB).

The present disclosure proposes a configuration for CSI reporting contents, omission and a scheme for reducing overhead when a scheme for reducing overhead of the Type II codebook is used.

Time Domain Compression

As illustrated in FIG. 9, the New RAT supports multi-panel functionality, but in the present disclosure, a single panel is first considered for convenience sake. However, the present disclosure is not limited thereto, and it is evident that the present disclosure may also be applied to multiple panels in addition to a single panel.

First, a 2D discrete Fourier transform (DFT) beam to be applied to a 2D antenna array within a single panel may be defined as in Equation 27. In this case, m1 and m2 are indices of a 1D-DFT codebook in $1^{st}$ and $2^{nd}$ domains.

$$w_{m_1,m_2} = \frac{v_{m_1} \otimes u_{m_2}}{\sqrt{N_1 N_2}}$$ [Equation 27]

In Equation 27, each variable is defined as follows.

each of $N_1$ and $N_2$ means the number of antenna ports for each pole in the $1^{st}$ and $2^{nd}$ dimensions in a panel.

$o_1$ and $o_2$ mean oversampling factors in the $1^{st}$ and $2^{nd}$ dimensions.

$$v_{m_1} = \left[1 \ \exp\left(j\frac{2\pi m_1}{o_1 N_1}\right) \ ... \ \exp\left(j\frac{2\pi m_1(N_1-1)}{o_1 N_1}\right)\right]^T$$

$$u_{m_2} = \left[1 \ \exp\left(j\frac{2\pi m_2}{o_2 N_2}\right) \ ... \ \exp\left(j\frac{2\pi m_2(N_2-1)}{o_2 N_2}\right)\right]^T$$

Equation 27 indicates a case where port indexing is first performed in the $N_2$ domain, and may also be extended and applied to a case where port of the $N_1$ domain is first indexed.

Frequency selectivity in the frequency axis is related to a multi-path channel response according to a multi-path. In general, if delay occurring due to a multi-path is great, the probability that frequency selectivity will occur is increased. Delay in the time axis is interpreted as a phase change in the frequency axis. The phase change in the frequency axis may be indicated as a function of the frequency.

For example, the phase change in the frequency axis may be represented as $\exp(-j2\pi k\delta)$. k indicates an index (e.g., subcarrier index, subband index) corresponding to a corresponding frequency, and delta ($\delta$) may be defined as a coefficient indicative of a degree of a frequency phase change.

$W_1$ is a block diagonal matrix as in Equation 28, and defined as $B_i=[b_{i,1}, b_{i,2}, \ldots, b_{i,L}](\in \mathbb{C}^{N_1 N_2 \times L})$. $b_{i,1}$ (l=1, ..., L) is a 2D/1D DFT beam defined as Equation 28. L may indicate the number of beams that are linearly combined, and this value may be represented as L=2, 3, 4, for example.

The L value may be previously agreed between a base station and a UE, or the base station may notify the UE of the L value through a higher layer signal (e.g., RRC or MAC CE). Alternatively, the UE may feed information on the L value back to the base station.

$$W_1 = \begin{bmatrix} B_1 & 0 \\ 0 & B_2 \end{bmatrix}$$ [Equation 28]

FIG. 27 illustrates an example of an orthogonal beam set to which a method proposed in the present disclosure may be applied.

Beams in which each block diagonal matrix $B_i$ is configured may be calculated from an orthogonal basis as illustrated in FIG. 27. That is, an L beam may be selected from an N1N2-orthogonal basis configured with (N1N2-1) beams orthogonal to a given leading beam index (e.g., corresponding to i11, i12 of a codebook) or a corresponding subset.

In the present disclosure, for convenience of description, $B_1=B_2=B$ will be first described. Elements that construct $W_1$ may include leading beam selection, combining beam selection (e.g., L−1 beam selection out of N1N2-1 beams), power coefficient indicator, and a phase change value ($\delta$) for each of the aforementioned beams. In this case, the elements of $B=[b_1, b_2, \ldots, b_L](\in \mathbb{C}^{N_1 N_2 \times L})$ that constructs B are the same as Equation 29.

$$B=[b_1 e^{-j2\pi k\delta_1+\varepsilon_1}, p_2 b_2 e^{-j2\pi k\delta_2+\varepsilon_2}, \ldots,$$
$$p_L b_L e^{-j2\pi k\delta_L+\varepsilon_L}](\in \mathbb{C}^{N_1 N_2 \times L})$$ [Equation 29]

In Equation 29, $b_1$ indicates a leading beam $b_l$(l=2, ..., L), indicates beams combined with the leading beam, and $P_l$ indicates relative beam power based on the leading beam.

In this case, a value, such as (e.g., $P_l=\{1, \sqrt{0.5}, \sqrt{0.25}, 0\}$), may be previously set or base station may notify a UE of the granularity of a power configured value through a higher layer signal.

Alternatively, the UE may feed information on the granularity of a power configured value back to the base station. The power information may be different depending on a layer and/or polarization.

In Equation 29, a variable of the phase change value may be defined as in Equation 30.

$$\delta_l = \frac{\lambda_l}{\upsilon \eta}$$ [Equation 30]

In Equation 30, variables that construct $\delta_l$ may be defined as follows.

The $\eta$ value may be transmitted to a UE through a higher layer (radio resource control (RRC) or media access control control element (MAC CE)) or a previously agreed value may be used according to a numerology.

Alternatively, in {128, 256, 512, 1024, 2048, 4096}, the smallest value satisfying $\eta \geq N_{cRB}^{DL} N_{sc}^{cRB}$ may be set as the $\eta$ value. In this case, $N_{cRB}^{DL}$, $N_{sc}^{cRB}$ are the number of RBs configured for CSI reporting and the number of configured subcarriers per RB, respectively. $N_{cRB}^{DL} N_{sc}^{cRB}$ is the number of subcarriers within a BW configured for CSI reporting.

Alternatively, a base station may set the size of a fast Fourier transform (FFT) or a UE may additionally report the size of an FFT.

A value of $\upsilon$ is an oversampling value (of the FFT size), and may have a specific integer value (e.g., 1, 2, 4 ... ) (may be a system parameter not related to a specific beam). The value may be automatically set depending on a numerology or a base station may set the value for a UE.

$\lambda_l$ is a value related to a phase change speed within a BW configured per beam. For example, when $\lambda_l=2$, and l-th beam may mean that a phase is changed by 4pi within a configured BW.

A value of $\lambda_l$ may have a specific integer value (e.g., 1, 2, 4 ... ). A base station may set the $\lambda_l$ value for a UE or the UE may feed, to the base station, back the $\lambda_l$ value for each beam within a set of the $\lambda_l$ value.

As one embodiment of a method of estimating the value of Equation 30, if a channel represented as each subcarrier or RB is defined as $H(k) \in \mathbb{C}^{N_R \times N_T}$, a UE may obtain values represented as respective subcarriers or RBs by applying W1, that is, a basis matrix for a linear combination to H(k).

In this case, an Eigen vector of each channel may be calculated through an SVD operation of $H(k)=U_k \Sigma_k V_k^H$. Each variable of H(k) may be defined as in Equation 31.

$$U_k \in \mathbb{C}^{N_R \times N_T},$$ [Equation 31]

$$\Sigma_k = \left[\sum_k 0\right] \in C^{N_r \times N_t} \left(\sum_k \in C^{N_r \times N_r}\right),$$
$$V_k = [v_{k1}, \ldots, v_{kN_T}] \in C^{N_t \times N_t}$$

In Equation 31, U and V are unitary matrices, and $\Sigma_k$ is a diagonal matrix in which a diagonal element is an Eigen value. In this case, a channel represented as a rank1 of a channel H_k is v_k1, and may be represented as an Eigen vector (if the rank is R, an r-th Eigen vector(v_kr) may be used as an r-th layer).

Accordingly, a term corresponding to a phase per beam may be calculated by applying a channel value to a basis for a beam combination by using an equation, such as $c_k = (W_1^H W_1)^{-1} W_1^H v_{k1}$. In this case, $c_k$ is a value corresponding to a phase and amplitude per beam of a k-th channel, and may be defined as in Equation 32.

$$c_k = \begin{bmatrix} p_{k,1} e^{j\theta_{k,1}} \\ p_{k,2} e^{j\theta_{k,2}} \\ \vdots \\ p_{k,2L} e^{j\theta_{k,2L}} \end{bmatrix} \quad \text{[Equation 32]}$$

In the present embodiment, if the best beam is the first beam or it is assumed that the best beam has been rearranged to become the first or have different power for each polarization, a polarization sequence may be changed depending on the size of a leading beam. A sequence of such a changed beam may be recognized by a UE through 1 bit.

The leading beam may be relatively represented as in Equation 33.

$$c_k = \begin{bmatrix} 1 \\ \overline{p}_{k,2} e^{j\overline{\theta}_{k,2}} \\ \vdots \\ \overline{p}_{k,2L} e^{j\overline{\theta}_{k,2L}} \end{bmatrix} \quad \text{[Equation 23]}$$

In Equation 33, parameters may be represented as $$\overline{\theta}_{k,j} = \theta_{k,j} - \theta_{k,1} \text{ and } \overline{p}_{k,j} = \frac{p_{k,j}}{p_{k,1}}.$$

Accordingly, Equation 33 may be represented as $C = [\overline{c}_1, \overline{c}_2, \ldots, \overline{c}_{N_{RB}}] \in C^{2L \times N_{RB}}$, and may take an IFFT per l-th row (in this case, if the number of samples of each row is small, it be understood that the remaining part is zero-padded and an IFFT is applied thereto).

For example, if the size of an FFT is 64 and the number of RBs is 52, 12 samples may be zero-padded, and an IFFT may be applied thereto.

$N_{RB}$ may be represented as the number of RBs for convenience sake of representation, and may be defined as the number of samples used in the frequency axis. That is, $N_{RB}$ may also be defined as the number of (set or reported) SBs.

Through such a method, more precise delta values can be calculated by obtaining an oversampling effect. In the time domain, an index having the greatest peak becomes a maximum delay value in the time domain, and may be calculated through Equation 34.

$$\delta_l = \frac{\lambda_l}{v\eta} = \frac{\text{Index}_{peak}}{FFT_{size}} \quad \text{[Equation 34]}$$

Furthermore, amplitude and a phase value of a complex scalar value of a corresponding time domain index may be calculated as $p_l$, $\varepsilon_l$ of an l-th beam, respectively. An $\delta_l$ value itself may be quantized for the feedback of the calculated value or an FFT size (previously agreed or a base station configures the FFT size or a UE may report the FFT size) and an index may be reported.

Values of $p_l$, $\varepsilon_l$ may also be quantized and fed back as previously agreed (configured) granularity. Accordingly, such a method is a method of independently feeding back the values in polarization.

With respect to a case where a structure of $$W_1 = \begin{bmatrix} B_1 & 0 \\ 0 & B_2 \end{bmatrix},$$

that is, a beam group is different for each polarization, a method of calculating a delay parameter of 2L beams has been described. However, depending on a codebook configuration method to be described later, a beam combination is first calculated with respect to polarization on one side, and a beam combination may be then calculated with respect to polarization on the other side through an operation, such as co-phase.

In Equation 29, the remaining parameters may be defined/configured as follows. An k index is a value of an index corresponding to a frequency used upon SB report, and this is set based on a given subcarrier or SB, and is additionally not reported.

A value of $\varepsilon_l$ indicates a phase offconfigured value of an l-th beam. As in the example of $$\varepsilon_l = \left\{0, \frac{j\pi}{4}, \frac{j2\pi}{4}, \frac{j3\pi}{4}\right\} \text{ or } \varepsilon_l = \left\{0, \frac{j\pi}{8}, \ldots \frac{j7\pi}{8}\right\},$$

the value of $\varepsilon_l$ is a value set so that a phase offset per beam has a value, such as QPSK or 8PSK. A UE may additionally feed, to a base station, back the value of $\varepsilon_l$ per beam.

Alternatively, if a phase offset is neglected and set as 0, feedback overhead can be significantly reduced. Such an effect is normalized as a phase and/or amplitude of a leading beam, and may be recognized that a phase offset is corrected or a method of reporting a differential between the offset of a leading beam and the offset of a beam, such as the second or the third, may be applied in order to reduce bits that are fed back.

For example, assuming that the offset of a leading beam is 3-bit feedback, granularity smaller than a differential, for example, 1-bit feedback may be performed.

FIG. 28 illustrates an example of a multi-path which may occur when data is transmitted to which a method proposed in the present disclosure may be applied.

In the aforementioned method, a method of configuring a codebook if a 2L DFT beam corresponding to each basis matrix has one dominant delay has been described. However, as illustrated in FIG. 28, in frequency selectivity, the same beam may be received by a UE with different delay due to a phenomenon, such as diffraction/refraction attributable to an obstacle.

If a beam is a dominant beam having strong received strength among basis beams constructing B, there is a problem in that the degradation of performance occurs because a UE configures a codebook by using only some of power of a received beam when only one dominant delay is considered. Accordingly, the present disclosure proposes a method of configuring a codebook by considering most of power of a beam corresponding to each basis beam.

To this end, if a common method of configuring a codebook which is first proposed is represented again, a corresponding method is the same as Equation 35.

$$\begin{bmatrix} B_1 & 0 \\ 0 & B_2 \end{bmatrix} = \begin{bmatrix} b_{1,1}, b_{1,2}, \ldots, b_{i,L} & 0 \\ 0 & b_{2,1}, b_{2,2}, \ldots, b_{2,L} \end{bmatrix} =$$

$$[\bar{b}_1, \ldots, \bar{b}_{2L}] \in C^{2N_1 N_2 \times 2L}$$

[Equation 35]

where $$\bar{b}_i = \begin{cases} \begin{bmatrix} b_{1,i} \\ 0 \end{bmatrix} & \text{for } i = 1, \ldots, L \\ \begin{bmatrix} 0 \\ b_{2,i-L} \end{bmatrix} & \text{for } i = L+1, \ldots, 2L \end{cases}$$

In this case, a structure of a rank 1 codebook of a k-th subcarrier or RB index is the same as Equation 36.

$$W_k^{(1)} = [\bar{b}_1, \ldots, \bar{b}_{2L}]c = [\bar{b}_1, \ldots, \bar{b}_{2L}] \begin{bmatrix} p_1 e^{-j2\pi k \delta_1 + \varepsilon_1} \\ p_2 e^{-j2\pi k \delta_2 + \varepsilon_2} \\ \vdots \\ p_{2L} e^{-j2\pi k \delta_{2L} + \varepsilon_{2L}} \end{bmatrix}$$

[Equation 36]

Alternatively, if a relative size of a leading beam is applied, the structure of the rank 1 codebook is the same as Equation 37.

$$W_k^{(1)} = [\bar{b}_1, \ldots, \bar{b}_{2L}]c = [\bar{b}_1, \ldots, \bar{b}_{2L}] \begin{bmatrix} 1 \\ \bar{p}_2 e^{-j2\pi k \bar{\delta}_2 + \bar{\varepsilon}_2} \\ \vdots \\ \bar{p}_{2L} e^{-j2\pi k \bar{\delta}_{2L} + \bar{\varepsilon}_{2L}} \end{bmatrix}$$

[Equation 37]

In Equation 37, $\bar{p}, \bar{\delta}, \bar{\varepsilon}$ are parameters divided by a leading beam parameter. Such methods have been described by taking the case of the rank 1 as an example. If rank>1, a codebook may be configured by independently calculating the structure for each layer. This is for well incorporating characteristics of a channel by using the codebook.

<Method 1: N strong beams including the same beam for different delays are selected (N may be set regardless of 2L. That is, N may be set to be smaller than or greater than 2L)>

If Method 1 is used, the structure of a codebook is the same as Equation 38.

$$W_k^{(1)} = [\bar{b}_1, \ldots, \bar{b}_{2L}]Sc = [\bar{b}_1, \ldots, \bar{b}_{2L}]S \begin{bmatrix} p_1 e^{-j2\pi k \delta_1 + \varepsilon_1} \\ p_2 e^{-j2\pi k \delta_2 + \varepsilon_2} \\ \vdots \\ p_N e^{-j2\pi k \delta_N + \varepsilon_N} \end{bmatrix}$$

[Equation 38]

In this case, in order to reduce a feedback bit value, a case where normalization is performed using a leading or best beam may be included. In Equation 38, S means a matrix for mapping 2L beams to N beams. That is, S may be represented as in Equation 39.

$$S = [e_{s_1}, e_{s_2}, \ldots, e_{s_N}] \in C^{2L \times N}$$

[Equation 39]

In Equation 39, $e_j$ is a selection vector in which only a j-th element is 1, and means an index of a beam preferred as an i-th sequence when all delay per beam is considered as $s_i \in \{1, 2, \ldots, 2L\}$ (i=1, \ldots, N).

For example, 64 IFFT has 64 delay taps per beam, and indicates an index of a beam that is preferred an i-th sequence among a total of 2L*64 (beam, delay) pairs. If L=2 and N=2, a 2-nd tap and 10-th tap of a 1-th beam are the best beams and calculated/selected by a UE, S is the same as Equation 40, and may be calculated as $$\delta_1 = \frac{2}{64}, \delta_2 = \frac{10}{64}.$$

$$S = \begin{bmatrix} 1 & 1 \\ 0 & 0 \\ 0 & 0 \\ 0 & 0 \end{bmatrix}$$

[Equation 40]

(Method 1-1)

FIG. 29 illustrates an example of a signal in a time domain to which a method proposed in the present disclosure may be applied.

Method 1 may become problematic because the size of feedback information on the best N-beam selection is greater than values of L and N. That is, if the number of branches of $(2L)^N$ has to be fed back, when the values of L and N become great, there is a problem in that the size of information that needs to be fed back from a UE to a base station is excessively increased.

Accordingly, in order to solve the problem, a method of selecting the number of W contiguous taps per beam or the number of taps selected according to a specific rule and feeding the number back may be applied. Such a case may be effective when most of power is crowded near a maximum delay tap.

Alternatively, if an IFFT is greatly oversampled due to oversampling, it may be advantageous to incorporate most of signal power.

FIG. 29 illustrates a time domain signal in which an IFFT has been performed on samples in the frequency domain. In FIG. 29, a dotted arrow indicates maximum delay. In this case, samples in the frequency domain can be more accurately decoded by selecting samples for three taps including both sides (i.e., W=3) of the maximum delay tap rather than selecting only a sample corresponding to a tap having maximum delay.

In this case, if only one index corresponding to the best tap per beam is fed back, $$\delta_l = \frac{\lambda_l}{v\eta} = \frac{\text{Index}_{peak}}{FFT_{size}}$$

for the remaining W−1 taps can be calculated. Values of $p_l$, $\varepsilon_l$ need to be separately fed back from a UE to a base station. Accordingly, the base station may configured, for the UE, information on the size of W, that is, how many taps per beam will be fed back or according to which rule W taps will be selected.

In the case of the number of Ws, the size of W may also be fed back so that a UE is configured to measure a channel and to feed back a greater W value when delay spread is great and feeds back a smaller W value when the delay spread is small. Such a method can effectively reduce fed back overhead.

(Method 2)

With respect to K strong beams, a UE may feed W delay taps back to a base station. With respect to 2L-K beams, the UE may feed one maximum delay tap back to the base station.

Method 2 is an effective method for properly incorporating the trade-off of fed back overhead and performance of a UE. Most of frequency selectivity applies the principle that it is determined by a dominant specific beam, and such a property is further compatible with mm wave having stronger straightness.

Other parameters other than the method of selecting K strong beams may be calculated by the aforementioned method. The method of selecting K strong beams may be indicated by permutation. That is, when K=2, a total number of cases correspond to the number of cases of 2L*(2L−1). A UE may notify a base station of a strong beam by feeding corresponding information back to the base station.

Alternatively, if orthogonal basis matrices are arranged in order of dominant beams, fed back information for indicating additional K beams may be omitted. A value of K (the K value is measured by a UE and may be calculated by measuring a correlation between a channel and beams that constructs a basis matrix or may be considered to be a dominant beam when a value of reported p_1 exceeds a specific value, for example, 0.5) may be additionally fed back to a base station or the K value may be previously agreed with the base station.

Alternatively, regardless of $B_1=B_2$, $B_1 \neq B_2$, a case where power is crowed in a specific polarization with respect to a specific channel may occur. If basis matrices are arranged for each polarization, a UE may additionally notify a base station which polarization (H slant or V-slant) ios dominant by using 1 bit in the best beam selection from the basis matrix.

Frequency Domain Compression

In NR for Equation 36, a rank-1 PMI configured in a k-th frequency index (e.g., PRB, SB) for Type II CSI is the same as Equation 41.

[Equation 41]

$$W_k^{(1)} = W_1 \bar{c}_k = [\bar{b}_1 \cdots \bar{b}_{2L}] \begin{bmatrix} c_{1,k} \\ \vdots \\ c_{2L,k} \end{bmatrix} = [\bar{b}_1 \cdots \bar{b}_{2L}] \begin{bmatrix} p_{k,1} e^{j\theta_{k,1}} \\ p_{k,2} e^{j\theta_{k,2}} \\ \vdots \\ p_{k,2L} e^{j\theta_{k,2L}} \end{bmatrix}$$

Equation 42 is obtained if the rank-1 PMIs of Equation 41 are stacked and represented with respect to all frequency indices.

$$W_S = W_1 C = [\bar{b}_1 \ldots \bar{b}_{2L}][\bar{c}_1 \ldots \bar{c}_{N_{RB}}]$$ [Equation 42]

Where $C=[\bar{c}_1, \bar{c}_2, \ldots, \bar{c}_{N_{RB}}] \in \mathbb{C}^{2L \times N_{RB}}$ In Equation 42, for convenience sake of representation, the size of a frequency index is indicated as the number of PRBs ($N_{RB}$) within a configured BWP, but may be represented as the number of configured SBs or the number of reported SBs according to circumstances.

If decomposition is performed using the number of PRBs as one basis matrix, Equation 43 is obtained.

$$W_S = W_1 C \approx W_1 \bar{C} W_F^H$$

In Equation 43, if $\bar{C} \in \mathbb{C}^{2L \times K}$, $W_f \in \mathbb{C}^{N_{RB} \times K}$ and $W_F$ is an orthogonal basis matrix, Equation 43 may be calculated as $\bar{C}=CW_F$. In CSI reporting of the existing Type II CSI, information on $W_1$ and a combination coefficient C (in this case, the size of C will be 2L-by-No) for each reported SB are reported, whereas frequency domain compression represented as Equation 43 reports information on $W_1$, $\bar{C}$, and information (e.g., index) on $W_F$, thereby being capable of greatly reducing total overhead.

The optimized method of reducing overhead is determined by a K value that determines the dimension of $\bar{C}$ that reports a coefficient without any change, that is, by the number of projected orthogonal basis matrices, which becomes an element that determines the trade-off of performance and overhead. For example, when the K value becomes $N_{RB}$, $\bar{C}=C$ becomes, and the existing Type II CSI report results in.

Hereinafter, a method for reporting CSI when the capacity of a resource allocated for CSI reporting is smaller than the size of a payload of the CSI calculated by a UE in the Type II CSI is described.

<Proposal 1: when the Capacity of a Resource Allocated for CSI Reporting is Smaller than the Size of a Payload of the CSI Calculated by a UE, the Entire CSI May be Dropped or Only Part 1 CSI is Reported>

If CSI is reported using a time domain (TD) compression-based codebook or a frequency-domain (FD) compression-based codebook, when the capacity (or size) of a resource (e.g., a physical uplink shared channel (PUSCH) or a physical uplink control channel (PUCCH)) allocated for CSI reporting through higher layer signaling or DCI is smaller than a payload of the CSI to be reported, the entire CSI may be dropped and not reported or only some (e.g., Part 1 CSI) of the CSI may be reported to a base station.

Specifically, the UE may derive parameters for reporting the CSI by calculating the parameters based on configuration information transmitted by the base station. Thereafter, when the capacity of a resource for CSI reporting allocated through DCI is smaller than the size of a payload of the CSI including the derived parameters, the UE cannot report all of the derived parameters to the base station on the allocated resource.

In this case, the UE may not report the CSI to the base station by dropping the entire CSI or may omit some of the derived parameters and report the CSI to the base station. For example, the UE may omit Part 2 CSI among Part 1 CSI and Part 2 CSI and report only Part 1 CSI to the base station.

Currently, in the case of NR MIMO, if an uplink resource for CSI feedback is insufficient, some SB CSI (even or odd SB) may be omitted and reported. However, the concept of SB CSI may become ambiguous if CSI is reported using the aforementioned time domain or frequency domain compression-based codebook.

For example, if CSI is reported using the time domain or frequency domain compression method, whether calculated CSI is an SB or a WB cannot be clearly determined because the CSI is calculated and derived using a preferred or strong beam (or delay tap) without distinguishing between the SB and the WB.

That is, it is because, if an SB report is configured, reporting CSI is not clearly distinguished for each SB, but CSI reporting is performed through a method of reporting the CSI to a base station based on a representative parameter for CSI calculation for each SB or by abbreviating a specific SB PMI into a smaller domain and decoding, by the base station, the CSI again.

Accordingly, if the capacity of a resource configured for CSI reporting is smaller than a payload of CSI calculated and derived by a UE, the UE may drop the entire CSI or may report only some of the CSI to a base station.

<Proposal 1-1: when the Capacity of a Resource Allocated for CSI Reporting is Smaller than the Size of a Payload of CSI Calculated by a UE, the UE Reports WB CSI Although an SB CSI Report is Configured>

In the case of the case described in Proposal 1, a UE may calculate CSI as CSI for a WB and report the CSI although the UE is configured to report SB CSI (e.g., if the UE is configured to report an SB PMI and/or SB CQI) from a base station.

Specifically, although the UE is configured to reports SB CSI by the base station, when the capacity of a resource configured for CSI reporting is smaller than the size of a payload of CSI to be reported, the UE operates as a WB CSI report and report the WB CSI to the base station.

In this case, the WB CSI may include at least one of a CRI, an RI, a WB PMI or a WB CQI. The WB PMI is a PMI that represents a channel of a configured report band, and includes a full codebook form of the Type II codebook, that is, a form composed of WB $W_1$ and WB $W_2$.

Furthermore, in the case of Part 1 CSI, since the size of a payload is fixed, if a UE is configured with an SB report, an SB CQI within the part 1 needs to be calculated and reported based on a time domain or frequency domain method or an SB PMI calculated based on the Type II CSI.

In this case, since a base station may be ambiguous about whether CSI reported by a UE is SB CSI or WB CSI, the CSI may include, in Part 1 CSI, a 1-bit indicator (e.g., 1 bit WB/SB reporting indicator) or flag indicating whether the CSI reported by the UE is SB CSI or WB CSI.

Alternatively, a CQI field may be used as an implicit method. If a UE is configured to report an SB CQI, the capacity of a resource configured for CSI reporting may be smaller than a payload of CSI to be reported.

In this case, the UE reports WB PMI (in this case, a WB PMI means a PMI configured with WB $W_1$ and/or WB $W_2$) without calculating an SB PMI, and may report a corresponding WB CQI. In this case, the UE may report an SB CQI field in which all values are the same specific value (e.g., index 1 or 2 or 3) for implicit signaling indicating whether reported Part2 CSI is a WB or an SB. The reason for this is that the SB CQI is given as a 2-bit differential with a 4-bit WB CQI. A case where the entire reporting SB CQI indicates the same index includes only a case where an SB CQI index is 0. In this case, CQI values of all SBs are the same.

However, if all SB CQI indices indicate other values not 0, a base station recognizes this as an error case. The base station may determine whether CSI reported in Part 2 CSI is a WB or an SB by checking the CQI field of Part 1 CSI.

In the case of such a method, there is an advantage in that the existing field can be used without any change without increasing a separate field within Part 1 CSI. The implicit signaling may also be used to provide notification of the size of a payload of Part 2 CSI in addition to a WB/SB CSI indicator use.

For example, with respect to a subband indices s, a 2-bit subband differential CQI may be defined as follows.

Sub-band Offset level(s)=sub-band CQI index(s)−wideband CQI index.

An offset level of 2-bit subband differential CQI values are the same as Table 20.

TABLE 20

| Sub-band differential CQI value | Offset level |
| --- | --- |
| 0 | 0 |
| 1 | 1 |
| 2 | ≥2 |
| 3 | ≤−1 |

<Proposal 1-2: when the Capacity of a Resource Allocated for CSI Reporting is Smaller than the Size of a Payload of CSI Calculated by a UE, the UE May Omit the CSI According to a Specific Rule>

A UE may omit parameter values of CSI according to a specific rule when the capacity of a resource allocated by a base station is smaller than a calculated size of a payload of CSI, that is, the situation of Proposal 1, in the report of the CSI using the time domain or frequency domain compression-based codebook.

That is, since the omission rule of CSI not using the time domain or frequency domain compression-based codebook cannot be applied to the report of CSI using the time domain or frequency domain compression-based codebook without any change, CSI may be omitted until the size of a payload of CSI is equal to or smaller than the capacity of an allocated resource according to an omission rule based on new priority, such as Table 21.

TABLE 21

Priority 0:
Part 2 wideband CSI for CSI reports 1 to $N_{Rep}$
Priority 1:
Part 2 subband CSI for CSI report 1
Priority 2:
Part 2 subband CSI for CSI report 2
.
.
.
Priority $N_{Rep}$ + 1:
Part 2 subband CSI for CSI report $N_{Rep}$ In this case, the part 2 WB CSI and the part 2 SB CSI may include the following parameters.
In the case of the time domain compression,
WB CSI:
Linear combining basis: {bi}
Strongest beam index for selected basis per layer
WB amplitude per layer
Layer indicator
SB CSI:
Delay parameter per layer: $\{\delta_i\}$
Phase offset parameter per layer: $\{\varepsilon_i\}$
In the case of the frequency domain compression,
WB CSI:
Linear combining basis: {bi}
Strongest beam index for selected basis per layer
WB amplitude per layer
Layer indicator
SB CSI:
Compressed coefficient matrix $\bar{C} \in \mathbb{C}^{2L \times K}$
May include SB amplitude, i.e., non-uniform amplitude of each coefficients in the matrix $\bar{C} \in \mathbb{C}^{2L \times K}$
Index for Frequency domain projection basis $W_F \in \mathbb{C}^{N_{RB} \times K}$
Alternatively, the part 2 WB CSI and the part 2 SB CSI may include the following parameters.

WB CSI:
Linear combining basis: {bi} for $W_1$
Strongest beam index for selected basis per layer and its corresponding amplitude
WB amplitude per layer
Layer indicator
SB CSI:
Non-zero compressed coefficients matrix $\overline{C} \in C^{2L \times K}$: amplitude and phase
Information of non-zero coefficients in $\overline{C} \in C^{2L \times K}$ (e.g., bitmap)
Information for Frequency domain projection basis $W_F \in C^{N_{RB} \times K}$ Alternatively, the part 2 WB CSI and the part 2 SB CSI may include the following parameters.
WB CSI:
Linear combining basis: {bi} for $W_1$
Strongest beam index for selected basis per layer and its corresponding amplitude
WB amplitude per layer
Layer indicator
Information of non-zero coefficients in $\overline{C} \in C^{2L \times K}$ (e.g., bitmap)
Information for Frequency domain projection basis $W_F \in C^{N_{RB} \times K}$
SB CSI:
Non-zero compressed coefficients matrix $\overline{C} \in C^{2L \times K}$: amplitude and phase Some elements that construct CSI may not be included. Furthermore, for convenience sake of description, WB CSI and SB CSI are denoted, but may be differently named because the term of the SB may be ambiguous. For example, CSI 1=WB CSI and CSI 2=SB CSI may result in. CSI1 have CSI priority over CSI2. That is, in the CSI omission situation as in the example, CSI 1 may be given priority.

<Proposal 1-3: When the Capacity of a Resource Allocated for CSI Reporting is Smaller than the Size of a Payload of CSI Calculated by a UE, the UE can Further Compress the CSI by Reducing a Value of a Codebook Parameter for Configuring a Time Domain or Frequency Domain Compression-Based Codebook in a Value or Set of Values Configured Based on UE Capability, According to a Specific Rule>

Specifically, the UE may derive CSI by calculating the CSI by using the aforementioned time domain or frequency domain compression-based codebook configuration, based on a parameter included in configuration information transmitted by a base station.

When the size of a payload of the derived CSI is greater than the capacity of a resource allocated for CSI reporting for the UE, the UE may reduce a value of a codebook parameter for configuring a codebook in a value or set of values configured based on the UE capability, according to a specific rule, and may report the CSI to the base station by compressing (or omitting) the CSI.

That is, when the capacity of a resource configured for CSI reporting is smaller than a payload calculated based on a plurality of configured codebook parameters, the UE may calculate and/or determine a plurality of codebook parameters that is the most optimized and satisfy the capacity, and may report the CSI.

In this case, the codebook parameter may include at least one of a value for determining a dimension of a compressed coefficient matrix, the number of combination coefficients for calculating a PMI, the size of a fast Fourier transform (FFT), oversampling information, or the number of beams selected among a plurality of beams for calculating the PMI.

In the case of Proposal 1-3, CSI compression is performed from a sequence having high priority to a sequence having low priority (e.g., a sequence having actual high priority) in Table 22. Accordingly, the final parameter value at which the size of a payload of calculated CSI is smaller than or equal to the capacity of a resource (e.g., PUSCH or PUCCH) configured by a base station may be determined for CSI reporting. CSI compression may be performed using the determined parameter value.

TABLE 22

Priority 0:
Part 2 wideband CSI for CSI reports 1 to $N_{Rep}$
Priority 1:
Part 2 subband CSI based on K = 1 for CSI report 1
Priority 2:
Part 2 subband CSI based on K = 2 for CSI report 1
.
.
.
Priority $K_1$:
Part 2 subband CSI based on $K = K_1$ for CSI report 1
.
.
.
Priority $\sum_{m=1}^{N_{Rep}} K_m$ Part 2 subband CSI based on K = 1 for CSI report $N_{Rep}$ In Table 22, $K_i$ is a K value set in CSI reporting i, which may be set as a maximum value or a set of K values configured by a base station based on the capability of a UE reported by the UE or as a previously agreed value.

For example, when an allocated resource is not smaller than the size of a payload of calculated CSI, that is, if additional compression is not performed, the K value may be NsB.

Specifically, in Part 2 CSI, if uplink control information (UCI) is transmitted along with data, that is, if a transport block is scheduled to be transmitted on a PUSCH multiplexed with CSI reporting, some of CSI may be sequentially compressed (or omitted) based on priority until the following rule is satisfied.

That is, Part 2 CSI may be omitted for each level starting from the lowest priority level (highest priority value) until $$\left\lceil (O_{CSI-2} + L_{CSI-2}) \cdot \beta_{offset}^{PUSCH} \cdot \sum_{l=0}^{N_{symb,all}^{PUSCH}-1} M_{sc}^{UCI}(l) \bigg/ \sum_{r=0}^{C_{UL-SCH}-1} K_r \right\rceil$$

is equal to or smaller than $$\left\lceil \alpha \cdot \sum_{l=0}^{N_{symb,all}^{PUSCH}-1} M_{sc}^{UCI}(l) \right\rceil - Q'_{ACK} - Q'_{CSI-1}.$$

Alternatively, if part 2 CSI is transmitted on a PUSCH without any transport block, bits having low priority may be omitted until part 2 CSI becomes smaller than a critical code rate $c_T$ having a code rate smaller than 1.

In this case, $c_T$ may be calculated by Equation 44.

$$c_T = \frac{R}{\beta_{offset}^{CSI-part2}} \qquad \text{[Equation 44]}$$

$\beta_{offset}^{CSI-part2}$ means a CSI offset configured value in Table 19.

R means a code rate scheduled through DCI.

Proposal 1-3 is described by taking the frequency domain compression-based codebook configuration as an example, but the present embodiment is not limited thereto and may also be applied to the time domain compression-based codebook configuration.

In this case, the K value may be changed into FFT associated information (size or oversampling) or the number of taps and applied. In addition, regardless of a compression method, a value of the number of linear combination beams L which may be all applied may be applied.

As another example of Proposal 1-3, a parameter and a fall back parameter (default value) for compression may be set. That is, in Proposal 1-3, if a value of K is set as a first specific value (e.g., 5) through a higher layer parameter and a fall back value is set as a second specific value (e.g., 2), when the capacity of a resource configured for CSI reporting is smaller than the size of a payload of CSI calculated using the K value as 5, a UE may calculate CSI by using the K value as 2 and report the CSI.

If CSI calculated using the K value as 2 does not satisfy the capacity of a resource, the method of Proposal 1 or 1-1 may be applied.

That is, a UE may receive, from a base station, plurality of parameter values including the fall back value for each of codebook configuration parameters for configuring a codebook, may calculate CSI again by applying the fall back value when the CSI calculated by the received parameter is greater than the resource allocated for CSI reporting, and may report the CSI on the allocated resource.

However, if CSI calculated by applying the fall back value is also greater than the allocated resource, the UE may drop the entire calculated CSI or drop only some of the CSI, and may report the CSI.

As another example of the present embodiment, a configuration rule for reducing parameter set or a parameter for a codebook parameter for compression may be defined.

For example, CSI is calculated not by sequentially reducing a value of K from K=5 in order of K=4, K=3, K=2, K=1, but, CSI may be calculated by setting K={5, 3, 2} and applying a value of K in order of K=5, K=3, K=2, the best K value satisfying the capacity of a configured resource may be derived.

As another example, a configured value and a step size for the K value may be considered. For example, if K=5 and the step size is 2, CSI may be reported by reducing parameters for K=5, K=3, K=1 and deriving the best value, or a method of using a set composed of odd numbers or even numbers smaller than a configured K value may also be considered.

A conventional operation associated with Proposal 1 is a method of calculating specific reported CSI and omitting the report of a specific CSI if the capability of a resource configured for CSI reporting is not satisfied. In contrast, Proposal 1-3 may be applied to solve a problem in that the conventional operation is not applied without any change.

In this case, the selection of a basic and/or coefficient subset for a first layer may be as follows.

Size-$K_0$ subset design: may be selected among the following alternatives.

Alt1. Unrestricted subset (size=2LM)
Alt2. Polarization-common subset (size=LM)
Alt3. Restricted subset (a specific beam subset and FD based, size=2L+M)

a value of $K_0$ may be calculated by Equation 45.

$$K_0 = \lceil \beta \times 2LM \rceil \text{ where } \beta \in \{\tfrac{1}{8}, \tfrac{1}{4}, \tfrac{1}{2}, \tfrac{3}{4}\} \qquad \text{[Equation 45]}$$

UCI is configured with two parts.

Information related to the number of non-zero coefficients is included in a UCI part 1 and reported. The payload of the UCI part 1 is identically maintained with respect to other RI values.

A bitmap is used to indicate non-zero coefficient indices.

With respect to a value of L, {2,4} is supported for L, and two values are supported for M. In this case, M may be selected among alternatives of Equation 46.

$$\text{Alt1. } M = \left\lceil p \times \frac{N_3}{R} \right\rceil \qquad \text{[Equation 46]}$$

$$\text{Alt2. } M = \lceil p \times N_3 \rceil$$

$$\text{where } p \in \left\{ \frac{1}{4}, \frac{1}{2} \right\}$$

In Proposal 1-3, the K value may be substituted with a p value. In Proposal 1-3, an omission (or compression) operation that gradually reduces a parameter(p, beta and/or R) for controlling the payload of the time domain compression-based codebook or frequency domain-based compression codebook to be smaller than a configured value to fit the resource allocated for PUSCH transmission may be performed.

That is, when the size of a payload of calculated CSI is greater than an allocated resource, a UE can adjust the size of a payload of the CSI to be equal to or smaller than the capacity of the allocated resource by omitting (or compressing or reducing) a payload of part 2 CSI according to a specific rule based on a value of a parameter $K_0$ determined based on a specific value (beta).

For example, the size of a payload of part 2 CSI may be reduced by ½ of a determined $K_0$ according to specific value or parameters included in Part 2 CSI may be dropped (or omitted).

Such a method may be applied as reducing p and/or R. In this case, a UE may transmit Part 1 CSI to a base station by including information related to whether which parameter among configured parameters has been changed (or decreased) to Part 1 CSI.

<Proposal 2: When CSI is Reported Using the Time Domain or Frequency Domain Compression-Based Codebook, Part 1 CSI Among Part 1 CSI and Part 2 CSI that Construct CSI Includes Specific Information>

Specifically, Part 1 CSI constituting CSI may be composed of parameters that determine the size of part 2 CSI. That is, Part 1 CSI may be used to recognize the size of Part 2 CSI. Accordingly, fields constructing Part 1 CSI may include some or all of the following parameters according to the time domain and/or frequency domain-based codebook configuration method in the existing Type II CSI configuration method.

This is effective if a base station designates a codebook parameter set through higher layer signaling (e.g., RRC or MAC CE) or dynamic signaling (e.g., DCI). A UE may report, to the base station, the most proper value through CSI calculation within a configured codebook parameter set.

In the case of a field including an indicator (An indication of the number of non-zero wideband amplitude coefficients per layer) indicating the number of non-zero wideband amplification coefficients per layer within Part 1 CSI, in the time domain compression, when WB beam amplitude is 0, a delay parameter per layer $\{\delta_i\}$ and/or a phase offset parameter per layer $\{\varepsilon_i\}$ corresponding to a corresponding beam may be omitted.

Part 1 CSI of TD-Compression:
CRI
RI
CQI
An indication of the number of non-zero wideband amplitude coefficients per layer
Size of FFT or oversampling factor for FFT
# of taps in time domain sample (size of W)

Part 1 CSI of FD-Compression:
CRI
RI
CQI
An indication of the number of non-zero wideband amplitude coefficients per layer
K value: # of columns for $W_F \in C^{N_{RB} \times K}$
or
Another embodiment of Part 1 CSI of FD-Compression:
CRI
RI
CQI
An indication of the number of non-zero wideband amplitude coefficients per layer
K value: # of columns for $W_F \in C^{N_{RB} \times K}$
# of non-zero coefficients in $\overline{C} \in C^{2L \times K}$ per layer Furthermore, in the frequency domain compression, a reported payload can be reduced because the number of rows of a compression coefficient matrix $\overline{C} \in C^{2L \times K}$ is reduced.

However, all combined beams may have amplitude of 0 or more depending on a codebook method configured (in the case of TD). In this case, a field including an indicator indicating the number of non-zero wideband amplification coefficients per layer may be omitted.

In such a method, the K value may be previously set between a UE and a base station or may be agreed as a specific value and omitted. The field including the indicator indicating the number of non-zero wideband amplification coefficients per layer may also be omitted.

As a method of more specifically providing notification of # of non-zero coefficients in $\overline{C} \in C^{2L \times K}$ per layer, a UE may provide notification of the locations of the non-zero coefficients by including and reporting a bitmap of 2LK in Part 1 CSI, or may notify a base station that the coefficient in a specific row or column of $\overline{C} \in C^{2L \times K}$ is non-zero by using a bitmap of 2L or K in order to prevent a corresponding payload from increasing.

Alternatively, a UE may notify a base station that an intersection or union of rows and columns indicated as a bitmap of bits of L+K is composed of non-zero coefficients. Since the bitmap-based method may become very great by values of L and K, only # of non-zero coefficients in $\overline{C} \in C^{2L \times K}$ per layer may be included in Part 1 CSI and reported, and the location of each coefficient may be included in Part 2 CSI and reported to the base station.

Among quantization methods of $\overline{C} \in C^{2L \times K}$ if WB amplitude and SB amplitude are differently applied, when a beam having WB amplitude of 0 is present, all coefficients corresponding to a specific column of $\overline{C} \in C^{2L \times K}$ corresponding to the beam may not be included in a Part 2 CSI report.

For example, if WB amplitude of a second beam among 1~2L beams is 0, coefficients constructing the entire second column of $\overline{C} \in C^{2L \times K}$ not reported.

<Proposal 2-1: the Information Related to Codebook Parameters Described in Proposal 2 May be Configured and Applied Through at Least One of RRC, MAC CE or DCI so that Uplink Resource Management of a Base Station can be Effectively Performed>

If the time domain compression-based or frequency axis compression-based codebook proposed in the present disclosure is configured, a base station can efficiently perform the management of an uplink resource by adaptively adjusting important parameters for the trade-off of performance and overhead, instead of fixing FFT-related information (size or oversampling), coefficients of taps or the K value, that is, the parameters.

As an example of the configuration method, a parameter set, such as FFT-related information (size or oversampling), the number of taps or the K value, may be set through RRC, and parameters may be dynamically indicated through DCI (RRC+DCI Method).

For example, the K value may be set as {2, 3, 4} (based on a UE capability) through RRC, and may indicate a specific value of values through DCI. Or a great set may be set through RRC through three steps. A subset may be indicated through a MAC-CE, and a value within the indicated subset may be indicated through DCI (method using RRC, MAC CE and DCI).

If the parameters p, beta and R are used, a specific parameter may be given priority over other parameters. For example, assuming that beta is given priority over a p value, the alphabet of a p value may be determined by a beta value. This is for effectively processing overhead and performance. For example, when a value may be beta={¼, ½} and beta=¼, p={¼, ½} is determined. When beta=½, p={⅛, ½} may be determined.

A configuration of Part 1 CSI of a conventional operation associated with Proposal 2 may include a CRI, an RI, a CQI or non-zero wideband amplitude each layer.

However, the TD or FD-based scheme is an alternative for solving a problem in that a conventional operation is not applied without any change because a parameter that determines a Part 2 CSI payload can be introduced.

<Proposal 3: in the frequency domain compression method, a frequency domain projection basis $W_F$ may be calculated by an oversampling-based approach method or an under sampling-based approach method.

Specifically, the oversampling-based approach method is for maximizing performance of compression and is an approach method for implementation convenience of a UE, such as a DFT projection or FFT operation of a UE.

More specifically, Equation 43 to which the Proposal 3 is applied is described again. $C=[\overline{c}_1, \overline{c}_2, \ldots, \overline{c}_{N_{RB}}] \in C^{2L \times N_{RB}}$ is the size or $N_{RB}$ or $N_{SB}$ of a compressed coefficient matrix. Accordingly, an example of a method capable of most easily deriving $W_F$ is a method of configuring an orthogonal basis matrix (e.g., DFT matrix) of $N_{RB} \times N_{RB}$ ($N_{SB} \times N_{SB}$ according to circumstance) and selecting a row based on a K value.

In this case, if the range of the number of SBs supported in NR is from 1 to 18 and weak RB level compression is supported, the range becomes 1 RBs to 275 RBs and thus the size of a basis to be applied becomes very various. Accordingly, if all situations need to be implemented, there is a problem in that the complexity of a UE is greatly increased.

Furthermore, in order to give flexibility, if the basis is configured by multiplying a value of simple $N_{RB}$ or $N_{SB}$ by an oversampling value, there is a problem in that K orthogonal columns are selected and a basis size according to an oversampling value is diversified. This may also increase UE implementation complexity. This is as follows.

$W_F$ is configured by selecting a specific number of columns K in an orthogonal basis composed of an N-by-N matrix or selected and configured by a UE in a specific pattern. In this case, a value of N is set as a minimum value of an exponent of 2 greater than $N_{RB}$ or $N_{SB}$.

For example, when $N_{RB}$ is 52, the value of N is set as N=64. When $N_{SB}$ is 10, the value of N is set as N=16. When $N_{RB}$ is 52 and N=64 is set, $W_F \in C^{64 \times K}$ is obtained. A UE calculates compression coefficient matrices $\bar{C}$ as $\bar{C}=[C\ 0]W_F$ and reports it to a base station.

In this case, $C=[\bar{c}_1, \bar{c}_2, \ldots, \bar{c}_{N_{RB}}] \in C^{2L \times N_{RB}}, 0 \in C^{2L \times (N-N_{RB})}$ may be configured. In this case, a portion where a coefficient value is present may be used without any change, and the remaining part may be padded as 0 and projected onto a basis matrix. In this case, the base station may calculate [C 0]≈$\bar{C}W_F^H$ using information of reported $\bar{C}$ and $W_F$.

A value for a portion corresponding to an $(N-N_{RB})$ column from the end in $\bar{C}W_F^H$, that is, $0 \in C^{2L \times (N-N_{RB})}$, may be neglected by a base station. The final reported PMI may be calculated. An advantage of a base configuration using the method, as described above, facilitates an implementation of a UE because the size of a basis matrix composed of an exponent of 2 is used. Furthermore, a value of N is greater than the number of actually transmitted SBs or PRBs. Accordingly, there is an advantage in that performance of compression can be increased because the granularity of a basis is increased due to an effect of the basis.

In the proposal, the value of N is limited to a minimum value of an exponent of 2 greater than $N_{RB}$ or $N_{SB}$, but a base station may set information on the value for a UE through a higher layer (e.g., RRC, MAC CE) or dynamic signaling (e.g., DCI) or a specific value may be agreed and used.

In under sampling, $W_F$ is configured by selecting a specific number of columns K in an orthogonal basis composed of an N-by-N matrix or by a UE in a specific pattern. In this case, the value of N may be composed of a maximum value of an exponent of 2 smaller than $N_{RB}$ or $N_{SB}$.

For example, when $N_{RB}$ is 52, N=32 is configured. When $N_{SB}$ is 10, N=8 is configured. A UE may select N columns in a predetermined pattern or based on the indication of a base station or the selection of the UE (in this case, additional information about which SB or RB has been selected is necessary) in $C=[\bar{c}_1, \bar{c}_2, \ldots, \bar{c}_{N_{RB}}] \in C^{2L \times N_{RB}}$, that is, a target of compression, and may report the N columns to a base station by performing FD-Compression.

The base station reconfigures C based on the reported information ($\bar{C}, W_F$). In this case, a coefficient for an omitted column may be estimated through the interpolation of the reconfigured C matrix or an extrapolation method.

Advantages of the method include that the report of a matrix index can be simplified because the dimension of $W_F$ is reduced and that overhead is reduced because smaller K is used as N becomes smaller. Assuming that the same K is used, $N<N_{RB}$ (or $N<N_{SB}$). There is an advantage in that the accuracy of reported information is increased as a difference with a K value is reduced.

An extrapolation method in the under sampling method may be as follows.

A UE calculates information of $\bar{C}, W_F$ with respect to $\tilde{C}=[\tilde{c}_1, \tilde{c}_2, \ldots, \tilde{c}_N]$, and reports the information to a base station. The base station decodes $\tilde{C}=[\bar{c}_1, \bar{c}_2, \ldots, \bar{c}_N]$ based on the information, calculates a value of $\lfloor \bar{c}_{N+1}, \bar{c}_{N+2}, \ldots, \bar{c}_{N_{RB}} \rfloor$ through extrapolation, and obtains SB CSI of the UE.

The interpolation method is similar to the aforementioned extrapolation method, and is different from the aforementioned extrapolation method in a method of selecting N rows with respect to the C matrix (e.g., a configuration using a method of first selecting an even column and then selecting an odd column, that is, when $N_{RB}$=10, 0, 2, 4, 6, 8, 1, 3, 5 columns may be selected) and information on a not-reported ($N_{RB}$-N) column is reconfigured.

If the dimension of $W_F$, that is, a basis matrix used to abbreviate a frequency domain including Proposal 3, is set as N-by-K, the number of columns K is a parameter affecting a compression capability, and may be set through a higher layer signal or dynamic signal, such as RRC. In this case, the K columns are selected among N vectors or among N*O columns in the case of oversampling.

In this case, O is an oversampling factor, and may be previously agreed or a base station may configure O for a UE through a higher layer or dynamic signaling or the UE may recommend/report O to the base station. For convenience of description, a method of determining K vectors in N*O oversampled DFT vectors may be applied.

In the case of an oversampled basis matrix (e.g., DFT), O N orthogonal groups are present. A UE may first select an orthogonal beam set $$\binom{O}{1}$$

instead of increasing the complexity of the UE through joint search, and then may select K vectors $$\binom{N}{K}$$

in a set of N orthogonal vectors.

Alternatively, in the method, the value may be greatly increased as N and K are increased. In order to solve this problem, to use a specific pattern for each orthogonal beam set may be considered. To report a corresponding beam group index may be considered.

For example, in the case of N=4, O=2, {0, 1, 2, 3, 4, 5, 6, 7}, {0, 2, 4, 6} are orthogonal to each other, and {1, 3, 5, 7} are orthogonal. In this case, since K=2, a pattern using contiguous K, for example has an advantage a 2-bit report is made possible because the index of a corresponding beam group is composed of 0:{0,2},1:{1,3}, 2:{4,6}, 3:{5,7}. In the case of processing using the existing method, $$\binom{2}{1}+\binom{4}{2}$$

requires 4 bits, that is, 1 bit+3 bits. In the case of the method, the same column may be redundantly selected according to circumstances. That is, although K=5 is configured, the best K=3 may be obtained. In order for a base station to understand such an operation of a UE, the UE may include, in Part 1 CSI, information on how CSI was calculated using which K value and report the information as in Proposal 2.

In Proposal 3, in general, a DFT basis vector used to configure a conventional W1 matrix is set identically with the number of set Tx antenna ports and applied. In such a case, the proposal is for solving a problem in that a UE has to implements the method in various configurations.

<Proposal 3-1>

$W_F$ may be composed of an oversampled basis matrix (e.g., DFT, IDFT, DCT). The length of the basis $N_3$ is composed of the smallest number from a set {32, 64, 128, 512, 1024, 2048, 4096} such that $$N_3 > \frac{N_{RB}}{X}.$$

$N_{RB}$ is the number of RBs set for CSI reporting within a BWP or a specific BW. X is an integer of {1, 2, 4, 8, 16 . . . }.

<Proposal 4: when a Subband CQI is Reported, a UE May Report a Subband CQI to a Base Station Through Frequency Domain Compression>

Specifically, an SB CQI is composed of a 2-bit index (integer value, 0, 1, 2, 3). Likewise an SB PMI, an SB CQI value has a correlation. A UE may compress a CQI by identically using $W_F$ used in a PMI report, and may report the CQI to a base station.

In this case, additional feedback overhead does not occur because the same $W_F$ index is identically used, and a report for 1-by-K compressed coefficients is necessary. However, unlike a PMI, an SB CQI is set as an integer not a negative number. If $W_F$ is a column matrix, an abbreviated value has a very good possibility that it will be a complex value. Accordingly, in this case, an integer orthogonal matrix, such as a Hardamard matrix, may be used as a basis matrix.

Equations 44 to 47 are examples of 8-by-8, 12-by-12, 16-by-16, 20-by-20 Hardamard matrices, respectively. The method may be used by being combined with Proposal 3 in order to satisfy various SB sizes.

$$W_0 = [1\ 1\ 1\ 1\ 1\ 1\ 1\ 1],$$ [Equation 44]
$$W_1 = [1\ 1\ 1\ 1\ -1\ -1\ -1\ -1],$$
$$W_2 = [1\ 1\ -1\ -1\ 1\ 1\ -1\ -1],$$
$$W_3 = [1\ 1\ -1\ -1\ -1\ -1\ 1\ 1],$$
$$W_4 = [1\ -1\ 1\ -1\ 1\ -1\ 1\ -1],$$
$$W_5 = [1\ -1\ 1\ -1\ -1\ 1\ -1\ 1],$$
$$W_6 = [1\ -1\ -1\ 1\ 1\ -1\ -1\ 1],$$
$$W_7 = [1\ -1\ -1\ 1\ -1\ 1\ 1\ -1],$$

$$W_0 = [1\ 1\ 1\ 1\ 1\ 1\ 1\ 1\ 1\ 1\ 1\ 1],$$ [Equation 45]
$$W_1 = [1\ -1\ 1\ -1\ 1\ 1\ 1\ -1\ -1\ -1\ 1\ -1],$$
$$W_2 = [1\ -1\ -1\ 1\ -1\ 1\ 1\ 1\ -1\ -1\ -1\ 1],$$
$$W_3 = [1\ 1\ -1\ -1\ 1\ -1\ 1\ 1\ 1\ -1\ -1\ -1],$$
$$W_4 = [1\ -1\ 1\ -1\ -1\ 1\ -1\ 1\ 1\ 1\ -1\ -1],$$
$$W_5 = [1\ -1\ -1\ 1\ -1\ -1\ 1\ -1\ 1\ 1\ 1\ -1],$$
$$W_6 = [1\ -1\ -1\ -1\ 1\ -1\ -1\ 1\ -1\ 1\ 1\ 1],$$
$$W_7 = [1\ 1\ -1\ -1\ -1\ 1\ -1\ -1\ 1\ -1\ 1\ 1],$$
$$W_8 = [1\ 1\ 1\ -1\ -1\ -1\ 1\ -1\ -1\ 1\ -1\ 1],$$
$$W_9 = [1\ 1\ 1\ 1\ -1\ -1\ -1\ 1\ -1\ -1\ 1\ -1],$$
$$W_{10} = [1\ -1\ 1\ 1\ 1\ -1\ -1\ -1\ 1\ -1\ -1\ 1],$$
$$W_{11} = [1\ 1\ -1\ 1\ 1\ 1\ -1\ -1\ -1\ 1\ -1\ -1],$$

$$W_0 = [1\ 1\ 1\ 1\ 1\ 1\ 1\ 1\ 1\ 1\ 1\ 1\ 1\ 1\ 1\ 1],$$ [Equation 46]
$$W_1 = [1\ -1\ 1\ -1\ 1\ -1\ 1\ -1\ 1\ -1\ 1\ -1\ 1\ -1\ 1\ -1],$$
$$W_2 = [1\ 1\ -1\ -1\ 1\ 1\ -1\ -1\ 1\ 1\ -1\ -1\ 1\ 1\ -1\ -1],$$
$$W_3 = [1\ -1\ -1\ 1\ 1\ -1\ -1\ 1\ 1\ -1\ -1\ 1\ 1\ -1\ -1\ 1],$$
$$W_4 = [1\ 1\ 1\ 1\ -1\ -1\ -1\ -1\ 1\ 1\ 1\ 1\ -1\ -1\ -1\ -1],$$
$$W_5 = [1\ -1\ 1\ -1\ -1\ 1\ -1\ 1\ 1\ -1\ 1\ -1\ -1\ 1\ -1\ 1],$$
$$W_6 = [1\ 1\ -1\ -1\ -1\ -1\ 1\ 1\ 1\ 1\ -1\ -1\ -1\ -1\ 1\ 1],$$
$$W_7 = [1\ -1\ -1\ 1\ -1\ 1\ 1\ -1\ 1\ -1\ -1\ 1\ -1\ 1\ 1\ -1],$$
$$W_8 = [1\ 1\ 1\ 1\ 1\ 1\ 1\ 1\ -1\ -1\ -1\ -1\ -1\ -1\ -1\ -1],$$
$$W_9 = [1\ -1\ 1\ -1\ 1\ -1\ 1\ -1\ -1\ 1\ -1\ 1\ -1\ 1\ -1\ 1],$$
$$W_{10} = [1\ 1\ -1\ -1\ 1\ 1\ -1\ -1\ -1\ -1\ 1\ 1\ -1\ -1\ 1\ 1],$$
$$W_{11} = [1\ -1\ -1\ 1\ 1\ -1\ -1\ 1\ -1\ 1\ 1\ -1\ -1\ 1\ 1\ -1],$$
$$W_{12} = [1\ 1\ 1\ 1\ -1\ -1\ -1\ -1\ -1\ -1\ -1\ -1\ 1\ 1\ 1\ 1],$$
$$W_{13} = [1\ -1\ 1\ -1\ -1\ 1\ -1\ 1\ -1\ 1\ -1\ 1\ 1\ -1\ 1\ -1],$$
$$W_{14} = [1\ 1\ -1\ -1\ -1\ -1\ 1\ 1\ -1\ -1\ 1\ 1\ 1\ 1\ -1\ -1],$$
$$W_{15} = [1\ -1\ -1\ 1\ -1\ 1\ 1\ -1\ -1\ 1\ 1\ -1\ 1\ -1\ -1\ 1]$$

$$W_0 = [1\ 1\ 1\ 1\ 1\ 1\ 1\ 1\ 1\ 1\ 1\ 1\ 1\ 1\ 1\ 1\ 1\ 1\ 1\ 1],$$ [Equation 47]
$$W_1 = [1\ -1\ -1\ 1\ 1\ -1\ -1\ 1\ -1\ 1\ -1\ 1\ -1\ 1\ 1\ 1\ 1\ -1\ -1\ -1],$$
$$W_2 = [1\ -1\ 1\ 1\ -1\ -1\ -1\ -1\ 1\ 1\ -1\ 1\ 1\ 1\ 1\ -1\ -1\ 1\ 1\ -1],$$
$$W_3 = [1\ 1\ 1\ -1\ -1\ -1\ -1\ 1\ 1\ -1\ 1\ 1\ 1\ 1\ 1\ -1\ -1\ 1\ -1\ -1],$$
$$W_4 = [1\ 1\ -1\ -1\ -1\ -1\ 1\ 1\ -1\ 1\ 1\ 1\ 1\ 1\ -1\ -1\ 1\ 1\ -1\ 1],$$

-continued $W_5 = [1\ -1\ -1\ -1\ -1\ 1\ -1\ 1\ -$ $\quad 1\ 1\ 1\ 1\ 1\ -1\ -1\ 1\ -1\ -1\ 1\ 1\ 1]$, $W_6 = [1\ -1\ -1\ -1\ 1\ -1\ 1\ -$ $\quad 1\ 1\ 1\ 1\ 1\ -1\ -1\ 1\ -1\ -1\ 1\ 1\ -1]$, $W_7 = [1\ -1\ -1\ 1\ -1\ 1\ -1\ 1\ 1\ 1\ 1\ -$ $\quad 1\ -1\ 1\ -1\ -1\ 1\ 1\ -1\ -1]$, $W_8 = [1\ -1\ 1\ -1\ 1\ -1\ 1\ 1\ 1\ 1\ -$ $\quad 1\ -1\ 1\ -1\ -1\ 1\ 1\ -1\ -1\ -1]$, $W_9 = [1\ 1\ -1\ 1\ -1\ 1\ 1\ 1\ 1\ -1\ -$ $\quad 1\ 1\ -1\ -1\ 1\ 1\ 1\ -1\ -1\ -1\ -1]$, $W_{10} = [1\ -1\ 1\ -1\ 1\ 1\ 1\ 1\ -1\ -$ $\quad 1\ 1\ -1\ -1\ 1\ 1\ 1\ -1\ -1\ -1\ -1\ 1]$, $W_{11} = [1\ 1\ -1\ 1\ 1\ 1\ 1\ -1\ -1\ 1\ -$ $\quad 1\ -1\ 1\ 1\ -1\ -1\ -1\ -1\ 1\ -1]$, $W_{12} = [1\ -1\ 1\ 1\ 1\ 1\ -1\ -1\ 1\ -1\ -$ $\quad 1\ 1\ 1\ -1\ -1\ -1\ -1\ 1\ -1\ 1\ 1]$, $W_{13} = [1\ 1\ 1\ 1\ 1\ -1\ -1\ 1\ -1\ -$ $\quad 1\ 1\ 1\ -1\ -1\ -1\ -1\ 1\ -1\ 1\ -1]$, $W_{14} = [1\ 1\ 1\ 1\ -1\ -1\ 1\ -1\ -1\ 1\ 1\ -$ $\quad 1\ -1\ -1\ -1\ 1\ 1\ -1\ 1\ -1\ 1]$, $W_{15} = [1\ 1\ 1\ -1\ -1\ 1\ -1\ -1\ 1\ 1\ 1\ -$ $\quad 1\ -1\ -1\ -1\ 1\ 1\ -1\ 1\ -1\ 1\ 1\ 1]$, $W_{16} = [1\ 1\ -1\ -1\ 1\ -1\ -1\ 1\ 1\ 1\ -$ $\quad 1\ -1\ -1\ -1\ 1\ 1\ -1\ 1\ 1\ -1\ 1\ 1\ 1]$, $W_{17} = [1\ -1\ -1\ 1\ -1\ -1\ 1\ 1\ 1\ -1\ -$ $\quad 1\ -1\ -1\ 1\ 1\ -1\ 1\ 1\ -1\ 1\ 1\ 1\ 1]$, $W_{18} = [1\ -1\ 1\ -1\ -1\ 1\ 1\ 1\ -1\ -1\ -$ $\quad 1\ -1\ 1\ 1\ -1\ 1\ 1\ -1\ 1\ 1\ 1\ 1\ -1]$, $W_{19} = [1\ 1\ -1\ -1\ 1\ 1\ 1\ -1\ -1\ -1\ -$ $\quad 1\ 1\ -1\ 1\ 1\ -1\ 1\ 1\ 1\ 1\ -1\ -1]$, Proposal 4 is a method for compressing and transmitting a CQI composed of only integer values in addition to a PMI. The method has an effect in that the size of a payload of CSI can be reduced because a UE can compress a CQI in addition to a PMI by using the method.

Among all 2L beams, an M coefficient is reported with respect to each beam, and each parameter is as follows.

$W_f = [f_{k_0} f_{k_1} \ldots f_{k_{M-1}}]$ $\tilde{W}_2$ may be composed of K=2LM linear combination coefficients.

M values of all 2L beams are set in a higher layer. If CSI is reported, M base vectors may be directly selected.

Alternatively, the M values are selected in common with respect to all the 2L beams, but only a lower set of coefficients of an K_0<2LM coefficient is reported (a reported coefficient is not processed as 0).

$W_f = [f_{k_0} f_{k_1} \ldots f_{k_{M-1}}]$ $\tilde{W}_2$ is composed of K=2LM linear combination coefficients, but (K−K_0) of the coefficients is 0.

A value of M (applied to all the 2L beams) is set in a higher layer, and an M base vector is dynamically selected (accordingly, reported as CSI).

The assumption of selection of a $K_0$ LC coefficient applied to all the 2L beams may be specified.

A value of $K_0$ may be fixed or may be set by a higher layer. $K_0$ LC coefficients may be directly selected by a UE.

The coefficients and size of $K_0$ LC may be directly selected by a UE. Alternatively, in independent selection for all the 2L beams, $M_i$ coefficients may be reported with respect to an i-th beam.

$W_f = [W_f(0), \ldots, W_f(2L-1)]$, $W_f(i) = [f_{k_{i,0}} f_{k_{i,1}} \ldots f_{k_{i,m_i-1}}]$, that is, $M_i$ frequency domain elements for each beam may be selected.

$\tilde{W}_2$ may be composed of $K = \Sigma_{i=0}^{2L-1} M_i$ linear combination coefficients.

A value of K applied to all the 2L beams may be set in a higher layer.

A size-$M_i$ subset and a value of $M_i$ may be directly selected by a UE.

A size-$M_i$ subset may be dynamically selected by a UE, but a value of $M_i$ may be determined by a preset rule.

A size-$M_i$ subset may be dynamically selected by a UE, but a value of $M_i$ may be set in a higher layer.

A size-$M_i$ subset may be selected from a fixed base subset or a beam-common UE-selected middle subset of the fixed base subset.

In the above contents, $\tilde{W}_2$ is the same as $\overline{C}$ described in the present disclosure. The size of $\tilde{W}_2$ may be defined as 2L-by-M again. Hereinafter, $\tilde{W}_2$ is collectively described. Furthermore, $f_{k_0}$ indicates specific column of a basis matrix (e.g., (oversampled) DFT, IDFT, DCT) for compression, and $f_{k_0}, \ldots, f_{k_{M-1}}$ may be composed of only an orthogonal pair.

<Proposal 5: if a Plurality of Basic Matrices Per Combined Beam is Included in the Frequency Domain or the Time Domain Compression, a Corresponding Mapping Relation May be Reported to a Base Station Through a Bitmap Having the Size of 2LM>

FIG. 30 is a diagram illustrating an example of the locations of non-zero coefficients, which is proposed in the present disclosure.

A relation between a basis matrix and a combined beam has a meaning when coefficients constituting $\tilde{W}_2$ have a non-zero value. In general, when the intensity of a beam is relatively great, that is, the probability that a plurality of meaningful values may be present in a column corresponding to a beam having relative great intensity is high.

Accordingly, a codebook may be configured by permitting the mapping of a plurality of basis matrices to only a beam whose intensity exceeds a specific critical value by using a bitmap having the size of all 2LMs, rather than a method of providing notification of a configuration method through the coefficients of $\tilde{W}_2$.

In this case, the specific critical value may be set by limiting the amplitude of a coefficient that constitutes $\tilde{W}_2$, for example, to a beam having a specific value, for example, exceeding ($\sqrt{0.5}$). Alternatively, the number of beams which may be included in a plurality of basis matrices may be specified.

For example, when L=2, 3, 4, the number of beams which may be included in a plurality of basis matrices may be limited to Z=2,3,4 (out of 2L). The number of basis matrices may be included in the plurality of basis matrices may also be limited to a specific value (e.g., 3). The specific value may be previously agreed or a base station may signal the specific value to a UE or the UE may report the value.

In this case, the corresponding value determines a payload of Part 2 CSI, and may be included in Part 1 CSI. This has an advantage in that a payload of CSI can be reduced because the size of a corresponding bitmap is reduced to a ZM-bitmap.

Furthermore, non-zero amplitude beams corresponding to 2L-Z may be composed of only one basis matrix, and may be configured to be tied with a specific basis matrix. FIG. 30 illustrates the locations of non-zero coefficients of $\tilde{W}_2$ (8-by-6 matrix). A slash indicates a coefficient having a relatively large size, and a straight line indicates a beam corresponding to a relatively weak beam. Beams having relatively large sizes may be mapped to three basis matrices.

<Proposal 6: $\tilde{W}_2$ May be Quantized Through the Following Method>

Alt 1: 3-bit SB Amplitude $(1, \sqrt{1/2}, \sqrt{1/4}, \sqrt{1/8}, \sqrt{1/16}, \sqrt{1/32}, \sqrt{1/64}, 0)$, Alt 2: 8PSK phase or 16 PSK $$3\text{-bit } WB \text{ Amplitude } \left(1, \sqrt{\frac{1}{2}}, \sqrt{\frac{1}{4}}, \sqrt{\frac{1}{8}}, \sqrt{\frac{1}{16}}, \sqrt{\frac{1}{32}}, \sqrt{\frac{1}{64}}, 0\right)$$

$$3\text{-bit } SB \text{ Amplitude } \left(1, \frac{1}{2}, \frac{1}{4}, \frac{1}{8}, \frac{1}{16}, \frac{1}{32}, \frac{1}{64}, 0\right)$$

$$2\text{-bit } SB \text{ Amplitude } \left(1, \frac{1}{2}, \frac{1}{4}, 0\right)$$

In the case of Proposal 6, WB amplitude includes 1 and 0 by using a square root, and the remaining values thereof are composed of values obtained by multiplexing 1 by $\sqrt{1/2}$. SB amplitude includes 1 and 0, and the remaining values thereof are composed of values obtained by multiplexing 1 by ½. This is for obtaining greater granularity by using the WB amplitude and the SB amplitude. The reason for this is that if the WB and SB amplitude use the same alphabet, a degree of freedom of quantization is reduced due to many redundant values, compared to a case where different alphabets are used.

<Proposal 7: when the time domain or frequency domain compression-based codebook is used, a base station may indicate a codebook subset restriction for a UE by using the following bitmap, and the bitmap may be indicated through higher layer (RRC or MAC CE).

Alt 1: a combining beam that constitutes Wi may be restricted using a bitmap of $O_1 O_2 N_1 N_2$.

An RI is restricted as a 2-bit or 4-bit bitmap depending on a supported Max RI.

Alt 2: amplitude of a combining coefficient may be restricted while restricting a combining beam that constructs $W_1$ by using the bitmap of $O_1 O_2 N_1 N_2$.

If a codebook subset restriction is indicated by the bitmap of Alt 1, a DFT beam corresponding to 1 on the bitmap may be restricted or a DFT beam corresponding to 0 on the bitmap may be restricted. Likewise, an RI corresponding to 1 (or 0) on a bitmap composed of 2 or 4 bits is restricted.

Accordingly, a UE reports CSI by performing CSI calculation so that a corresponding DFT beam or RI is not reported in the CSI calculation. A base station does not expect that the corresponding DFT beam or RI is reported by the UE.

In the case of Alt 2, a UE may understand that amplitude of a combined coefficient is restricted along with Alt1. If the UE uses an amplitude bitmap having 3 bits, the size of all bitmaps become 3 O1O2N1N2 bits, thus increasing overhead of RRC signaling. 2-bit amplitude may be considered or beam group-wise restriction may be considered.

When amplitude and a beam are simultaneously indicated by a bitmap, a UE cannot use a codebook because the UE uses specific amplitude or more with respect to the indicated corresponding beam. For example, if a codebook subset restriction is applied so that a beam selected as a second combining beam does not combine amplitude $\sqrt{1/4}$ or more, all combined coefficients in a second column of $\tilde{W}_2$ may not be calculated as amplitude of 1 or $\sqrt{1/2}$ (example of 3-bit amplitude).

<Proposal 8: when the Number of SBs Allocated in the Time Domain or Frequency Domain Compression-Based Codebook Configuration Method is Greater than a Specific Number, Codebook Parameters that Constitute Respective Portions May be Fully Independently Configured or Some of the Parameters May be Applied Between the Portions in Common>

FIG. 31 is a diagram illustrating an example of CSI consisting of two parts, which is proposed in the present disclosure.

Specifically, in the time domain or a frequency domain configuration method, when $N_{SB}$, (or $N_{SB}/2$), that is, the number of SBs allocated for CSI reporting is greater than a specific number, the time domain or frequency domain compression-based codebook configuration method may be performed using two portions for a performance gain as illustrated in FIG. 31.

In this case, all codebook parameters that constitute respective portions may be independently configured or at least one of the following parameter may be applied to each of the portions in common.

That is, at least one of the following parameters may include each of the portions in common.

In $\tilde{C} \in C^{2L \times K}$, information of non-zero coefficients (e.g., bitmap)

Information for a frequency domain projection basis $W_F \in C^{N_{RB} \times K}$ FIG. 32 is a flowchart illustrating an example of a method of receiving, by a base station, CSI, which is proposed in the present disclosure. FIG. 32 is merely for convenience of description, and does not restrict the scope of the present disclosure. A method and/or a procedure described with reference to FIG. 32 may be implemented by various devices as described with reference to FIGS. 35 to 40.

Referring to FIG. 32, a base station may receive parameters related to CSI measured by a UE.

Specifically, the base station (e.g., 3610 or 3620 in FIG. 36) may transmit, to the UE (e.g., 3610 or 3620 in FIG. 36) system information and scheduling information through a higher layer (S32010).

For example, the operation of transmitting, by the base station, the system information and the scheduling information to the UE through a higher layer in step S32010 may be implemented by an apparatus of FIGS. 35 to 41 to be described later. For example, referring to FIG. 36, one or more processors 102 may control one or more transceivers 106 and/or one or more memories 104 to transmit the system information and the scheduling information. The one or more transceivers 106 may transmit the system information and the scheduling information to the UE.

The system information (or configuration information) may include configured values for obtaining, by the UE, parameters included in CSI and a plurality of parameters for compressing the CSI.

The base station may transmit a reference signal (e.g., SSB, CSI-RS, TRS and/or PTRS) to the UE so that the UE may obtain the CSI based on the system information and transmit the CSI (S32020).

For example, the operation of transmitting, by the base station, the reference signal to the UE in step S32020 may be implemented by the apparatus of FIGS. 35 to 41 to be described later. For example, referring to FIG. 36, the one or more processors 102 may control the one or more transceivers 106 and/or the one or more memories 104 so that the base station transmits the reference signal to the UE. The one or more transceivers 106 of the base station may transmit the reference signal to the UE.

Thereafter, the base station may allocate a resource for CSI transmission to the UE by transmitting downlink control information (DCI) through a physical downlink control channel (PDCCH) (S32030).

For example, the operation of allocating the resource for CSI transmission to the UE by transmitting the downlink control information through the physical downlink control channel in step S32030 may be implemented by the apparatus of FIGS. 35 to 41 to be described later. For example, referring to FIG. 36, the one or more processors 102 may control the one or more transceivers 106 and/or the one or more memories 104 to perform the operation of allocating the resource for CSI transmission to the UE by transmitting the downlink control information through the physical downlink control channel. The one or more transceivers 106 may transmit the DCI to the UE.

Thereafter, the base station may receive the CSI on the allocated resource (S32040). For example, the operation of reporting the calculated CSI to the base station in step S32040 may be implemented by the apparatus of FIGS. 35 to 41 to be described later. For example, referring to FIG. 36, the one or more processors 102 may control the one or more transceivers 106 and/or the one or more memories 104 to perform the operation of reporting the calculated CSI to the base station through the physical downlink control channel. The one or more transceivers 106 may receive the CSI transmitted by the UE.

As described in Method 1 and Method 2 or Proposal 1 to Proposal 8, the CSI may be divided into Type I and Type II, and may be composed of Part 1 CSI and Part 2 CSI. Furthermore, as described in Proposal 1 to Proposal 8, the CSI may be calculated based on a compression method in the time domain or the frequency domain by a plurality of codebook parameters.

For example, Part 1 CSI may include a rank indicator (RI), a channel quality indicator (CQI) and an indicator indicating the number of non-zero amplification coefficients. The part 2 CSI may include a precoding matrix indicator (PMI).

Furthermore, as described in Proposal 1-1 to Proposal 1-3, some of or the entire CSI may be omitted based on the capacity of a resource allocated for CSI transmission or may be additionally compressed and transmitted in the time domain or frequency domain.

For example, when the capacity of the resource allocated to transmit the CSI is smaller than the size of a payload of the CSI calculated based on the plurality of parameters, Part 2 CSI may be compressed by applying at least one parameter to Part 2 CSI until the size of the payload is smaller than the capacity of the resource.

Thereafter, the base station may calculate data scheduling and precoding based on the CSI, and may transmit, to the UE, data to which the calculated precoding has been applied and a reference signal (e.g., DMRS, TRS, PTRS) for data decoding.

Through such a method, a base station can receive CSI when a payload of CSI calculated by a UE is greater than an allocated resource.

FIG. 33 is a flowchart illustrating an example of a method of transmitting, by a UE, CSI, which is proposed in the present disclosure. FIG. 33 is merely for convenience of description, and does not restrict the scope of the present disclosure. A method and/or a procedure described with reference to FIG. 33 may be implemented by various devices as described with reference to FIGS. 35 to 41.

Referring to FIG. 33, a UE may transmit only some of CSI or may drop the entire CSI when calculated CSI is greater than an allocated resource.

Specifically, the UE (e.g., 3610 or 3620 in FIG. 36) may receive configuration information for CSI reporting from a base station (e.g., 3610 or 3620 in FIG. 36) through a higher layer (S32010).

For example, the operation of receiving, by the UE, the configuration information for CSI reporting from the base station in step S32010 may be implemented by the apparatus of FIGS. 35 to 41 to be described later. For example, referring to FIG. 36, the one or more processors 102 may control the one or more transceivers 106 and/or the one or more memories 104 to receive the configuration information for CSI reporting. The one or more transceivers 106 may receive the configuration information for CSI reporting, which is transmitted by the base station.

The configuration information may include configured values for obtaining, by the UE, parameters included in CSI and a plurality of parameters for compressing the CSI.

The UE may receive a reference signal (e.g., SSB, CSI-RS, TRS and/or PTRS) from the base station in order to report the CSI based on the configuration information (S33020).

For example, the operation of receiving, by the UE, the reference signal from the base station in step S33020 may be implemented by the apparatus of FIGS. 35 to 41 to be described later. For example, referring to FIG. 36, the one or more processors 102 may control the one or more transceivers 106 and/or the one or more memories 104 so that the UE receives the reference signal from the base station. The one or more transceivers 106 of the UE may receive the reference signal from the base station.

Thereafter, the UE may receive, from the base station, a resource for CSI transmission allocated thereto by receiving downlink control information (DCI) through a physical downlink control channel (PDCCH) (S33030).

For example, the operation of receiving, by the UE, the DCI for resource allocation from the base station in step S33030 may be implemented by the apparatus of FIGS. 35 to 41 to be described later. For example, referring to FIG. 36, the one or more processors 102 of the UE may control the one or more transceivers 106 and/or the one or more memories 104 to perform the operation of receiving the DCI for resource allocation from the base station through the physical downlink control channel. The one or more transceivers 106 of the base station may transmit the DCI to the UE.

Thereafter, the UE may derive parameters related to the CSI by calculating the parameters based on the configuration information (S33040).

For example, the operation of calculating and deriving the parameters related to the CSI based on the configuration information in step S33040 may be implemented by the apparatus of FIGS. 35 to 41 to be described later. For example, referring to FIG. 36, the one or more processors 102 may operate to perform the operation of calculating and deriving the parameters related to the CSI based on the configuration information.

Thereafter, the UE may transmit the CSI to the base station on the allocated resource (S33050). For example, the operation of transmitting the CSI to the base station on the allocated resource in step S33050 may be implemented by the apparatus of FIGS. 35 to 41 to be described later. For example, referring to FIG. 30, the one or more processors 102 may control the one or more transceivers 106 and/or the one or more memories 104 to perform the operation of transmitting the CSI to the base station on the allocated resource. The one or more transceivers 106 may transmit the CSI to the base station on the allocated resource.

As described in Method 1 and Method 2 or Proposal 1 to Proposal 8, the CSI may be divided into Type I and Type II, and may be composed of Part 1 CSI and Part 2 CSI. Furthermore, as described in Proposal 1 to Proposal 8, the CSI may be calculated based on a compression method in the time domain or the frequency domain by a plurality of codebook parameters.

For example, Part 1 CSI may include a rank indicator (RI), a channel quality indicator (CQI) and an indicator indicating the number of non-zero amplification coefficients. The part 2 CSI may include a precoding matrix indicator (PMI).

Furthermore, as described in Proposal 1-1 to Proposal 1-3, some of or the entire CSI may be omitted based on the capacity of a resource allocated for CSI transmission or may be additionally compressed and transmitted in the time domain or frequency domain.

For example, when the capacity of the resource allocated to transmit the CSI is smaller than the size of a payload of the CSI calculated based on the plurality of parameters, Part 2 CSI may be compressed by applying at least one parameter to Part 2 CSI until the size of the payload is smaller than the capacity of the resource.

Thereafter, the base station may calculate data scheduling and precoding based on the CSI, and may transmit, to the UE, data to which the calculated precoding has been applied and a reference signal (e.g., DMRS, TRS, PTRS) for data decoding.

FIG. 34 is a flowchart illustrating an example of a procedure for reporting CSI, which is proposed in the present disclosure.

Referring to FIG. 34, some of CSI calculated by a UE may be compressed or omitted depending on the capacity of a resource allocated by a base station. FIG. 33 is merely for convenience of description, and does not restrict the scope of the present disclosure.

Specifically, the UE (e.g., 3610 or 3620 in FIG. 36) may receive configuration information for CSI reporting from the base station (e.g., 3610 or 3620 in FIG. 36) through a higher layer (S34010).

For example, the operation of receiving, by the UE, the configuration information for CSI reporting from the base station in step S34010 may be implemented by the apparatus of FIGS. 35 to 41 to be described later. For example, referring to FIG. 36, the one or more processors 102 may control the one or more transceivers 106 and/or the one or more memories 104 to receive the configuration information for CSI reporting. The one or more transceivers 106 may receive the configuration information for CSI reporting, which is transmitted by the base station.

The configuration information may include configured values for obtaining, by the UE, parameters included in the CSI and a plurality of parameters for compressing the CSI.

The UE may receive a reference signal (e.g., SSB, CSI-RS, TRS and/or PTRS) from the base station in order to report the CSI based on the configuration information (S34020).

For example, the operation of receiving, by the UE, the reference signal from the base station in step S34020 may be implemented by the apparatus of FIGS. 35 to 41 to be described later. For example, referring to FIG. 36, the one or more processors 102 of the UE may control the one or more transceivers 106 and/or the one or more memories 104 to receive the reference signal from the base station. The one or more transceivers 106 of the UE may receive the reference signal from the base station.

Thereafter, the UE may receive, from the base station, a resource for CSI transmission allocated thereto by receiving downlink control information (DCI) through a physical downlink control channel (PDCCH) (S34030).

For example, the operation of receiving, by the UE, the DCI for resource allocation from the base station in step S34030 may be implemented by the apparatus of FIGS. 35 to 41 to be described later. For example, referring to FIG. 36, the one or more processors 102 of the UE may control the one or more transceivers 106 and/or the one or more memories 104 to perform the operation of receiving the DCI for resource allocation from the base station through the physical downlink control channel. The one or more transceivers 106 of the base station may transmit the DCI to the UE.

Thereafter, the UE may derive parameters related to the CSI by calculating the parameters based on the configuration information (S34040).

For example, the operation of calculating and deriving the parameters related to the CSI based on the configuration information in step S34040 may be implemented by the apparatus of FIGS. 35 to 41 to be described later. For example, referring to FIG. 36, the one or more processors 102 may operate to perform the operation of calculating and deriving the parameters related to the CSI based on the configuration information.

Thereafter, the UE may transmit the CSI to the base station on the allocated resource (S34050). For example, the operation of transmitting the CSI to the base station on the allocated resource in step S34050 may be implemented by the apparatus of FIGS. 35 to 41 to be described later. For example, referring to FIG. 30, the one or more processors 102 may control the one or more transceivers 106 and/or the one or more memories 104 to perform the operation of transmitting the CSI to the base station on the allocated resource. The one or more transceivers 106 may transmit the CSI to the base station on the allocated resource.

As described in Method 1 and Method 2 or Proposal 1 to Proposal 8, the CSI may be divided into Type I and Type II, and may be composed of Part 1 CSI and Part 2 CSI. Furthermore, as described in Proposal 1 to Proposal 8, the CSI may be calculated based on a compression method in the time domain or the frequency domain by a plurality of codebook parameters.

For example, Part 1 CSI may include a rank indicator (RI), a channel quality indicator (CQI) and an indicator indicating the number of non-zero amplification coefficients. The part 2 CSI may include a precoding matrix indicator (PMI).

Furthermore, as described in Proposal 1-1 to Proposal 1-3, some of or the entire CSI may be omitted based on the capacity of a resource allocated for CSI transmission or may be additionally compressed and transmitted in the time domain or frequency domain.

For example, when the capacity of the resource allocated to transmit the CSI is smaller than the size of a payload of the CSI calculated based on the plurality of parameters, Part 2 CSI may be compressed by applying at least one parameter to Part 2 CSI until the size of the payload is smaller than the capacity of the resource.

FIG. 35 illustrates a communication system 3500 applied to the present disclosure.

Referring to FIG. 35, the communication system 3500 applied to the present disclosure includes a wireless device, a base station, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 3510a, vehicles 3510b-1 and 3510b-2, an eXtended Reality (XR) device 3510c, a hand-held device 3510d, a home appliance 3510e, an Internet of Thing (IoT) device 3510f, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even the wireless device and a specific wireless device 20000a may operate a base station/network node for another wireless device.

The wireless devices 3510a to 3510f may be connected to a network 300 through the base station 3520. An artificial intelligence (AI) technology may be applied to the wireless devices 3510a to 3510f and the wireless devices 3510a to 3510f may be connected to the AI server 400 through the network 300. The network 300 may be configured by using a 3G network, a 4G (e.g., LTE) network, or a 5G (e.g., NR) network. The wireless devices 3510a to 3510f may communicate with each other through the base stration 3520/network 300, but may directly communicate with each other without going through the base station/network (sidelink communication). For example, the vehicles 3510b-1 and 3510b-2 may perform direct communication (e.g., Vehicle to Vehicle (V2V)/Vehicle to everything (V2X) communication). Furthermore, the IoT device (e.g., sensor) may perform direct communication with other IoT devices (e.g., sensor) or other wireless devices 3510a to 3510f Wireless communications/connections 150a, 150b, and 150c may be made between the wireless devices 3510a to 3510f/the base stration 3520 and between the base stration 3520 and the base station 3520. Here, the wireless communication/connection may be made through various wireless access technologies (e.g., 5G NR) such as uplink/downlink communication 150a, sidelink communication 150b (or D2D communication), and inter-base station communication 150c (e.g., relay, Integrated Access Backhaul (IAB)). The wireless device and the base station/the wireless device and the base station and the base station may transmit/receive radio signals to/from each other through wireless communications/connections 150a, 150b, and 150c. For example, the wireless communications/connections 150a, 150b, and 150c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to Which the Present Disclosure is Applied

FIG. 36 illustrates a wireless device applicable to the present disclosure.

Referring to FIG. 36, the first wireless device 3610 and a second wireless device 3620 may transmit/receive radio signals through various wireless access technologies (e.g., LTE and NR). Here, the first wireless device 3610 and the second wireless device 3620 may correspond to a wireless device 3610x and a base station 3520 and/or a wireless device 3610x and a wireless device 3610x of FIG. 35.

The first wireless device 3610 may include one or more processors 102 and one or more memories 104 and additionally further include one or more transceivers 106 and/or one or more antennas 108. The processor 102 may control the memory 104 and/or the transceiver 106 and may be configured to implement descriptions, functions, procedures, proposals, methods, and/or operation flows disclosed in the present disclosure. For example, the processor 102 may process information in the memory 104 and generate a first information/signal and then transmit a radio signal including the first information/signal through the transceiver 106. Furthermore, the processor 102 may receive a radio signal including a second information/signal through the transceiver 106 and then store in the memory 104 information obtained from signal processing of the second information/signal. The memory 104 may connected to the processor 102 and store various information related to an operation of the processor 102. For example, the memory 104 may store a software code including instructions for performing some or all of processes controlled by the processor 102 or performing the descriptions, functions, procedures, proposals, methods, and/or operation flowcharts disclosed in the present disclosure. Here, the processor 102 and the memory 104 may be a part of a communication modem/circuit/chip designated to implement the wireless communication technology (e.g., LTE and NR). The transceiver 106 may be connected to the processor 102 and may transmit and/or receive the radio signals through one or more antennas 108. The transceiver 106 may include a transmitter and/or a receiver. The transceiver 106 may be used mixedly with a radio frequency (RF) unit. In the present disclosure, the wireless device may mean the communication modem/circuit/chip.

The second wireless device 3620 may include one or more processors 202 and one or more memories 204 and additionally further include one or more transceivers 206 and/or one or more antennas 208. The processor 202 may control the memory 204 and/or the transceiver 206 and may be configured to implement descriptions, functions, procedures, proposals, methods, and/or operation flows disclosed in the present disclosure. For example, the processor 202 may process information in the memory 204 and generate a third information/signal and then transmit a radio signal including the third information/signal through the transceiver 206. Furthermore, the processor 202 may receive a radio signal including a fourth information/signal through the transceiver 206 and then store in the memory 204 information obtained from signal processing of the fourth information/signal. The memory 204 may connected to the processor 202 and store various information related to an operation of the processor 202. For example, the memory 204 may store a software code including instructions for performing some or all of processes controlled by the processor 202 or performing the descriptions, functions, procedures, proposals, methods, and/or operation flowcharts disclosed in the present disclosure. Here, the processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver. The transceiver 206 may be used mixedly with a radio frequency (RF) unit. In the present disclosure, the wireless device may mean the communication modem/circuit/chip.

Hereinafter, hardware elements of the wireless devices 3610 and 3620 will be described in more detail. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the descriptions, functions, procedures, proposals, methods, and/or operation flowcharts disclosed in the present disclosure. One or more processors 102 and 202 may generate a message, control information, data, or information according to the descriptions, functions, procedures, proposals, methods, and/or operation flowcharts disclosed in the present disclosure. One or more processors 102 and 202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 106 and 206. One or more processors 102 and 202 may receive the signal (e.g., baseband signal) from one or more transceivers 106 and 206 and acquire the PDU, the SDU, the message, the control information, the data, or the information according to the descriptions, functions, procedures, proposals, methods, and/or operation flowcharts disclosed in the present disclosure.

One or more processors 102 and 202 may be referred to as a controller, a microcontroller, a microprocessor, or a microcomputer. One or more processors 102 and 202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102 and 202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 102 and 202 or stored in one or more memories 104 and 204 and driven by one or more processors 102 and 202. The descriptions, functions, procedures, proposals, and/or operation flowcharts disclosed in the present disclosure may be implemented by using firmware or software in the form of a code, the instruction and/or a set form of the instruction.

One or more memories 104 and 204 may be connected to one or more processors 102 and 202 and may store various types of data, signals, messages, information, programs, codes, instructions, and/or commands. One or more memories 104 and 204 may be configured by a ROM, a RAM, an EPROM, a flash memory, a hard drive, a register, a cache memory, a computer reading storage medium, and/or a combination thereof. One or more memories 104 and 204 may be positioned inside and/or outside one or more processors 102 and 202. Furthermore, one or more memories 104 and 204 may be connected to one or more processors 102 and 202 through various technologies such as wired or wireless connection.

One or more transceivers 106 and 206 may transmit to one or more other devices user data, control information, a wireless signal/channel, etc., mentioned in the methods and/or operation flowcharts of the present disclosure. One or more transceivers 106 and 206 may receive from one or more other devices user data, control information, a wireless signal/channel, etc., mentioned in the descriptions, functions, procedures, proposals, methods, and/or operation flowcharts disclosed in the present disclosure. For example, one or more transceivers 106 and 206 may be connected to one or more processors 102 and 202 and transmit and receive the radio signals. For example, one or more processors 102 and 202 may control one or more transceivers 106 and 206 to transmit the user data, the control information, or the radio signal to one or more other devices. Furthermore, one or more processors 102 and 202 may control one or more transceivers 106 and 206 to receive the user data, the control information, or the radio signal from one or more other devices. Furthermore, one or more transceivers 106 and 206 may be connected to one or more antennas 108 and 208 and one or more transceivers 106 and 206 may be configured to transmit and receive the user data, control information, wireless signal/channel, etc., mentioned in the descriptions, functions, procedures, proposals, methods, and/or operation flowcharts disclosed in the present disclosure through one or more antennas 108 and 208. In the present disclosure one or more antennas may be a plurality of physical antennas or a plurality of logical antennas (e.g., antenna ports). One or more transceivers 106 and 206 may convert the received radio signal/channel from an RF band signal to a baseband signal in order to process the received user data, control information, radio signal/channel, etc., by using one or more processors 102 and 202. One or more transceivers 106 and 206 may convert the user data, control information, radio signal/channel, etc., processed by using one or more processors 102 and 202, from the baseband signal into the RF band signal. To this end, one or more transceivers 106 and 206 may include an (analog) oscillator and/or filter.

Utilization Example of Wireless Device to which the Present Disclosure is Applied FIG. 37 illustrates another example of a wireless device applied to the present disclosure. The wireless device may be implemented as various types according to a use example/service (see FIG. 35).

Referring to FIG. 37, wireless devices 3010 and 3020 may correspond to the wireless devices 3010 and 3020 of FIG. 36 and may be constituted by various elements, components, units, and/or modules. For example, the wireless devices 3010 and 3020 may include the communication unit 110, the control unit 120, the memory unit 130, and the additional element 140. The communication unit may include a communication circuit 112 and a transceiver(s) 114. For example, the communication circuit 112 may include the one or more processors 102 and 202 and/or one or more memories 104 and 204 of FIG. 36. For example, the transceiver(s) 114 may include the one or more transceivers 106 and 206 and/or one or more antennas 108 and 208 of FIG. 36. The control unit 120 is electrically connected to the communication unit 110, the memory unit 130, and the additional element 140 and controls an overall operation of the wireless device. For example, the control unit 120 may an electrical/mechanical operation of the wireless device based on a program/code/instruction/information stored in the memory unit 130. Furthermore, the control unit 120 may transmit the information stored in the memory unit 130 to the outside (e.g., other communication devices) through the communication unit 110 via a wireless/wired interface or store, in the memory unit 130, information received from the outside (e.g., other communication devices) through the wireless/wired interface through the communication unit 110.

The additional element 140 may be variously configured according to the type of wireless device. For example, the additional element 140 may include at least one of a power unit/battery, an input/output (I/O) unit, a driving unit, and a computing unit. Although not limited thereto, the wireless device may be implemented as a form such as the robot 3510a of FIG. 35, the vehicles 3510b-1 and 3510b-2 of FIG. 35, the XR device 3510c of FIG. 35, the hand-held device 3510d of FIG. 35, the home appliance 3510e of FIG. 35, the IoT device 3510f of FIG. 35, a digital broadcasting terminal, a hologram device, a public safety device, an MTC device, a medical device, a fintech device (or financial device), a security device, a climate/environment device, the AI server/device 400 of FIG. 35, the base station 3520 of FIG. 35, a network node, etc. The wireless device may be movable or may be used at a fixed place according to a use example/service.

In FIG. 37, all of various elements, components, units, and/or modules in the wireless devices 3010 and 3020 may be interconnected through the wired interface or at least may be wirelessly connected through the communication unit 110. For example, the control unit 120 and the communication unit 110 in the wireless devices 3010 and 3020 may be wiredly connected and the control unit 120 and the first unit (e.g., 130 or 140) may be wirelessly connected through the communication unit 110. Further, each element, component, unit, and/or module in the wireless devices 3010 and 3020 may further include one or more elements. For example, the control unit 120 may be constituted by one or more processor sets. For example, the control unit 120 may be configured a set of a communication control processor, an application processor, an electronic control unit (ECU), a graphic processing processor, a memory control processor, etc. As another example, the memory 130 may be configured as a random access memory (RAM), a dynamic RAM (DRAM), a read only memory (ROM), a flash memory, a volatile memory, a non-volatile memory, and/or combinations thereof.

Hereinafter, an implementation example of FIG. 37 will be described in more detail with reference to FIG. 38.

Example of Handheld Device to which the Present Disclosure is Applied

FIG. 38 illustrates a hand-held device applied to the present disclosure. The hand-held device may include a smart phone, a smart pad, a wearable device (e.g., a smart watch, a smart glass), and a portable computer (e.g., a notebook, etc.). The hand-held device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 38, the handheld device 3610 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 35, respectively.

The communication unit 110 may transmit and receive a signal (e.g., data, a control signal) to and from other wireless devices and base stations. The control unit 120 may perform various operations by controlling components of the handheld device 3610. The control unit 120 may include an Application Processor (AP). The memory unit 130 may store data/parameters/programs/codes/instructions required for driving the handheld device 3610. Furthermore, the memory unit 130 may store input/output data/information, etc. The power supply unit 140a may supply power to the handheld device 3610 and include a wired/wireless charging circuit, a battery, and the like. The interface unit 140b may support a connection between the handheld device 3610 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform, into a radio signal, the information/signal stored in the memory, and may directly transmit the radio signal to another wireless device or may transmit the radio signal to the base station. Further, the communication unit 110 may receive the radio signal from another wireless device or base station and then reconstruct the received radio signal into the original information/signal. The reconstructed information/signal may be stored in the memory unit 130 and then output in various forms (e.g., text, voice, image, video, or haptic) through the input/output unit 140c.

Example of AI apparatus to which the present disclosure is applied

FIG. 39 illustrates an AI apparatus applied to the present disclosure. The AI apparatus may be implemented as a stationary device or a movable device, such as TV, a projector, a smartphone, PC, a notebook, a terminal for digital broadcasting, a tablet PC, a wearable device, a set-top box (STB), a radio, a washing machine, a refrigerator, a digital signage, a robot, and a vehicle.

Referring to FIG. 39, the AI apparatus 3610 may include a communication unit 110, a control unit 120, a memory unit 130, an input/output unit 140a/140b, a learning processor unit 140c, and a sensing unit 140d. The blocks 110 to 130/140a to 140d correspond to the block 110 to 130/140 of FIG. 35, respectively.

The communication unit 110 may transmit and receive wired/wireless signals (e.g., sensor information, user input, a learning model, and a control signal) to and from an external device, such as another AI apparatus (e.g., 3510x, 3520, 400 in FIG. 35) or the AI server (e.g., 400 in FIG. 40) by using wired/wireless communication technologies. To this end, the communication unit 110 may transmit information within the memory unit 130 to the external device or may deliver, to the memory unit 130, a signal received from the external device.

The control unit 120 may determine at least one executable operation of the AI apparatus 3010 based on information determined or generated using a data analysis algorithm or a machine learning algorithm. Furthermore, the control unit 120 may perform the determined operation by controlling components of the AI apparatus 3610. For example, the control unit 120 may request, search for, receive or use data of the learning processor unit 140c or the memory unit 130, and may control components of the AI apparatus 3610 to execute an operation predicted among at least one executable operation or an operation determined to be preferred. Furthermore, the control unit 120 may collect history information including the contents of an operation of the AI apparatus 3610 or feedback from a user for the operation, and may store the history information in the memory unit 130 or the learning processor unit 140c or may transmit the history information to an external device, such as the AI server (400 in FIG. 40). The collected history information may be used to update a learning model.

The memory unit 130 may store data that supporting various functions of the AI apparatus 3610. For example, the memory unit 130 may store data obtained from the input unit 140a, data obtained from the communication unit 110, output data of the learning processor unit 140c, and data obtained from the sensing unit 140. Furthermore, the memory unit 130 may store control information and/or a software code necessary for an operation/execution of the control unit 120.

The input unit 140a may obtain various types of data from the outside of the AI apparatus 3610. For example, the input unit 140a may obtain learning data for model learning, input data to which a learning model will be applied, etc. The input unit 140a may include a camera, a microphone and/or a user input unit. The output unit 140b may generate output related to a sense of sight, a sense of hearing, or a tactile sense. The output unit 140b may include a display, a speaker and/or a haptic module. The sensing unit 140 may obtain at least one of internal information of the AI apparatus 3610, surrounding environment information of the AI apparatus 3610, and user information by using various sensors. The sensing unit 140 may include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, an optical sensor, a microphone and/or a radar.

The learning processor unit 140c may train a model composed of an artificial neural network by using learning data. The learning processor unit 140c may perform AI processing along with the learning processor unit of the AI server (400 in FIG. 35). The learning processor unit 140c may process information received from the external device through the communication unit 110 and/or information stored in the memory unit 130. Furthermore, an output value of the learning processor unit 140c may be transmitted to the external device through the communication unit 110 or/and stored in the memory unit 130.

FIG. 40 illustrates an AI server applied to the present disclosure.

Referring to FIG. 40, the AI server (400 in FIG. 40) may mean an apparatus which trains an artificial neural network by using a machine learning algorithm and uses a trained artificial neural network. In this case, the AI server 400 is composed of a plurality of servers, may perform distributed processing, and may be defined as a 5G network. In this case, the AI server 400 may be included in some component of the AI apparatus (3610 in FIG. 39), and may perform at least some of AI processing together.

The AI server 400 may include a communication unit 410, a memory 430, a learning processor 440, a processor 460, etc. The communication unit 410 may transmit and receive data to and from an external device, such as the AI apparatus (3610 in FIG. 39). The memory 430 may include a model storage 431. The model storage 431 may store a model (or artificial neural network 431a) which is trained or has been trained through the learning processor 440. The learning processor 440 may train the artificial neural network 431a by using learning data. A learning model may be used in the state in which the model has been mounted on the AI server 400 of the artificial neural network or may be mounted and used in an external device, such as the AI apparatus (3610 in FIG. 39). The learning model may be implemented as hardware, software or a combination of hardware and software. If some of or the entire learning model is implemented as software, one or more instructions that construct the learning model may be stored in the memory 430. The processor 460 may infer a result value of new input data by using the learning model, and may generate a response or control instruction based on the inferred result value.

The AI server 400 and/or the AI apparatus 3010 may be combined and applied with the robot 3510a, the vehicle 3510b-1 and 3510b-2, the extended reality (XR) device 3510c, the handheld device 3510d, the home appliances 3510e, and the Internet of Thing (IoT) device 3510f over the network (300 in FIG. 35). The robot 3510a, the vehicle 3510b-1 and 3510b-2, the extended reality (XR) device 3510c, the handheld device 3510d, the home appliances 3510e, and the Internet of Thing (IoT) device 3510f to which the AI technology has been applied may be denoted as an AI apparatus.

Hereinafter, examples of the AI apparatus are described.

(Example of Fourth AI Apparatus—AI+Robot+Autonomous Driving)

An AI technology is applied to the robot 3510a. The robot 3510a may be implemented as a guidance robot, a transport robot, a cleaning robot, a wearable robot, an entertainment robot, a pet robot, an unmanned flight robot, etc. The robot 3510a may include a robot control module for controlling an operation. The robot control module may mean a software module or a chip in which a software module has been implemented using hardware. The robot 3510a may obtain state information of the robot 3510a, may detect (recognize) a surrounding environment and object, may generate map data, may determine a moving path and a running plan, may determine a response to a user interaction, or may determine an operation using sensor information obtained from various types of sensors. In this case, the robot 3510a may use sensor information obtained by at least one sensor among LIDAR, a radar, and a camera in order to determine the moving path and running plan.

The robot 3510a may perform the above operations using a learning model configured with at least one artificial neural network. For example, the robot 3510a may recognize a surrounding environment and object using a learning model, and may determine an operation using recognized surrounding environment information or object information. In this case, the learning model may have been directly trained in the robot 3510a or may have been trained in an external device, such as the AI server 400. In this case, the robot 3510a may directly generate results using the learning model and perform an operation, but may perform an operation by transmitting sensor information to an external device, such as the AI server 400, and receiving results generated in response thereto.

The robot 3510a may determine a moving path and running plan using at least one of map data, object information detected from sensor information, or object information obtained from an external device. The robot 3510a may run along the determined moving path and running plan by controlling the driving unit. The map data may include object identification information for various objects disposed in the space in which the robot 3510a moves. For example, the map data may include object identification information for fixed objects, such as a wall and a door, and movable objects, such as a flowport and a desk. Furthermore, the object identification information may include a name, a type, a distance, a location, etc.

Furthermore, the robot 3510a may perform an operation or run by controlling the driving unit based on a user's control/interaction. In this case, the robot 3510a may obtain intention information of an interaction according to a user's behavior or voice speaking, may determine a response based on the obtained intention information, and may perform an operation.

(Example of Second AI Apparatus—AI+Autonomous Driving+XR)

An AI technology is applied to the self-driving vehicle 3510b-1, 3510b-2. The self-driving vehicle 3510b-1, 3510b-2 may be implemented as a movable type robot, a vehicle, an unmanned flight body, etc. The self-driving vehicle 3510b-1, 3510b-2 may include a self-driving control module for controlling a self-driving function. The self-driving control module may mean a software module or a chip in which a software module has been implemented using hardware. The self-driving control module may be included in the self-driving vehicle 3510b-1, 3510b-2 as an element of the self-driving vehicle 3510b-1, 3510b-2, but may be configured as separate hardware outside the self-driving vehicle 3510b-1, 3510b-2 and connected to the self-driving vehicle 3510b-1, 3510b-2.

The self-driving vehicle 3510b-1, 3510b-2 may obtain state information of the self-driving vehicle 3510b-1, 3510b-2, may detect (recognize) a surrounding environment and object, may generate map data, may determine a moving path and running plan, or may determine an operation using sensor information obtained from various types of sensors. In this case, in order to determine the moving path and running plan, like the robot 3510a, the self-driving vehicle 3510b-1, 3510b-2 may use sensor information obtained from at least one sensor among a LIDAR, a radar and a camera. Particularly, the self-driving vehicle 3510b-1, 3510b-2 may recognize an environment or object in an area whose view is blocked or an area of a given distance or more by receiving sensor information for the environment or object from external devices, or may directly receive recognized information for the environment or object from external devices.

The self-driving vehicle 3510b-1, 3510b-2 may perform the above operations using a learning model configured with at least one artificial neural network. For example, the self-driving vehicle 3510b-1, 3510b-2 may recognize a surrounding environment and object using a learning model, and may determine the flow of running using recognized surrounding environment information or object information. In this case, the learning model may have been directly trained in the self-driving vehicle 3510b-1, 3510b-2 or may have been trained in an external device, such as the AI server 400. In this case, the self-driving vehicle 3510b-1, 3510b-2 may directly generate results using the learning model and perform an operation, but may perform an operation by transmitting sensor information to an external device, such as the AI server 400, and receiving results generated in response thereto.

The self-driving vehicle 3510b-1, 3510b-2 may determine a moving path and running plan using at least one of map data, object information detected from sensor information or object information obtained from an external device. The self-driving vehicle 3510b-1, 3510b-2 may run based on the determined moving path and running plan by controlling the driving unit. The map data may include object identification information for various objects disposed in the space (e.g., road) in which the self-driving vehicle 3510b-1, 3510b-2 runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

the self-driving vehicle 3510b-1, 3510b-2 may perform an operation or may run by controlling the driving unit based on a user's control/interaction. In this case, the self-driving vehicle 3510b-1, 3510b-2 may obtain intention information of an interaction according to a user' behavior or voice speaking, may determine a response based on the obtained intention information, and may perform an operation.

(Example of Third AI Apparatus—AI+XR)

An AI technology is applied to the XR device 3510c, and the XR device 3510c may be implemented as a head-mount display, a head-up display provided in a vehicle, television, a mobile phone, a smartphone, a computer, a wearable device, home appliances, a digital signage, a vehicle, a fixed type robot or a movable type robot. The XR device 3510c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 3510c may output an XR object, including additional information for a recognized object, by making the XR object correspond to the corresponding recognized object.

The XR device 3510c may perform the above operations using a learning model configured with at least one artificial neural network. For example, the XR device 3510c may recognize a real object in three-dimensional point cloud data or image data using a learning model, and may provide information corresponding to the recognized real object. In this case, the learning model may have been directly trained in the XR device 3510c or may have been trained in an external device, such as the AI server 400. In this case, the XR device 3510c may directly generate results using a learning model and perform an operation, but may perform an operation by transmitting sensor information to an external device, such as the AI server 400, and receiving results generated in response thereto.

(Example of Fourth AI Apparatus—AI+Robot+Autonomous Driving)

An AI technology and a self-driving technology are applied to the robot 3510a. The robot 3510a may be implemented as a guidance robot, a transport robot, a cleaning robot, a wearable robot, an entertainment robot, a pet robot, an unmanned flight robot, etc. The robot 3510a to which the AI technology and the self-driving technology have been applied may mean a robot itself having a self-driving function or may mean the robot 3510a interacting with the self-driving vehicle 3510b-1, 3510b-2. The robot 3510a having the self-driving function may collectively refer to devices that autonomously move along a given flow without control of a user or autonomously determine a flow and move. The robot 3510a and the self-driving vehicle 3510b-1, 3510b-2 having the self-driving function may use a common sensing method in order to determine one or more of a moving path or a running plan. For example, the robot 3510a and the self-driving vehicle 3510b-1, 3510b-2 having the self-driving function may determine one or more of a moving path or a running plan using information sensed through LIDAR, a radar, a camera, etc.

The robot 3510a interacting with the self-driving vehicle 3510b-1, 3510b-2 is present separately from the self-driving vehicle 3510b-1, 3510b-2, and may perform an operation associated with a self-driving function inside or outside the self-driving vehicle 3510b-1, 3510b-2 or associated with a user got in the self-driving vehicle 3510b-1, 3510b-2. In this case, the robot 3510a interacting with the self-driving vehicle 3510b-1, 3510b-2 may control or assist the self-driving function of the self-driving vehicle 3510b-1, 3510b-2 by obtaining sensor information in place of the self-driving vehicle 3510b-1, 3510b-2 and providing the sensor information to the self-driving vehicle 3510b-1, 3510b-2, or by obtaining sensor information, generating surrounding environment information or object information, and providing the surrounding environment information or object information to the self-driving vehicle 3510b-1, 3510b-2.

The robot 3510a interacting with the self-driving vehicle 3510b-1, 3510b-2 may control the function of the self-driving vehicle 3510b-1, 3510b-2 by monitoring a user got in the self-driving vehicle 3510b-1, 3510b-2 or through an interaction with a user. For example, if a driver is determined to be a drowsiness state, the robot 3510a may activate the self-driving function of the self-driving vehicle 3510b-1, 3510b-2 or assist control of the driving unit of the self-driving vehicle 3510b-1, 3510b-2. In this case, the function of the self-driving vehicle 3510b-1, 3510b-2 controlled by the robot 3510a may include a function provided by a navigation system or audio system provided within the self-driving vehicle 3510b-1, 3510b-2, in addition to a self-driving function simply.

Alternatively, the robot 3510a interacting with the self-driving vehicle 3510b-1, 3510b-2 may provide information to the self-driving vehicle 3510b-1, 3510b-2 or may assist a function outside the self-driving vehicle 3510b-1, 3510b-2. For example, the robot 3510a may provide the self-driving vehicle 3510b-1, 3510b-2 with traffic information, including signal information, as in a smart traffic light, and may automatically connect an electric charger to a filling inlet through an interaction with the self-driving vehicle 3510b-1, 3510b-2 as in the automatic electric charger of an electric vehicle.

(Example of Fifth AI Apparatus—AI+Robot+XR)

An AI technology and an XR technology are applied to the robot 3510a, and the robot 3510a may be implemented as a guidance robot, a transport robot, a cleaning robot, a wearable robot, an entertainment robot, a pet robot, an unmanned flight robot, a drone, etc. The robot 3510a to which the XR technology has been applied may mean a robot, that is, a target of control/interaction within an XR image. In this case, the robot 3510a is different from the XR device 3510c, and they may operate in conjunction with each other.

When the robot 3510a, that is, a target of control/interaction within an XR image, obtains sensor information from sensors including a camera, the robot 3510a or the XR device 3510c may generate an XR image based on the sensor information, and the XR device 3510c may output the generated XR image. Furthermore, the robot 3510a may operate based on a control signal received through the XR device 3510c or a user's interaction. For example, a user may identify a corresponding XR image at timing of the robot 3510a, remotely operating in conjunction through an external device, such as the XR device 3510c, may adjust the self-driving path of the robot 3510a through an interaction, may control an operation or driving, or may identify information of a surrounding object.

(Example of Sixth AI Apparatus—AI+Autonomous Driving+XR)

An AI technology and an XR technology are applied to the self-driving vehicle 3510b-1, 3510b-2 may be implemented as a movable type robot, a vehicle, an unmanned flight body, etc. The self-driving vehicle 3510b-1, 3510b-2 to which the XR technology has been applied may mean a self-driving vehicle equipped with means for providing an XR image or a self-driving vehicle, that is, a target of control/interaction within an XR image. Particularly, the self-driving vehicle 3510b-1, 3510b-2, that is, a target of control/interaction within an XR image, is different from the XR device 3510c, and they may operate in conjunction with each other.

The self-driving vehicle 3510b-1, 3510b-2 equipped with the means for providing an XR image may obtain sensor information from sensors including a camera, and may output an XR image generated based on the obtained sensor information. For example, the self-driving vehicle 3510b-1, 3510b-2 includes an HUD, and may provide a passenger with an XR object corresponding to a real object or an object within a screen by outputting an XR image. In this case, when the XR object is output to the HUD, at least some of the XR object may be output with it overlapping a real object toward which a passenger's view is directed. In contrast, when the XR object is displayed on a display included within the self-driving vehicle 3510b-1, 3510b-2, at least some of the XR object may be output so that it overlaps an object within a screen. For example, the self-driving vehicle 3510b-1, 3510b-2 may output XR objects corresponding to objects, such as a carriageway, another vehicle, a traffic light, a signpost, a two-wheeled vehicle, a pedestrian, and a building.

When the self-driving vehicle 3510b-1, 3510b-2, that is, a target of control/interaction within an XR image, obtains sensor information from sensors including a camera, the self-driving vehicle 3510b-1, 3510b-2 or the XR device 3510c may generate an XR image based on the sensor information. The XR device 3510c may output the generated XR image. Furthermore, the self-driving vehicle 3510b-1, 3510b-2 may operate based on a control signal received through an external device, such as the XR device 3510c, or a user's interaction.

FIG. 41 illustrates an XR device applied to the present disclosure.

FIG. 41 illustrates an XR device applied to the present invention. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 41, the XR device 100a may includes a communication unit 110, a control unit 120, a memory unit 130, an input/output unit 140a, a sensor unit 140b, and a power supply unit 140c. Here, blocks 110 to 130/140a to 140c correspond to blocks 110 to 130/140 of FIG. 37, respectively.

The communication unit 110 may transmit and receive signals (e.g., media data, control signals) with other wireless devices, portable devices, or external devices such as a media server. Media data may include images, images, sounds, and the like. The controller 120 may perform various operations by controlling components of the XR device 100a. For example, the controller 120 may be configured to control and/or perform procedures such as video/image acquisition, (video/image) encoding, and metadata generation and processing. The memory unit 130 may store data/parameters/programs/codes/commands required for driving the XR device 100a/generating an XR object. The input/output unit 140a may obtain control information, data, etc. from the outside, and may output the generated XR object. The input/output unit 140a may include a camera, a microphone, a user input unit, a display unit, a speaker, and/or a haptic module. The sensor unit 140b may obtain XR device status, surrounding environment information, user information, and the like. The sensor unit 140b may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140c supplies power to the XR device 100a, and may include a wired/wireless charging circuit, a battery, and the like.

For example, the memory unit 130 of the XR device 100a may include information (e.g., data) necessary for generating an XR object (e.g., AR/VR/MR object). The input/output unit 140a may obtain a command to manipulate the XR device 100a from the user, and the controller 120 may drive the XR device 100a according to the user's driving command. For example, when a user tries to watch a movie, news, etc. through the XR device 100a, the controller 120 transmits the content request information through the communication unit 130 to another device (e.g., the mobile device 100d) or to the media server. The communication unit 130 may download/stream content such as movies and news from another device (e.g., the mobile device 100d) or a media server to the memory unit 130. The control unit 120 controls and/or performs procedures such as video/image acquisition, (video/image) encoding, and metadata generation/processing for content, and generates/outputs the XR object based on information on a surrounding space or a real object acquired through the input/output unit 140a/sensor unit 140b.

In addition, the XR device 100a is wirelessly connected to the mobile device 100d through the communication unit 2110, and the operation of the XR device 100a may be controlled by the mobile device 100d. For example, the portable device 100d may operate as a controller for the XR device 100a. To this end, the XR device 100a may obtain 3D location information of the mobile device 100d, and then generate and output an XR object corresponding to the mobile device 100d.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

Although a method of mapping a reference signal in a wireless communication system of the present invention has been described mainly in an example applied to a 3GPP LTE/LTE-A system and a 5G system (New RAT system), it can be applied to various wireless communication systems.

The invention claimed is:

1. A method for transmitting channel state information (CSI) by a user equipment (UE) in a wireless communication system, comprising:
receiving configuration information for CSI reporting from a base station,
wherein the configuration information includes a plurality of codebook parameters related to a configuration of linear combination codebook for the CSI reporting;

receiving, from the base station, a reference signal for the CSI reporting;

calculating, based on a compression method in a frequency domain, CSI including a precoding matrix indicator (PMI) for beams linearly combined based on (i) the plurality of codebook parameters and (ii) the reference signal, wherein the CSI consists of a first part and a second part; and reporting the calculated CSI to the base station, wherein a size of a payload of the second part is determined based on at least one parameter among the plurality of codebook parameters, wherein based on a capacity of a resource allocated to report the CSI being smaller than a size of a payload of the CSI calculated based on the plurality of codebook parameters, the size of the payload of the second part is reduced until the size of the payload of the CSI becomes less than or equal to the capacity of the resource, and wherein the size of the payload of the second part is reduced by reducing a number of co-efficients generated based on the at least one parameter.

2. The method of claim 1,
wherein the PMI is included in the second part.

3. The method of claim 2,
wherein the PMI includes (i) information related to a beam group including the beams linearly combined and (ii) information related to the co-efficients.

4. The method of claim 3,
wherein a size of the PMI is reduced by reducing the number of co-efficients, and
wherein the size of the payload of the second part is reduced as the size of the PMI is reduced.

5. The method of claim 3,
wherein the beams included in the beam group determined based on the information related to the beam group are linearly combined by applying the co-efficients determined based on the information related to the the co-efficients.

6. The method of claim 5,
wherein the co-efficients include (i) a phase co-efficient for a phase combination on the beams included in the beam group and (ii) an amplitude co-efficient for an amplitude combination on the beams included in the beam group.

7. The method of claim 1,
wherein the number of the co-efficients is reduced based on a priority order among the co-efficients.

8. The method of claim 3,
wherein the plurality of codebook parameters consist of (i) a first parameter for determining a number of the beams included in the beam group, (ii) a second parameter for determining a number of subbands in which the CSI is reported, and (iii) a third parameter for determining a maximum value of the number of the co-efficients.

9. The method of claim 8, further comprising:
determining a value of the at least one parameter that causes the size of the payload of the CSI to be less than or equal to the capacity of the resource,
wherein the value of the at least one parameter is reduced based on the determination, and
wherein the number of the co-efficients is reduced based on a reduction of the value of the at least one parameter.

10. The method of claim 9, further comprising:
recalculating the CSI based on the reduced number of the co-efficients; and
reporting the recalculated CSI to the base station,
wherein the recalculated CSI includes information on the at least one parameter whose value is reduced.

11. The method of claim 10,
wherein the at least one parameter whose value is reduced is the third parameter.

12. The method of claim 6,
wherein the amplitude co-efficient includes an amplitude co-efficient for a subband,
wherein values of the amplitude co-efficient for the subband are quantized into 8 values, and
wherein the quantized values of the amplitude co-efficient for the subband are configured based on (i) a maximum value '1' and (ii) values obtained by multiplying the maximum value '1' by $\sqrt{1/2}$.

13. The method of claim 1,
wherein the compression method in the frequency domain is a method in which the CSI is reported through only some subbands among all subbands configured for reporting the CSI report of the UE.

14. The method of claim 13, further comprising:
determining a number of subbands that cause the size of the payload of the CSI to be less than or equal to the capacity of the resource,
wherein the determined number of the subbands is less than a number of the some subbands, and
wherein the number of co-efficients is reduced based on the CSI being reported through only subbands as many as the determined number of the subbands.

15. A user equipment (UE) for transmitting channel state information (CSI) in a wireless communication system, the UE comprising:
a radio frequency (RF) module for transmitting and receiving radio signals; and
a processor for controlling the RF module, wherein the processor configured to:
receive configuration information for CSI reporting from the base station,
wherein the configuration information includes a plurality of codebook parameters related to a configuration of linear combination codebook for the CSI reporting;
receive, from the base station, a reference signal for the CSI reporting;
calculate, based on a compression method in a frequency domain, CSI including a precoding matrix indicator (PMI) for beams linearly combined based on (i) the plurality of codebook parameters and (ii) the reference signal,
wherein the CSI consists of a first part and a second part; and
report the calculated CSI to the base station,
wherein a size of a payload of the second part is determined based on at least one parameter among the plurality of codebook parameters,
wherein based on a capacity of a resource allocated to report the CSI being smaller than a size of a payload of the CSI calculated based on the plurality of codebook parameters, the size of the payload of the second part is reduced until the size of the payload of the CSI becomes less than or equal to the capacity of the resource, and wherein the size of the payload of the second part is reduced by reducing a number of co-efficients generated based on the at least one parameter.

16. A method for receiving channel state information (CSI) by a base station in a wireless communication system, comprising:
   transmitting configuration information for CSI reporting to a user equipment (UE),
      wherein the configuration information includes a plurality of codebook parameters related to a configuration of linear combination codebook for the CSI reporting;
   transmitting, to the UE, a reference signal for the CSI reporting; and
   receiving, from the UE, the CSI including a precoding matrix indicator (PMI) for beams linearly combined,
   wherein the CSI consists of a first part and a second part,
   wherein a size of a payload of the second part is determined based on at least one parameter among the plurality of codebook parameters,
   wherein based on a capacity of a resource allocated to report the CSI being smaller than a size of a payload of the CSI calculated based on the plurality of codebook parameters, the size of the payload of the second part is reduced until the size of the payload of the CSI becomes less than or equal to the capacity of the resource, and
   wherein the size of the payload of the second part is reduced by reducing a number of co-efficients generated based on the at least one parameter.

17. A base station for receiving channel state information (CSI) in a wireless communication system, the base station comprising:
   a radio frequency (RF) module for transmitting and receiving radio signals; and
   a processor for controlling the RF module, wherein the processor configured to:
   transmit configuration information for CSI reporting to a user equipment (UE),
      wherein the configuration information includes a plurality of codebook parameters related to a configuration of linear combination codebook for the CSI reporting;
   transmit, to the UE, a reference signal for the CSI reporting; and
   receive, from the UE, the CSI including a precoding matrix indicator (PMI) for beams linearly combined,
   wherein the CSI consists of a first part and a second part,
   wherein a size of a payload of the second part is determined based on at least one parameter among the plurality of codebook parameters,
   wherein based on a capacity of a resource allocated to report the CSI being smaller than a size of a payload of the CSI calculated based on the plurality of codebook parameters, the size of the payload of the second part is reduced until the size of the payload of the CSI becomes less than or equal to the capacity of the resource, and
   wherein the size of the payload of the second part is reduced by reducing a number of co-efficients generated based on the at least one parameter.

\* \* \* \* \*